(12) United States Patent
Arnold

(10) Patent No.: US 11,983,179 B2
(45) Date of Patent: May 14, 2024

(54) METHOD AND DATABASE SYSTEM FOR GENERATING A QUERY OPERATOR EXECUTION FLOW

(71) Applicant: Ocient Holdings LLC, Chicago, IL (US)

(72) Inventor: Jason Arnold, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 156 days.

(21) Appl. No.: 17/198,418

(22) Filed: Mar. 11, 2021

(65) Prior Publication Data

US 2021/0216548 A1 Jul. 15, 2021

Related U.S. Application Data

(63) Continuation of application No. 16/720,481, filed on Dec. 19, 2019, now Pat. No. 11,609,911.

(51) Int. Cl.
  *G06F 16/2453* (2019.01)
  *G06F 16/835* (2019.01)

(52) U.S. Cl.
  CPC .... *G06F 16/24542* (2019.01); *G06F 16/8365* (2019.01)

(58) Field of Classification Search
  CPC .............. G06F 16/24542; G06F 16/8365
  See application file for complete search history.

(56) References Cited

U.S. PATENT DOCUMENTS

| | | | |
|---|---|---|---|
| 5,548,770 A | 8/1996 | Bridges | |
| 6,230,200 B1 | 5/2001 | Forecast | |
| 6,560,595 B1 * | 5/2003 | Sanders | G06F 16/244 |
| 6,633,772 B2 | 10/2003 | Ford | |
| 7,499,907 B2 | 3/2009 | Brown | |
| 7,908,242 B1 | 3/2011 | Achanta | |
| 9,633,078 B1 * | 4/2017 | Eyers-Taylor | G06F 16/2448 |
| 2001/0051949 A1 | 12/2001 | Carey | |

(Continued)

OTHER PUBLICATIONS

A new high performance fabric for HPC, Michael Feldman, May 2016, Intersect360 Research.

(Continued)

*Primary Examiner* — Mariela Reyes
*Assistant Examiner* — Fernando M Mari Valcarcel
(74) *Attorney, Agent, or Firm* — Garlick & Markison; Katherine C. Stuckman; Bruce E. Stuckman

(57) ABSTRACT

A query operator execution flow includes: identifying an OR operator of the query expression; generating a plurality of parallel sub-flows based on a plurality predicates of the OR operator; and generating a plurality of serial sub-flows of the query operator execution flow based on the OR operator of the query expression. A first consecutive one of the plurality of serial sub-flows includes an identifier appending operator, a second consecutive one of the plurality of serial sub-flows includes a tee operator, a third consecutive one of the plurality of serial sub-flows includes the plurality of parallel sub-flows from the tee operator, and a fourth consecutive one of the plurality of serial sub-flows includes a union distinct operator applied to the plurality of parallel sub-flows. Execution of the query is facilitated by applying the query operator execution flow to a plurality of rows indicated by the query.

19 Claims, 47 Drawing Sheets

(56) References Cited

U.S. PATENT DOCUMENTS

| | | | |
|---|---|---|---|
| 2002/0032676 A1 | 3/2002 | Reiner | |
| 2004/0162853 A1 | 8/2004 | Brodersen | |
| 2008/0133456 A1 | 6/2008 | Richards | |
| 2009/0063893 A1 | 3/2009 | Bagepalli | |
| 2009/0183167 A1 | 7/2009 | Kupferschmidt | |
| 2010/0082577 A1 | 4/2010 | Mirchandani | |
| 2010/0241646 A1 | 9/2010 | Friedman | |
| 2010/0274983 A1 | 10/2010 | Murphy | |
| 2010/0312756 A1 | 12/2010 | Zhang | |
| 2011/0219169 A1 | 9/2011 | Zhang | |
| 2012/0109888 A1 | 5/2012 | Zhang | |
| 2012/0151118 A1 | 6/2012 | Flynn | |
| 2012/0185866 A1 | 7/2012 | Couvee | |
| 2012/0254252 A1 | 10/2012 | Jin | |
| 2012/0311246 A1 | 12/2012 | McWilliams | |
| 2013/0332484 A1 | 12/2013 | Gajic | |
| 2014/0047095 A1 | 2/2014 | Breternitz | |
| 2014/0136510 A1 | 5/2014 | Parkkinen | |
| 2014/0188841 A1 | 7/2014 | Sun | |
| 2014/0365597 A1* | 12/2014 | Boehmer | G06F 15/17331 709/213 |
| 2015/0205607 A1* | 7/2015 | Lindholm | G06F 9/3887 712/234 |
| 2015/0234888 A1* | 8/2015 | Ahmed | G06F 16/2425 707/765 |
| 2015/0244804 A1 | 8/2015 | Warfield | |
| 2015/0248366 A1 | 9/2015 | Bergsten | |
| 2015/0293966 A1 | 10/2015 | Cai | |
| 2015/0310045 A1 | 10/2015 | Konik | |
| 2016/0034547 A1 | 2/2016 | Lerios | |
| 2017/0046386 A1* | 2/2017 | Kirk | G06F 16/24542 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable_html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; dated Feb. 13, 2018; 17 pgs.

International Searching Authority; International Search Report and Written Opinion; International Application No. PCT/US2017/054784; dated Dec. 28, 2017; 10 pgs.

International Searching Authority; International Search Report and Written Opinion; International Application No. PCT/US2017/066145; dated Mar. 5, 2018; 13 pgs.

International Searching Authority; International Search Report and Written Opinion; International Application No. PCT/US2017/066169; dated Mar. 6, 2018; 15 pgs.

International Searching Authority; International Search Report and Written Opinion; International Application No. PCT/US2018/025729; dated Jun. 27, 2018; 9 pgs.

International Searching Authority; International Search Report and Written Opinion; International Application No. PCT/US2018/034859; dated Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends in Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

* cited by examiner

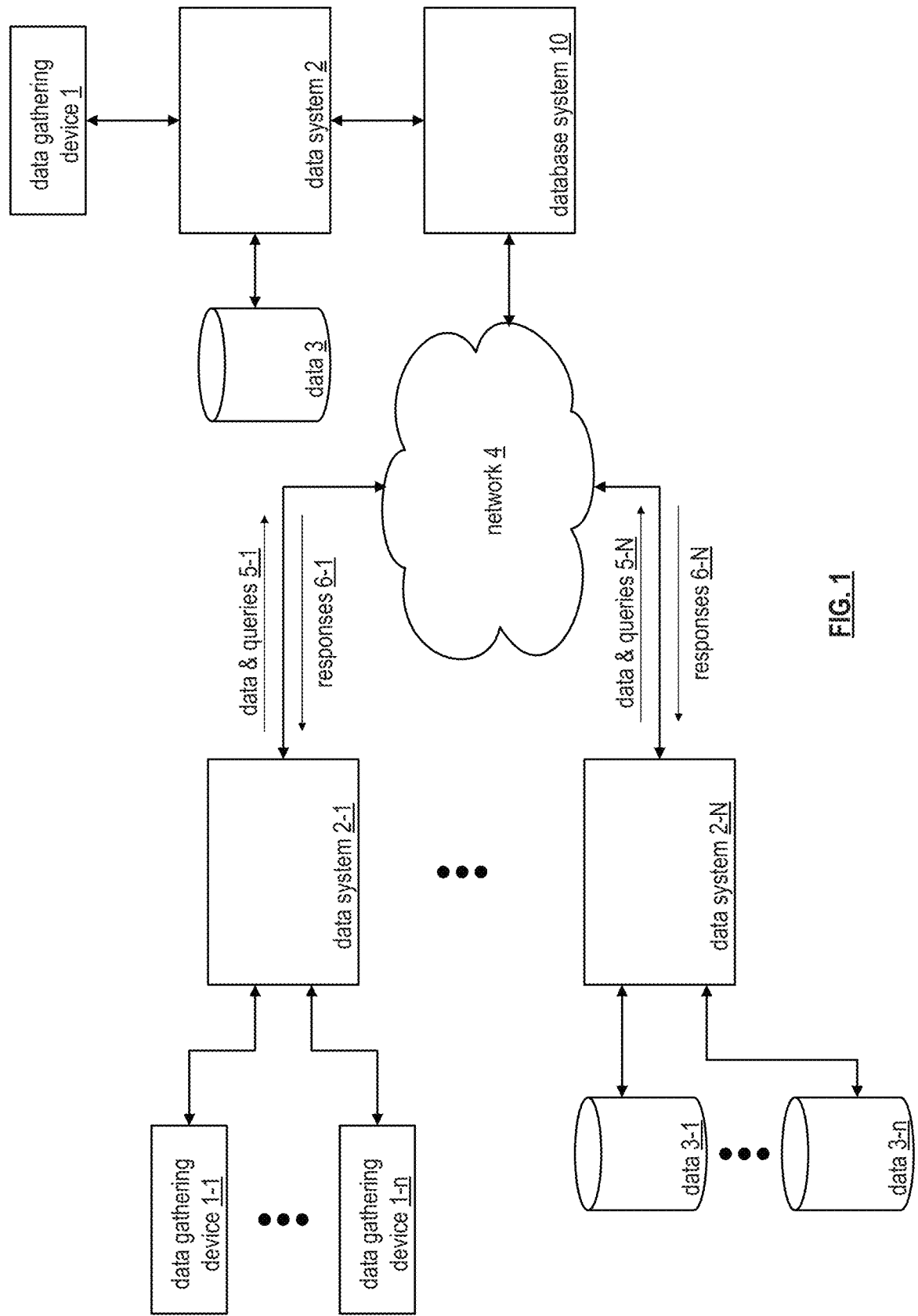

database system 10

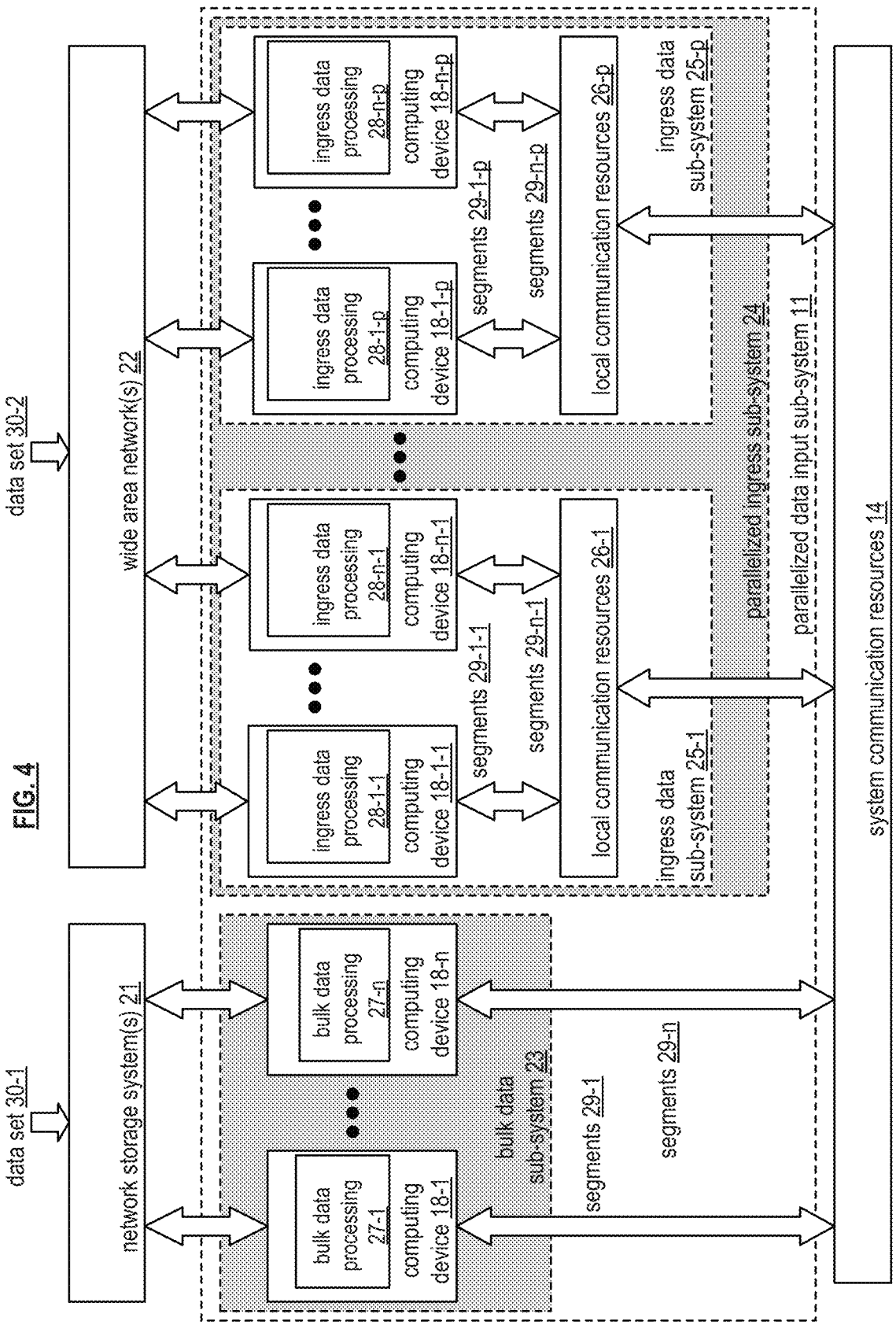

computing device 18 computing device 18 computing device 18 node 37 node 37 node 37 node 37 node 37 query expression processing module 2512

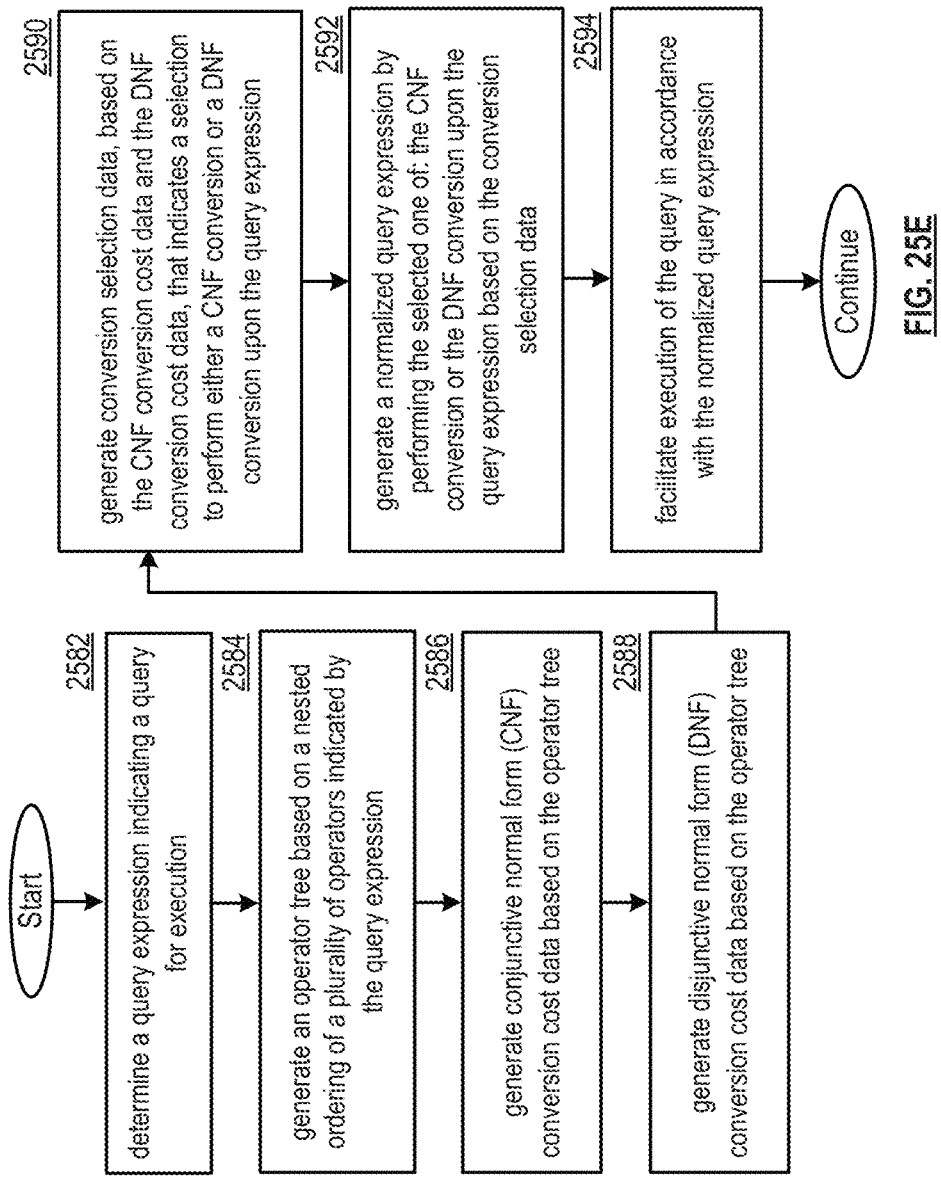

node 37

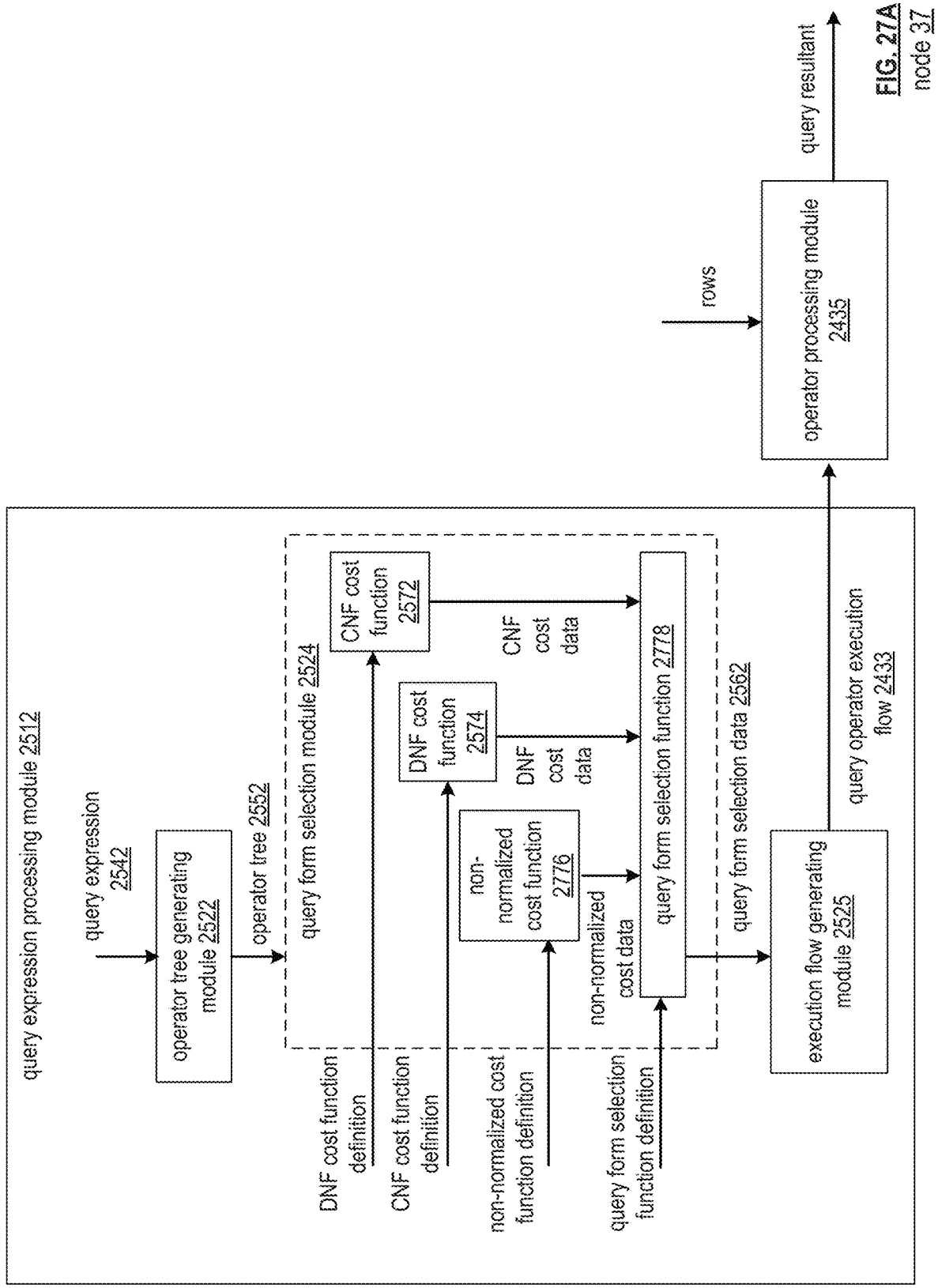

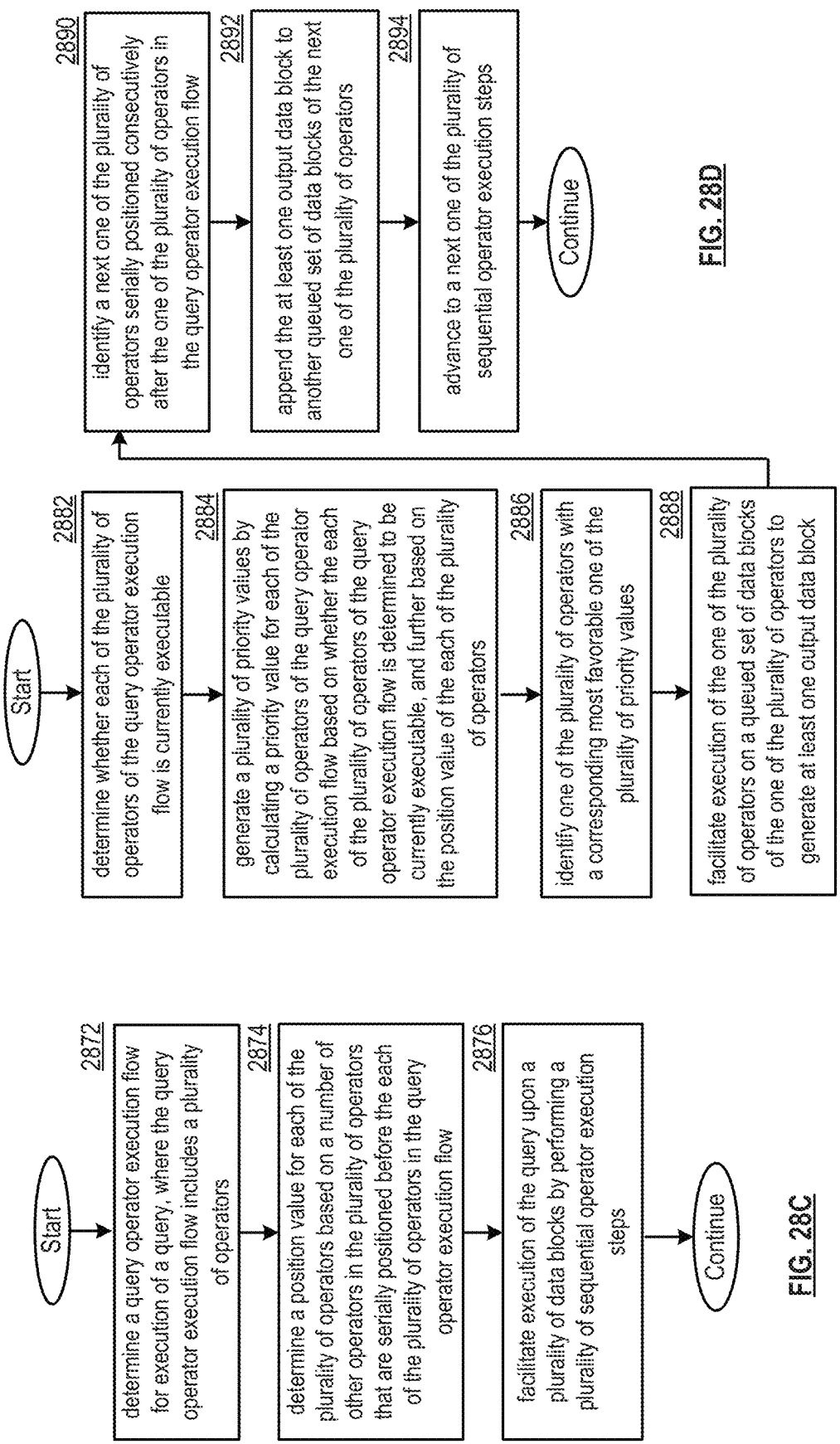

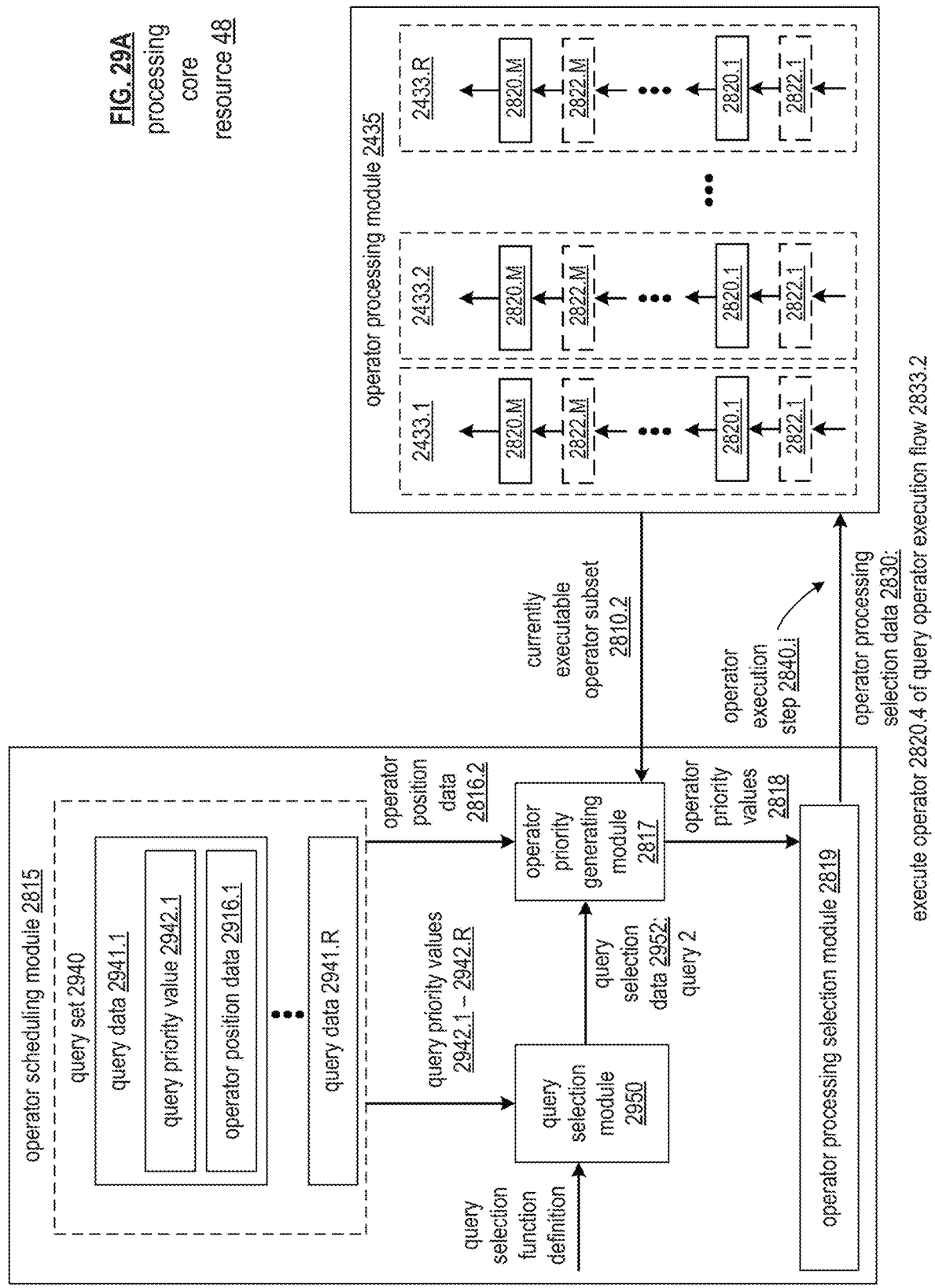

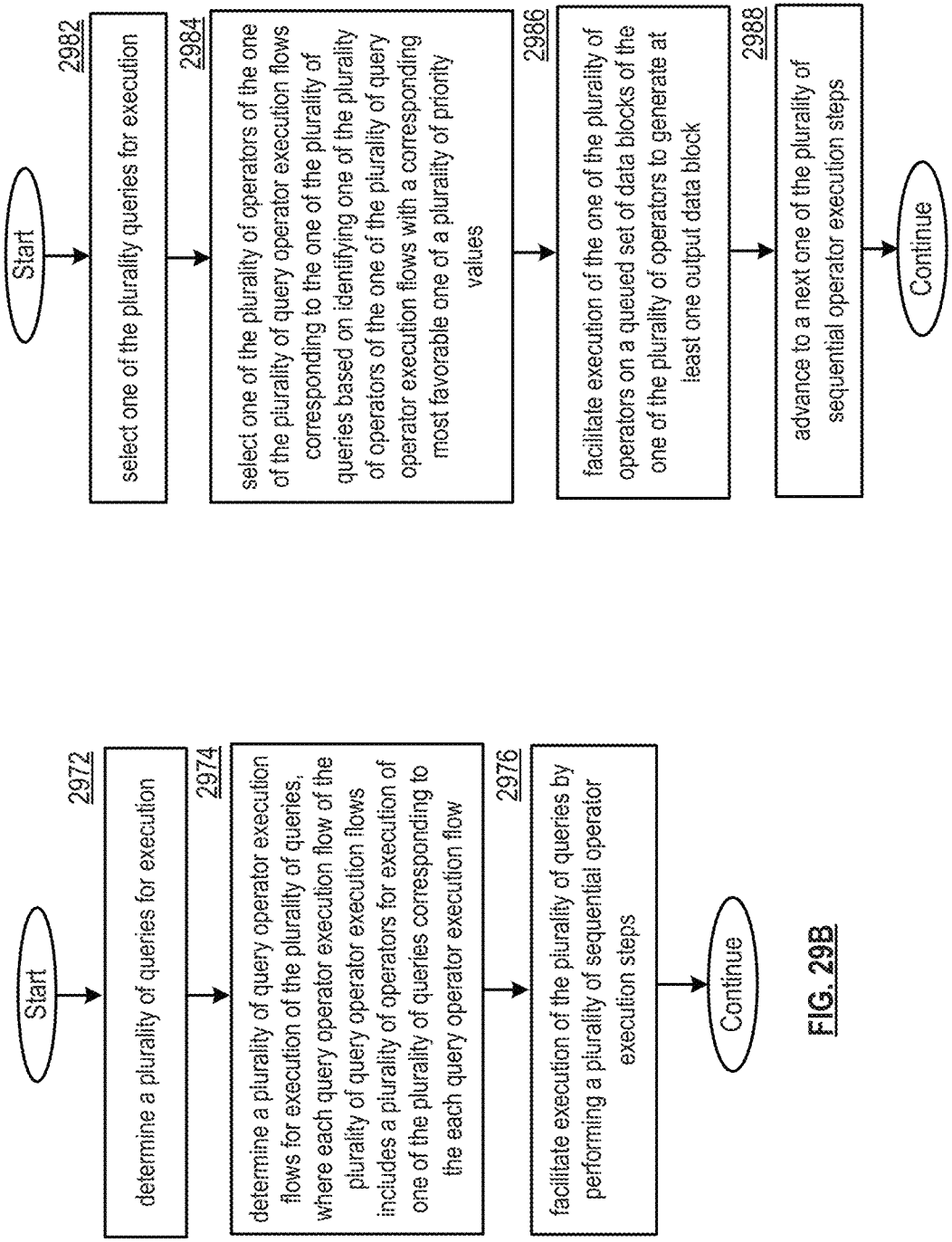

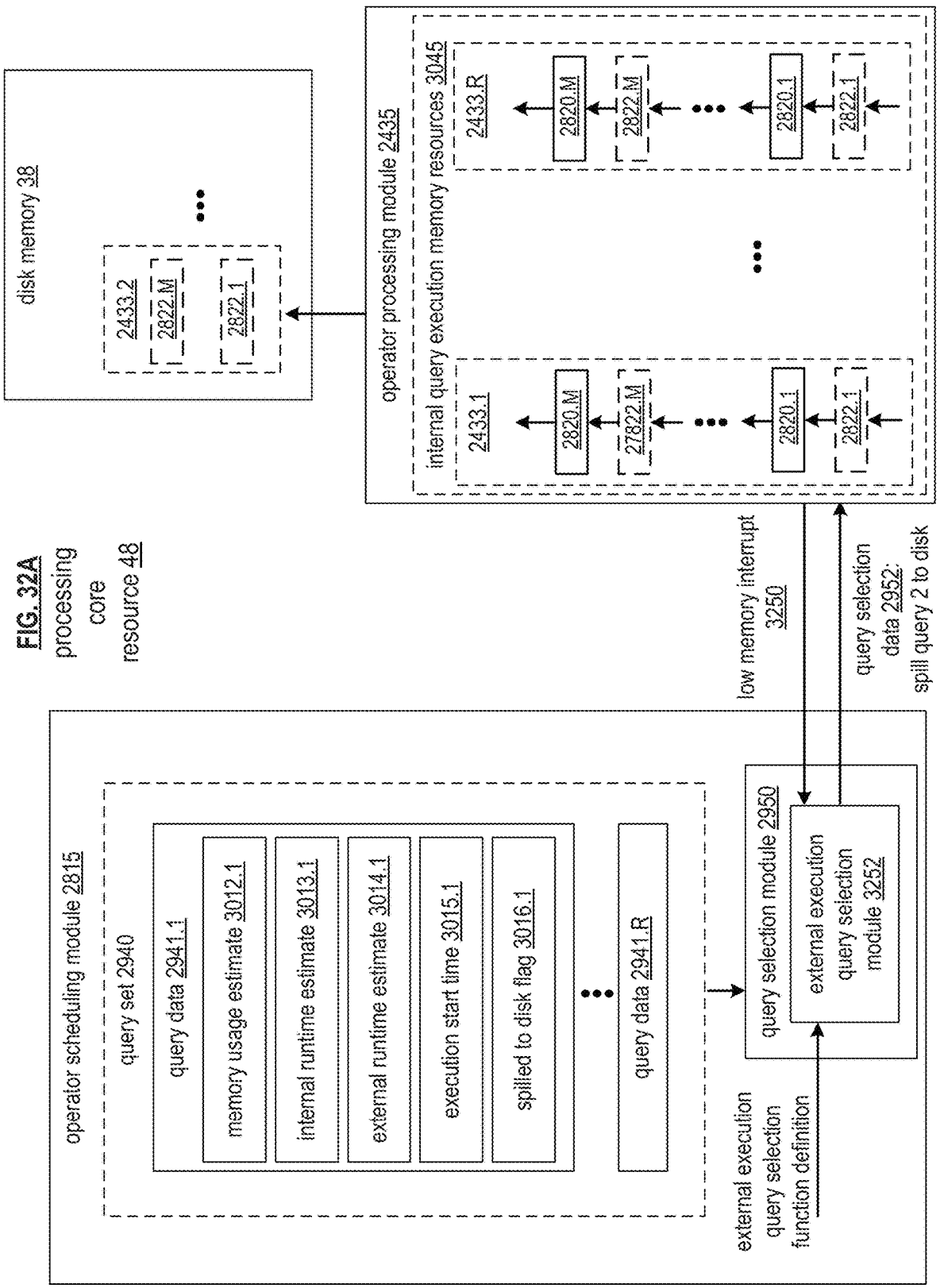

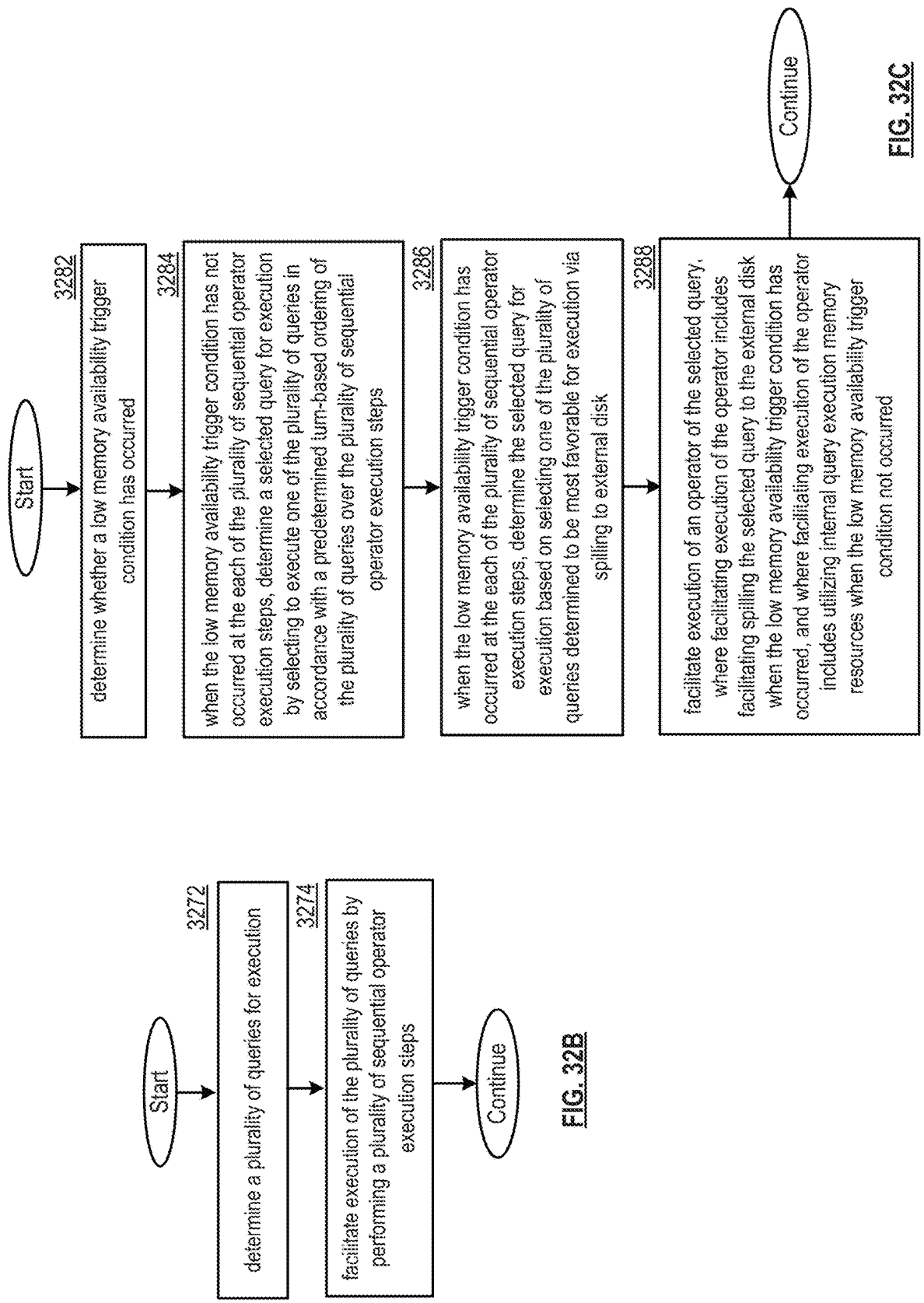

METHOD AND DATABASE SYSTEM FOR GENERATING A QUERY OPERATOR EXECUTION FLOW

CROSS-REFERENCE TO RELATED APPLICATIONS

The present U.S. Utility Patent Application claims priority pursuant to 35 U.S.C. § 120 as a continuation of U.S. Utility application Ser. No. 16/720,481, entitled "SELECTING A NORMALIZED FORM FOR CONVERSION OF A QUERY EXPRESSION", filed Dec. 19, 2019, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIG. 1 is a schematic block diagram of an embodiment of a large scale data processing network that includes a database system in accordance with the present invention;

FIG. 4 is a schematic block diagram of an embodiment of a parallelized data input sub-system in accordance with the present invention;

FIG. 25E is a logic diagram illustrating a method of selecting a normalized form for conversion of a query expression in accordance with various embodiments of the present invention;

FIG. 27A is a schematic block diagrams of a node that implements a query expression processing module and an operator processing module in accordance with various embodiments of the present invention;

FIGS. 28C and 28D are logic diagrams illustrating a method of scheduling a plurality of operator executions to facilitate execution of a query in accordance with various embodiments of the present invention;

FIG. 29A is a schematic block diagrams of a processing core resource that implements an operator scheduling module and an operator processing module in accordance with various embodiments of the present invention;

FIGS. 29B and 29C are logic diagrams illustrating a method of scheduling a plurality of operator executions to facilitate execution of a plurality of concurrently executing queries in accordance with various embodiments of the present invention;

FIG. 32A is a schematic block diagrams of a processing core resource that implements an operator scheduling module and an operator processing module in accordance with various embodiments of the present invention; and FIGS. 32B and 32C are logic diagrams illustrating a method of scheduling a query to be spilled to disk memory in accordance with various embodiments of the present invention.

DETAILED DESCRIPTION OF THE INVENTION

Figure 1A:
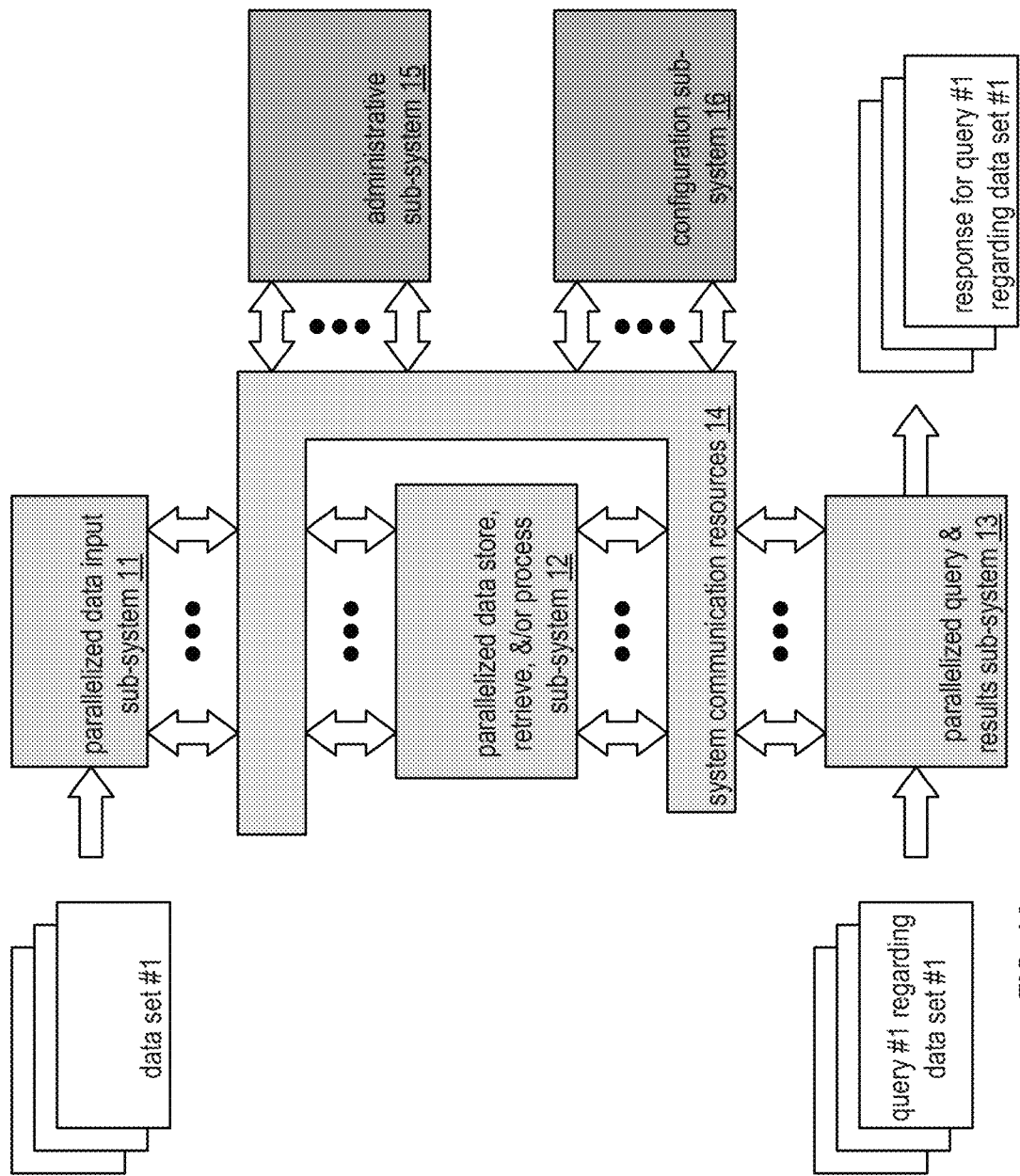
FIG. 1A is a schematic block diagram of an embodiment of a database system in accordance with the present invention.

FIG. 1 is a schematic block diagram of an embodiment of a large-scale data processing network that includes data gathering devices (1, 1-1 through 1-n), data systems (2, 2-1 through 2-N), data storage systems (3, 3-1 through 3-n), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may be also be referred to as a data input sub-system, the parallelized data store, retrieve, and/or process sub-system may be also be referred to as a data storage and processing sub-system, and the parallelized query and response sub-system 13 may be also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
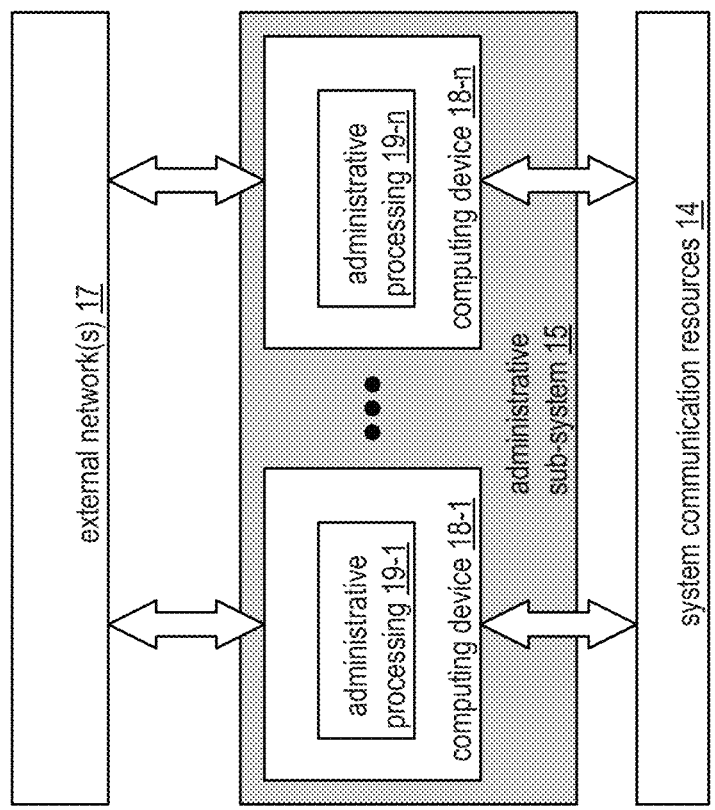
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
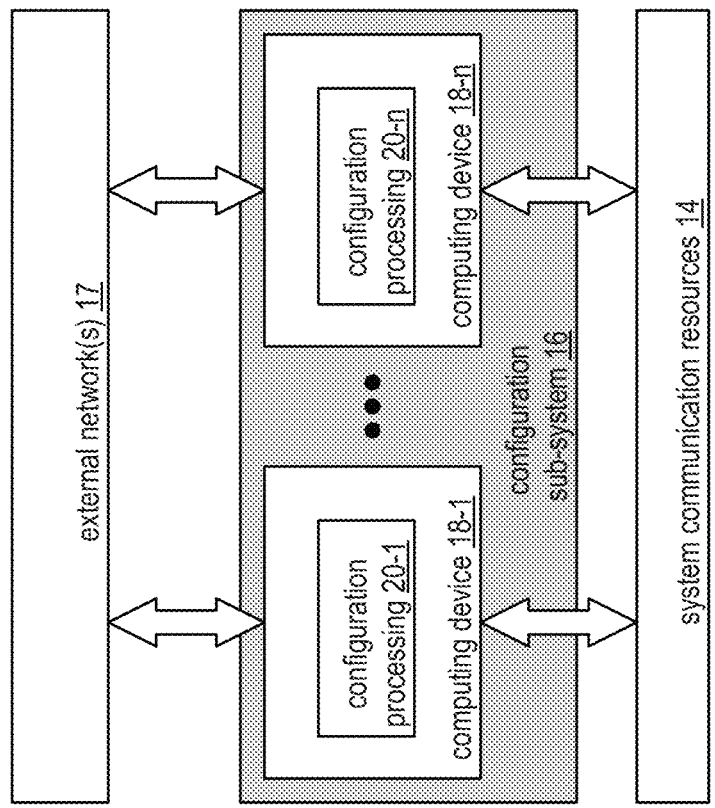
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
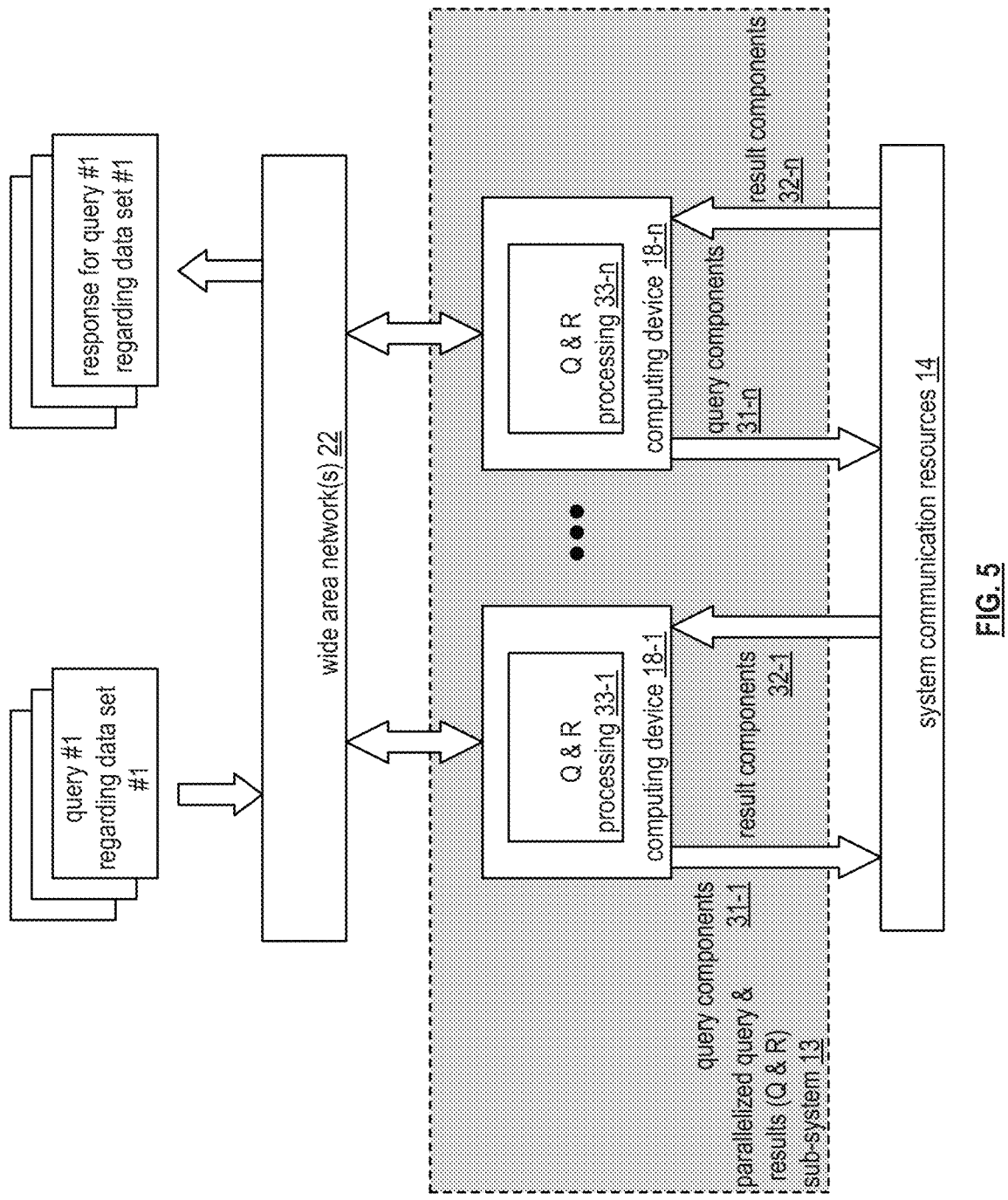
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
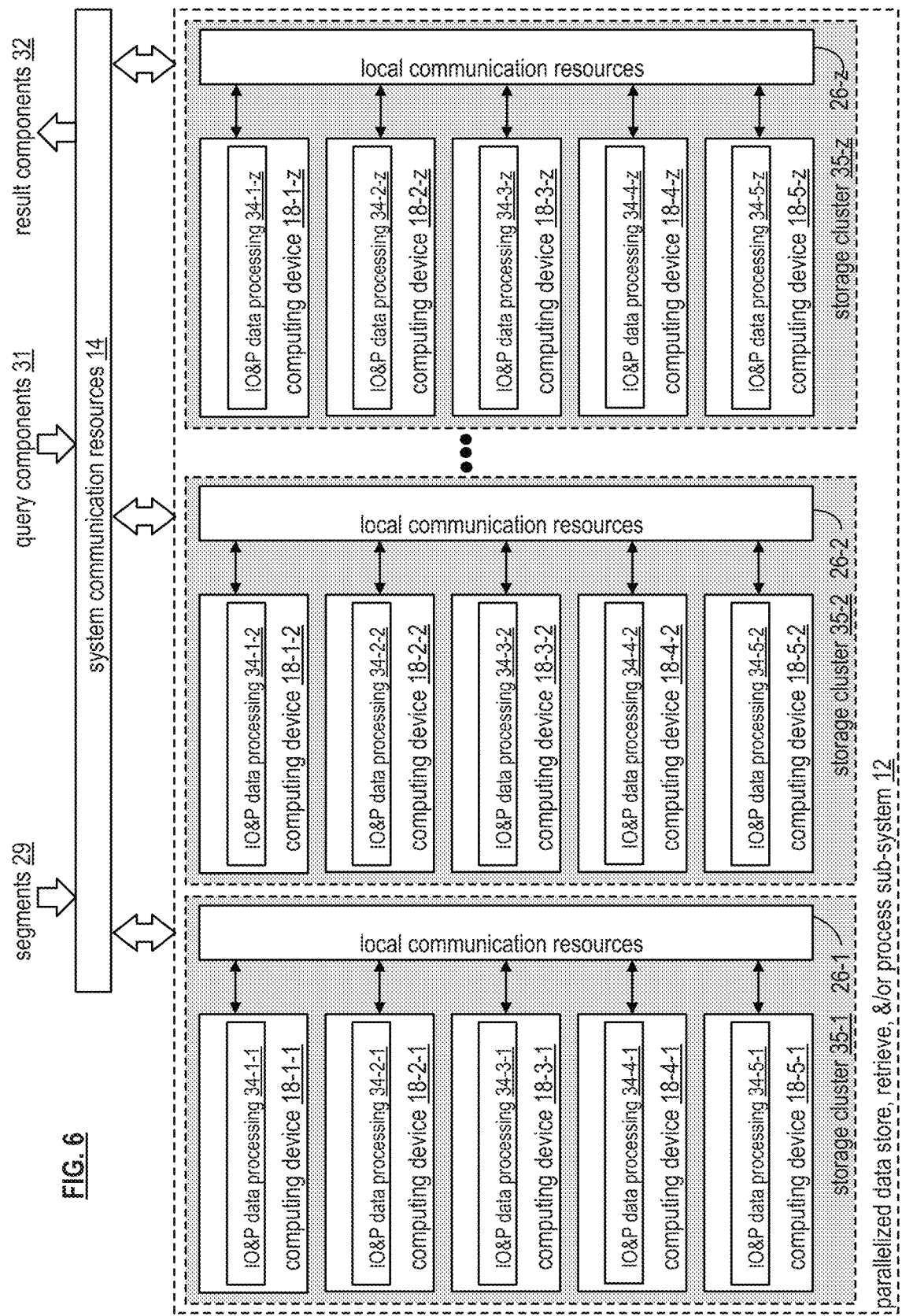
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (TO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1 is storing and/or processing a second segment group while it is storing/or and processing a first segment group.

Figure 7:
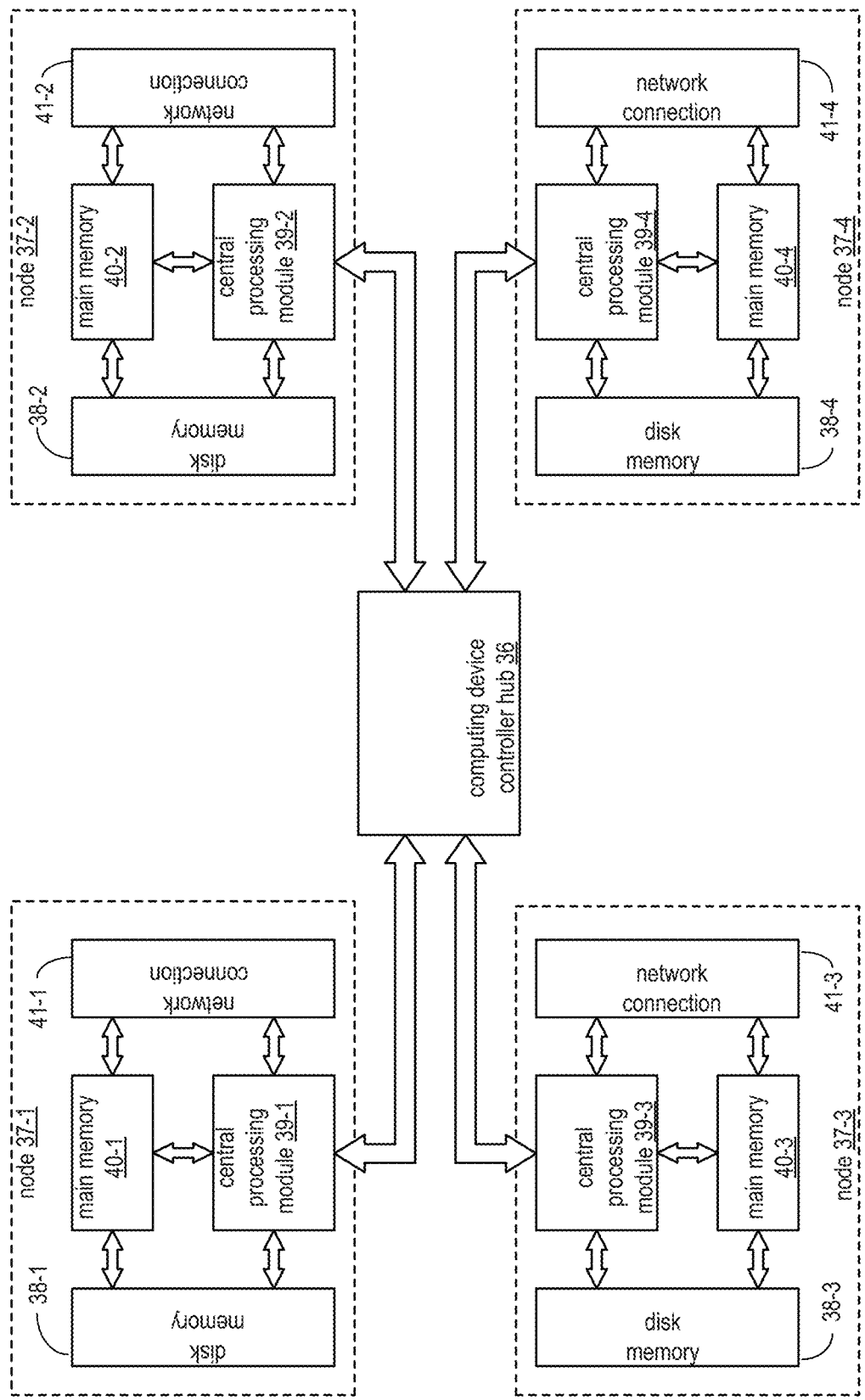
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
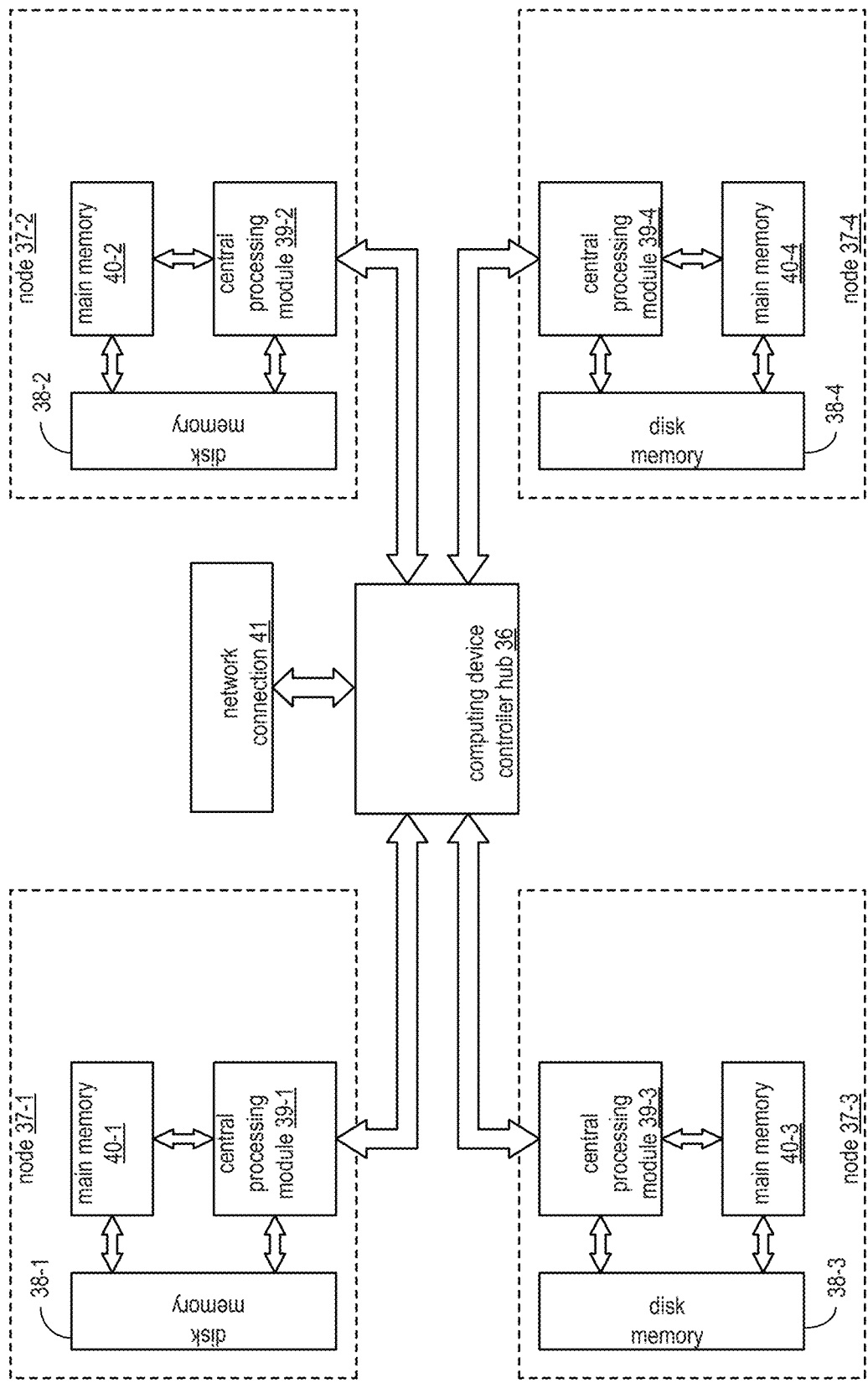
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
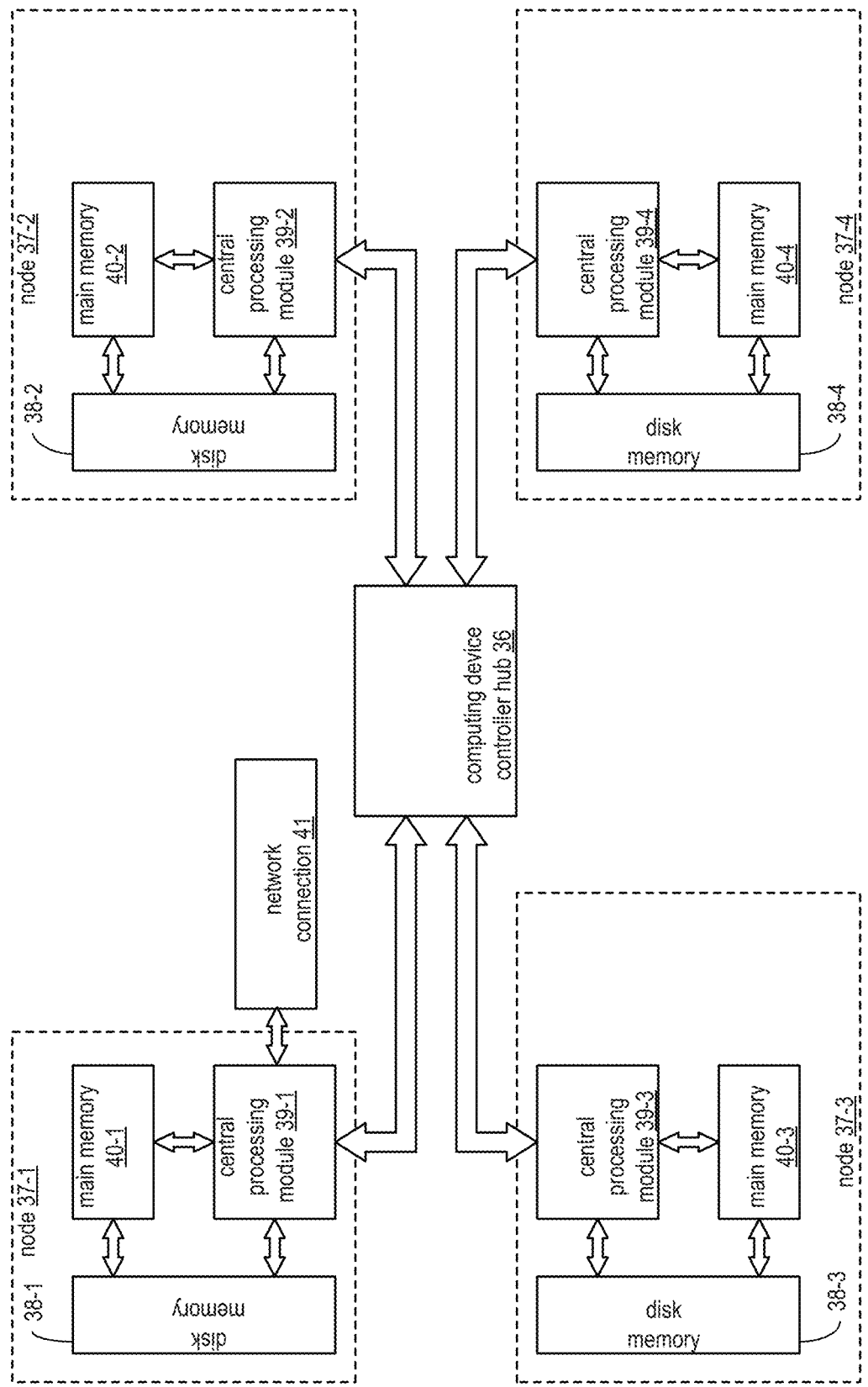
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
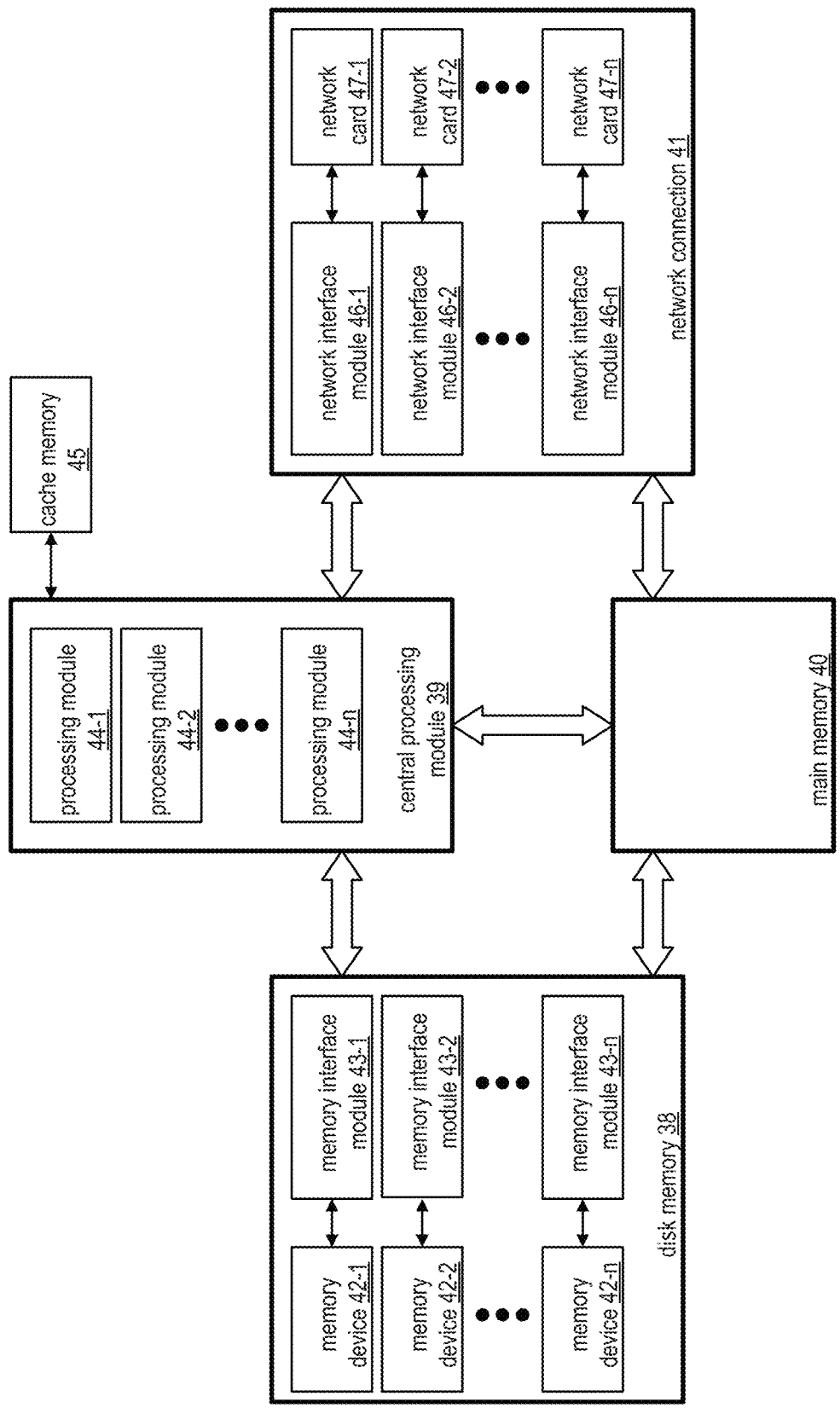
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-n (e.g., non-volatile memory). The memory devices 42-1 through 42-n include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-n and a plurality of network cards 47-1 through 47-n. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-n include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
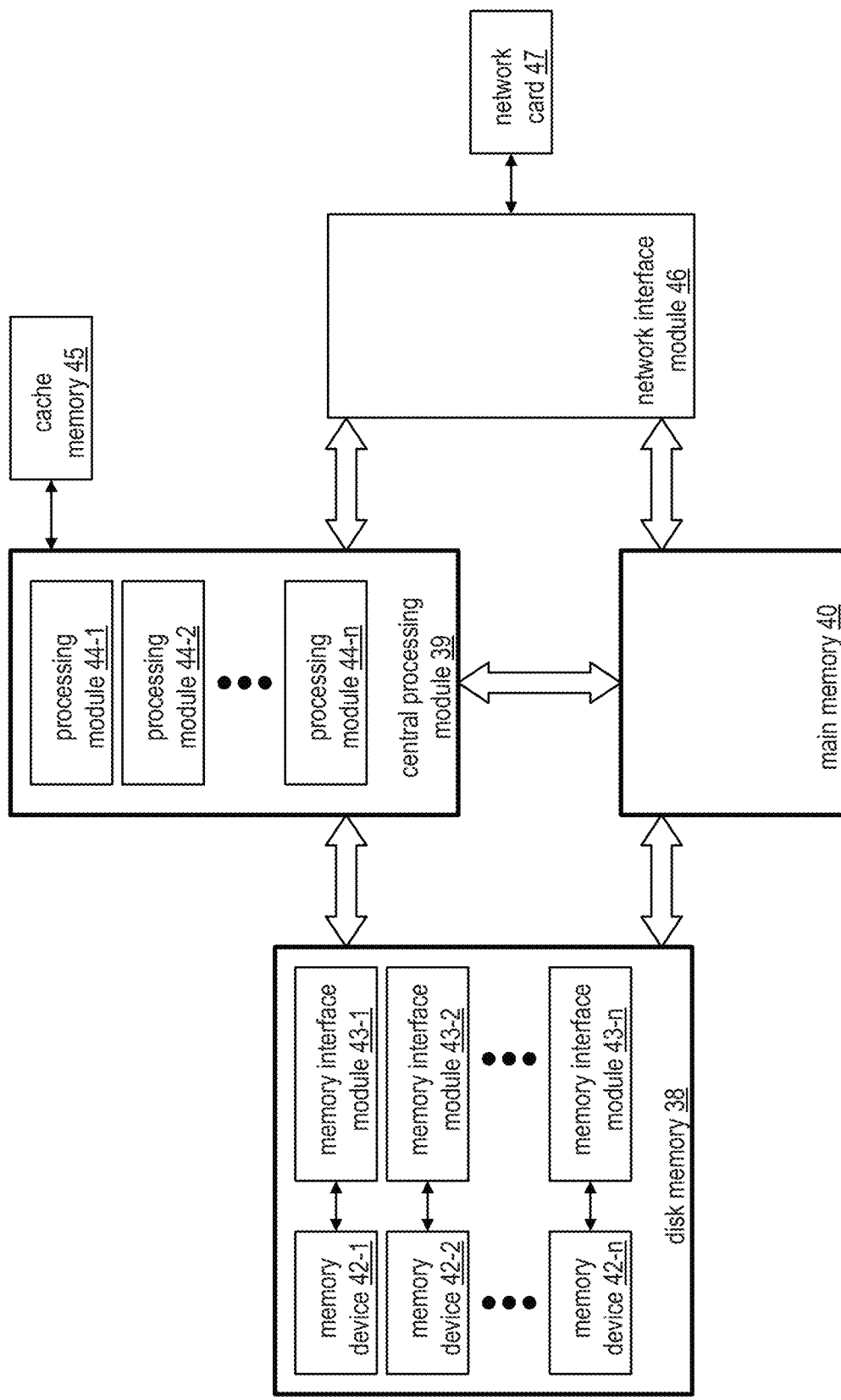
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
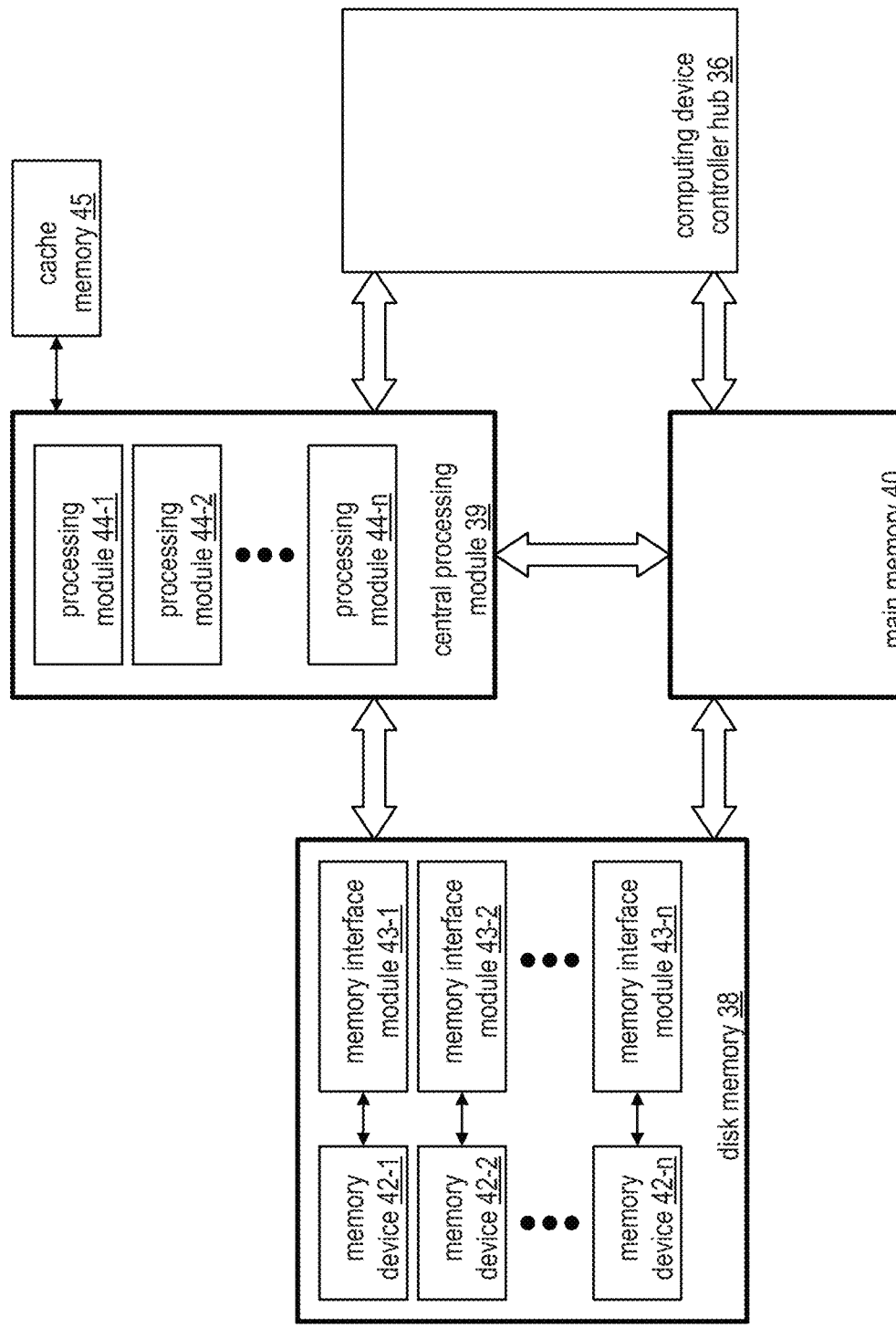
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
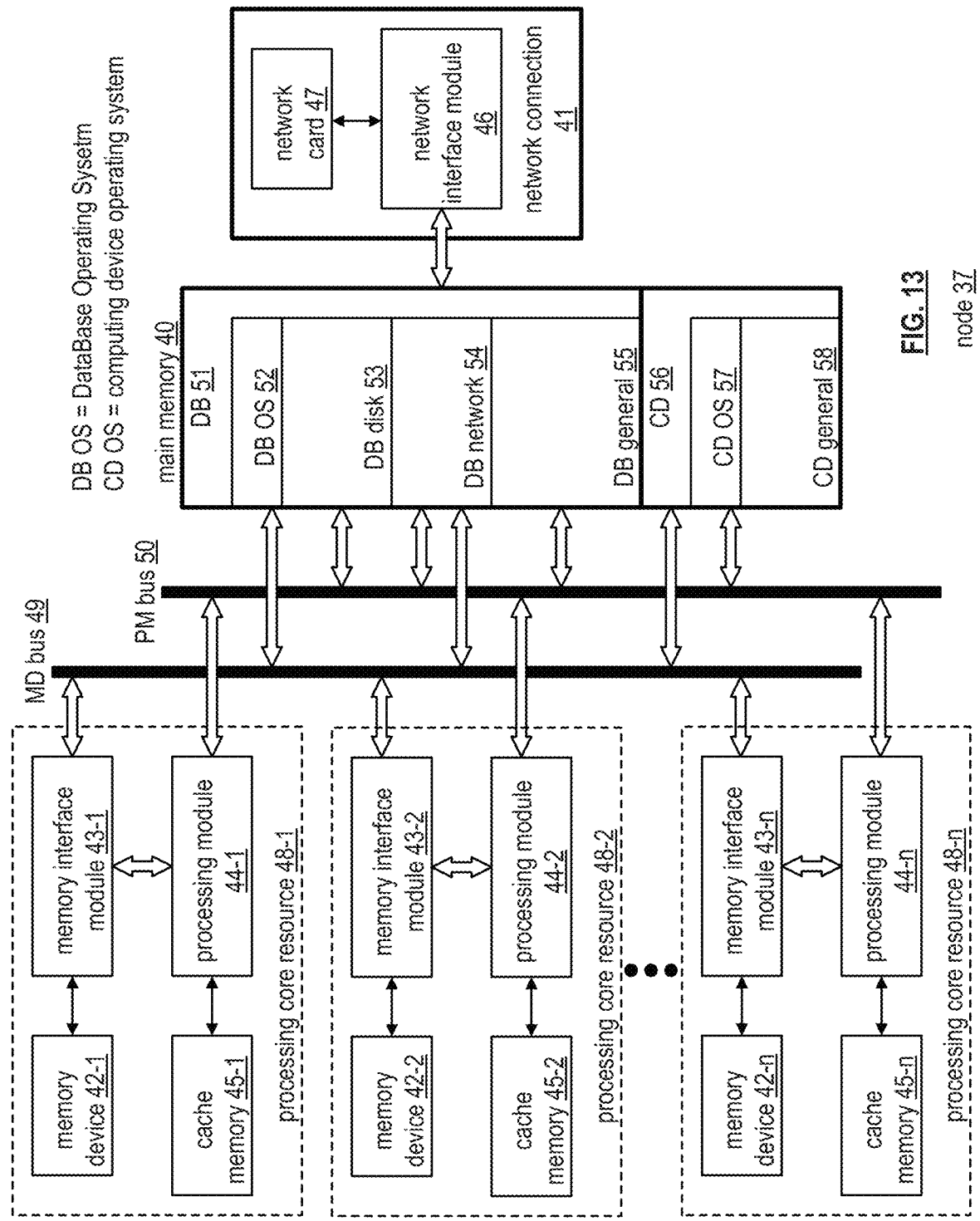
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-n, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-n, a corresponding memory interface module 43-1 through 43-n, a corresponding memory device 42-1 through 42-n, and a corresponding cache memory 45-1 through 45-n. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
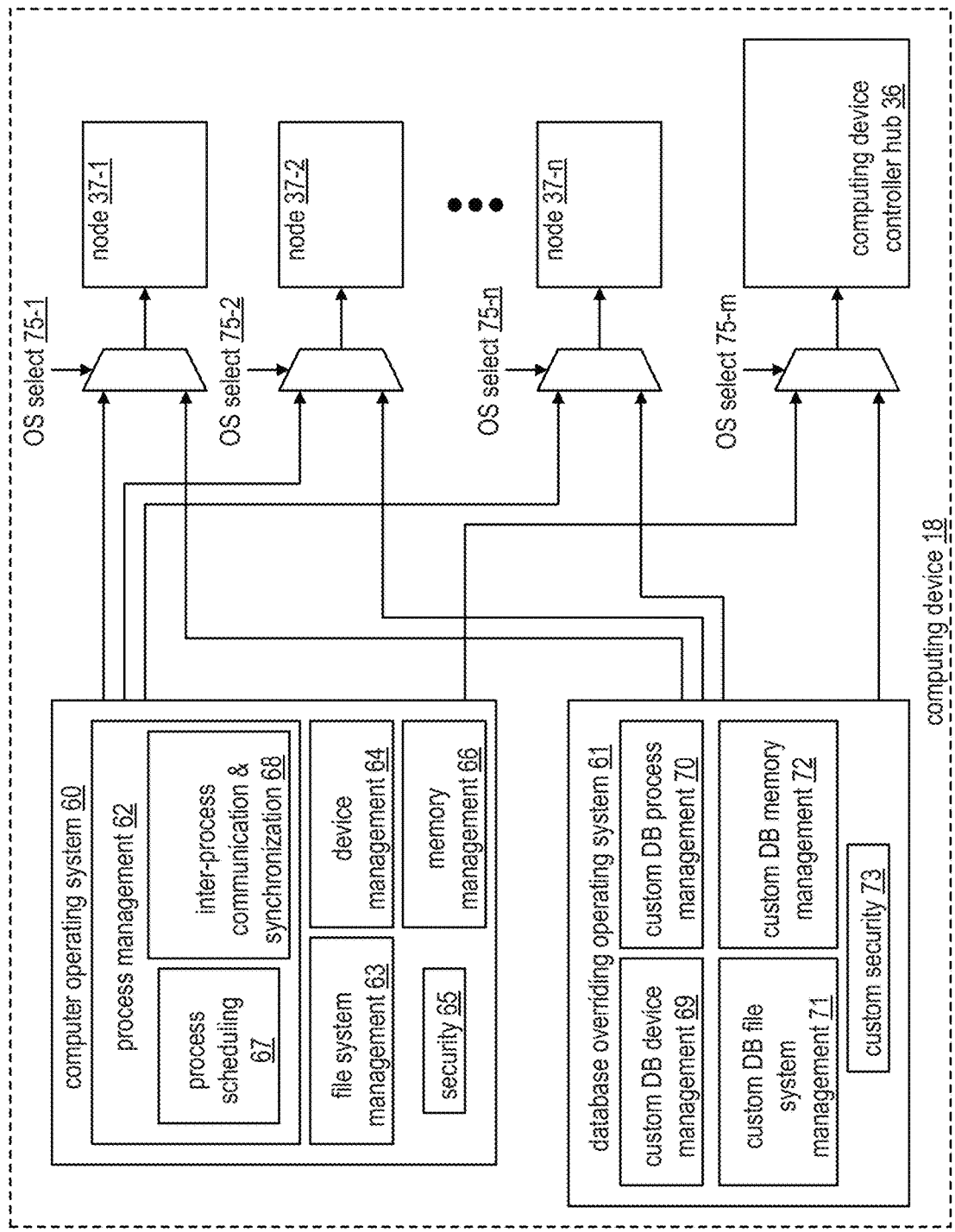
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-n when communicating with nodes 37-1 through 37-n and via OS select 75-m when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

Figure 15:
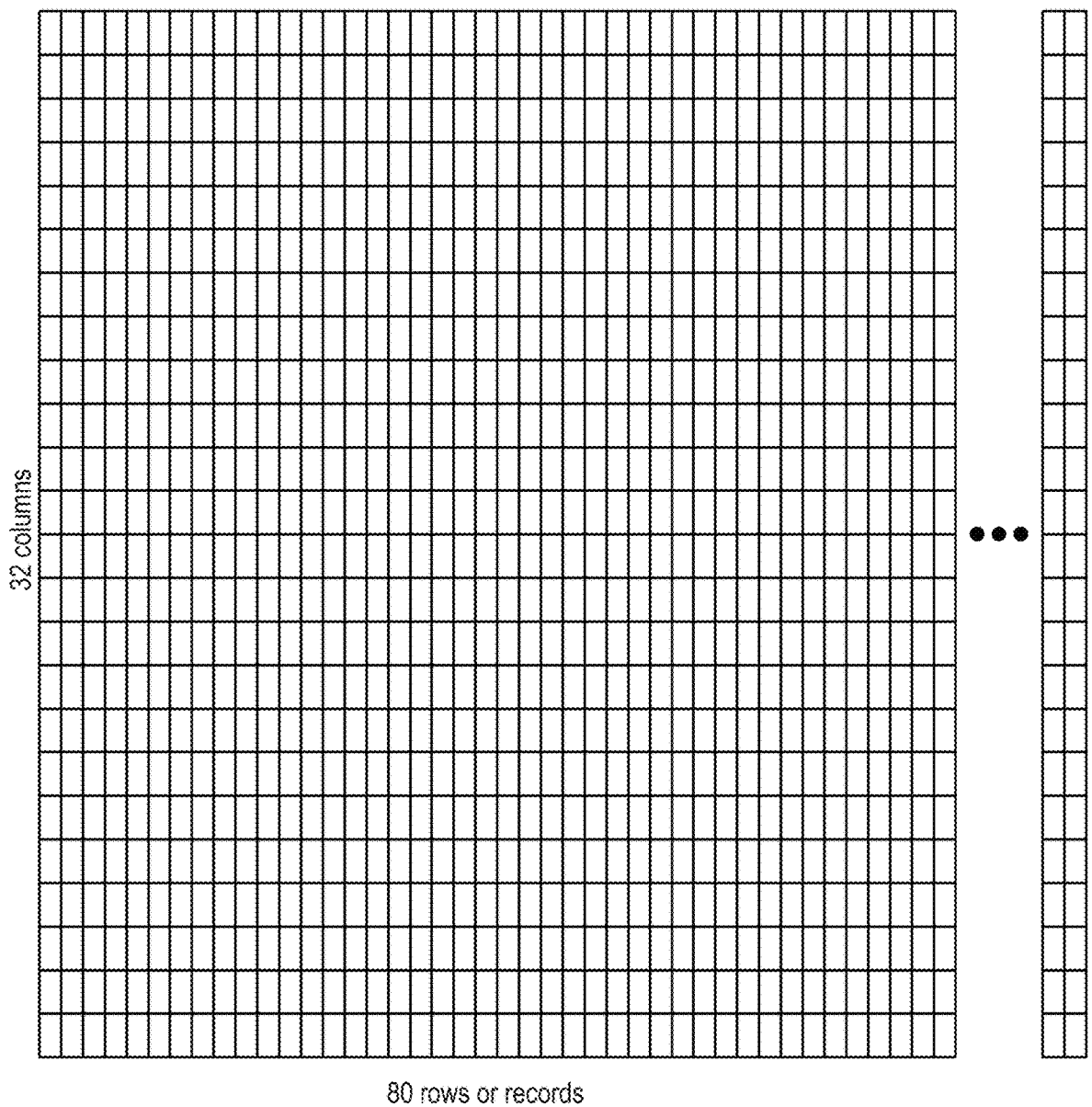
FIGS. 15-23 are schematic block diagrams of an example of processing a table or data set for storage in the database system in accordance with the present invention.

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
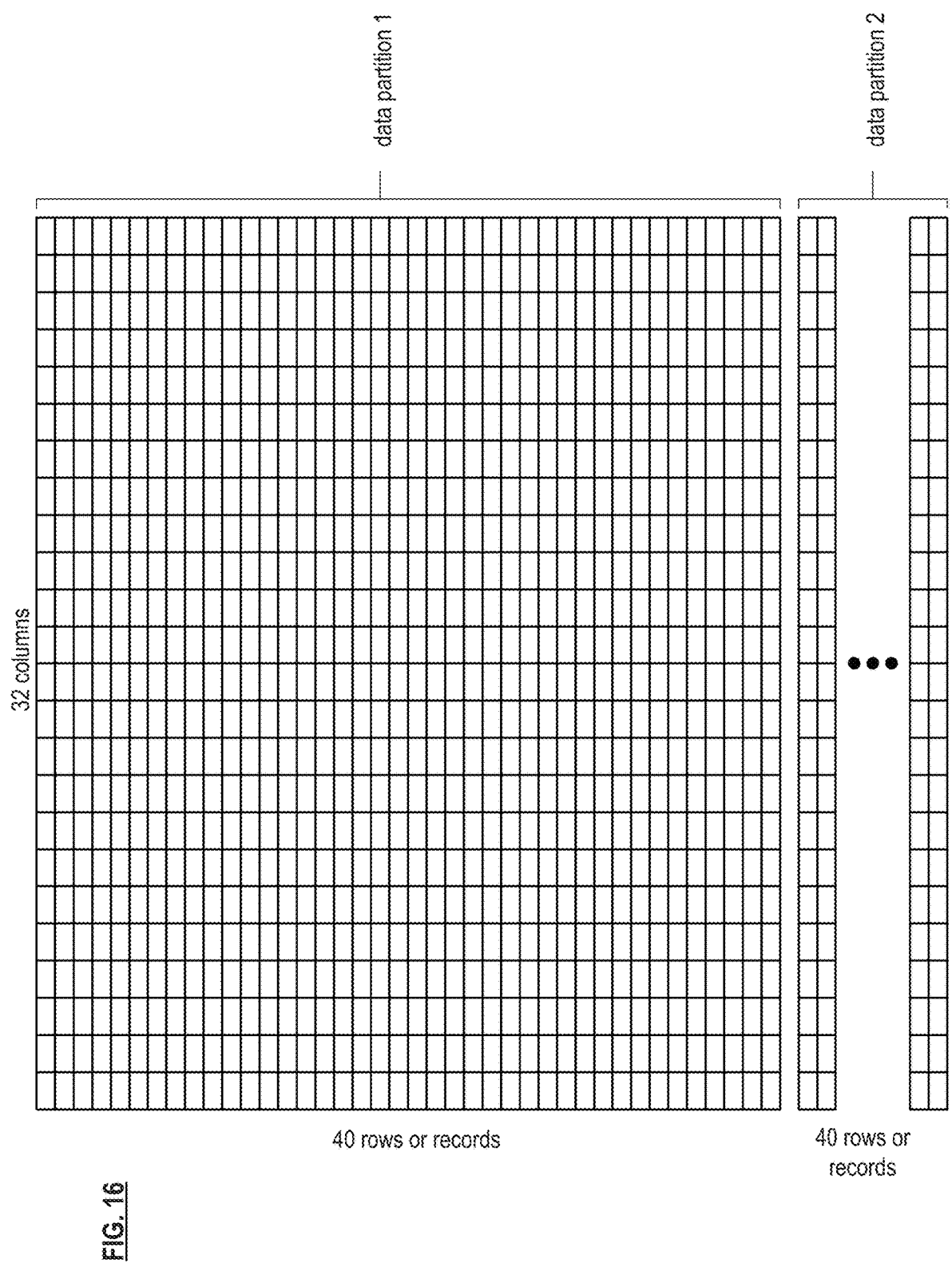

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
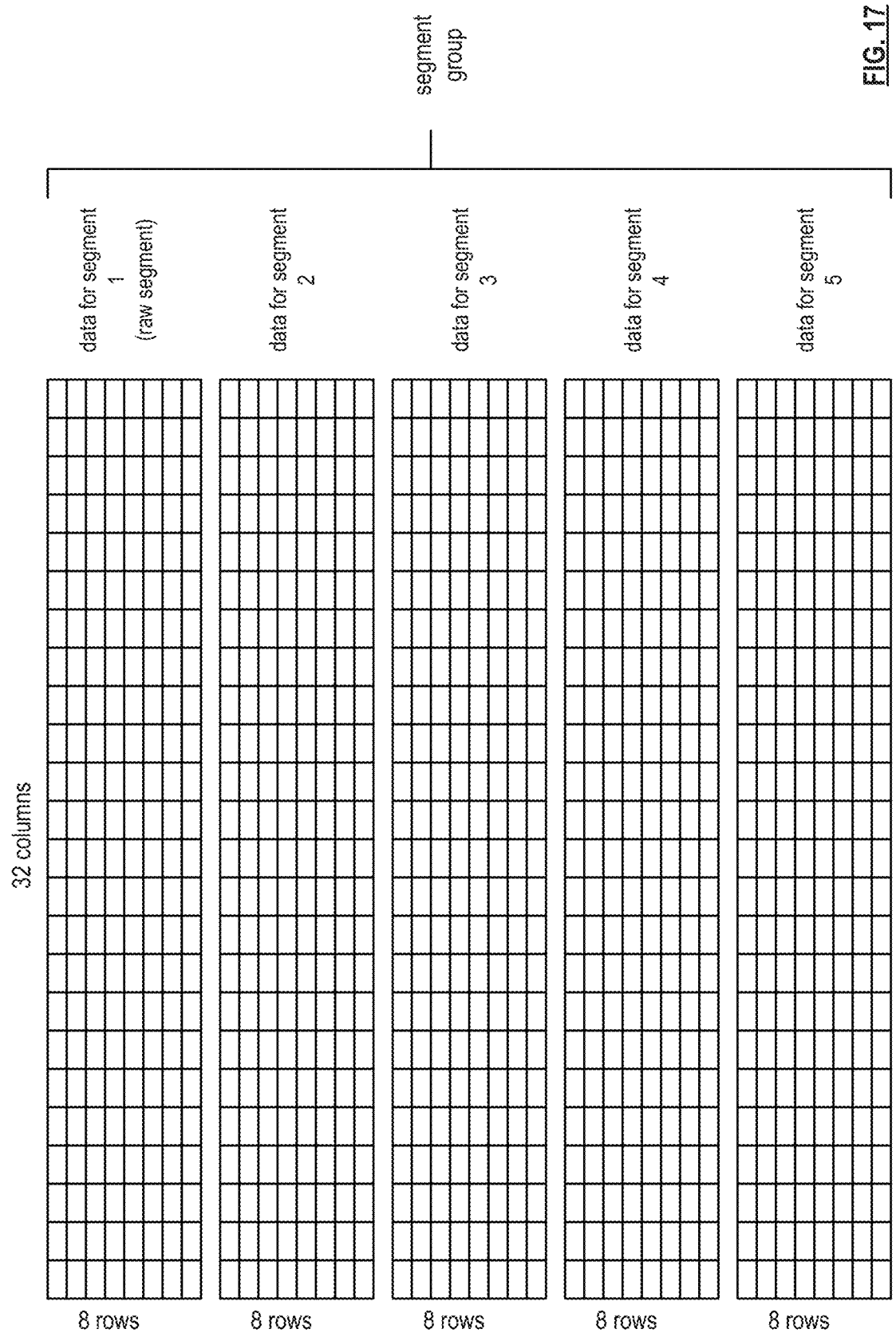

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figures 18, 19, 20:
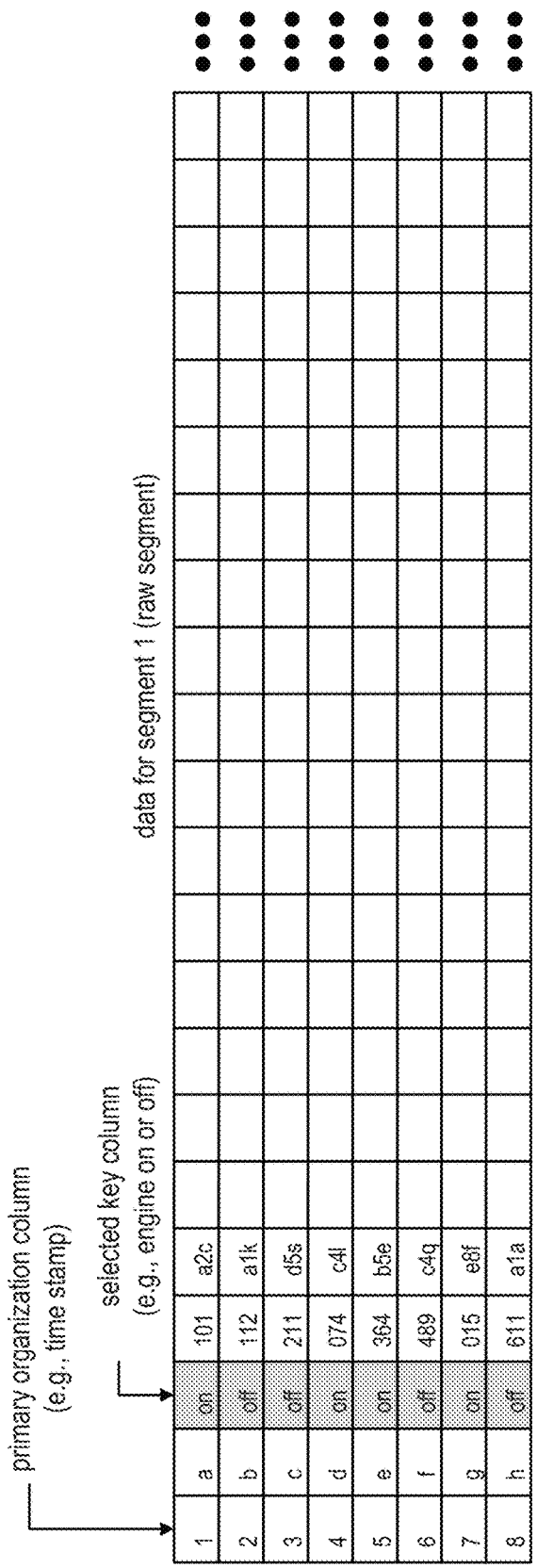

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
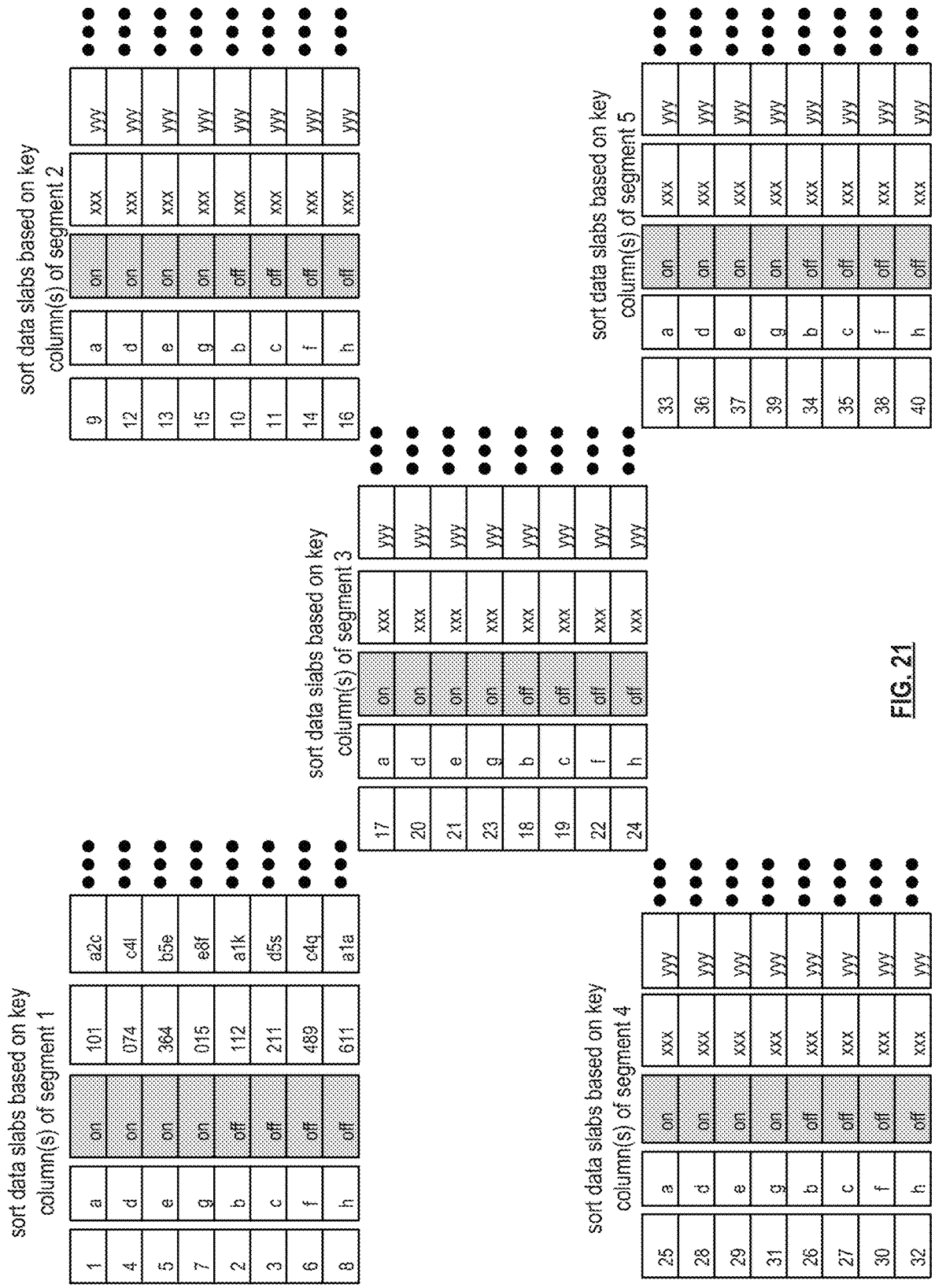

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
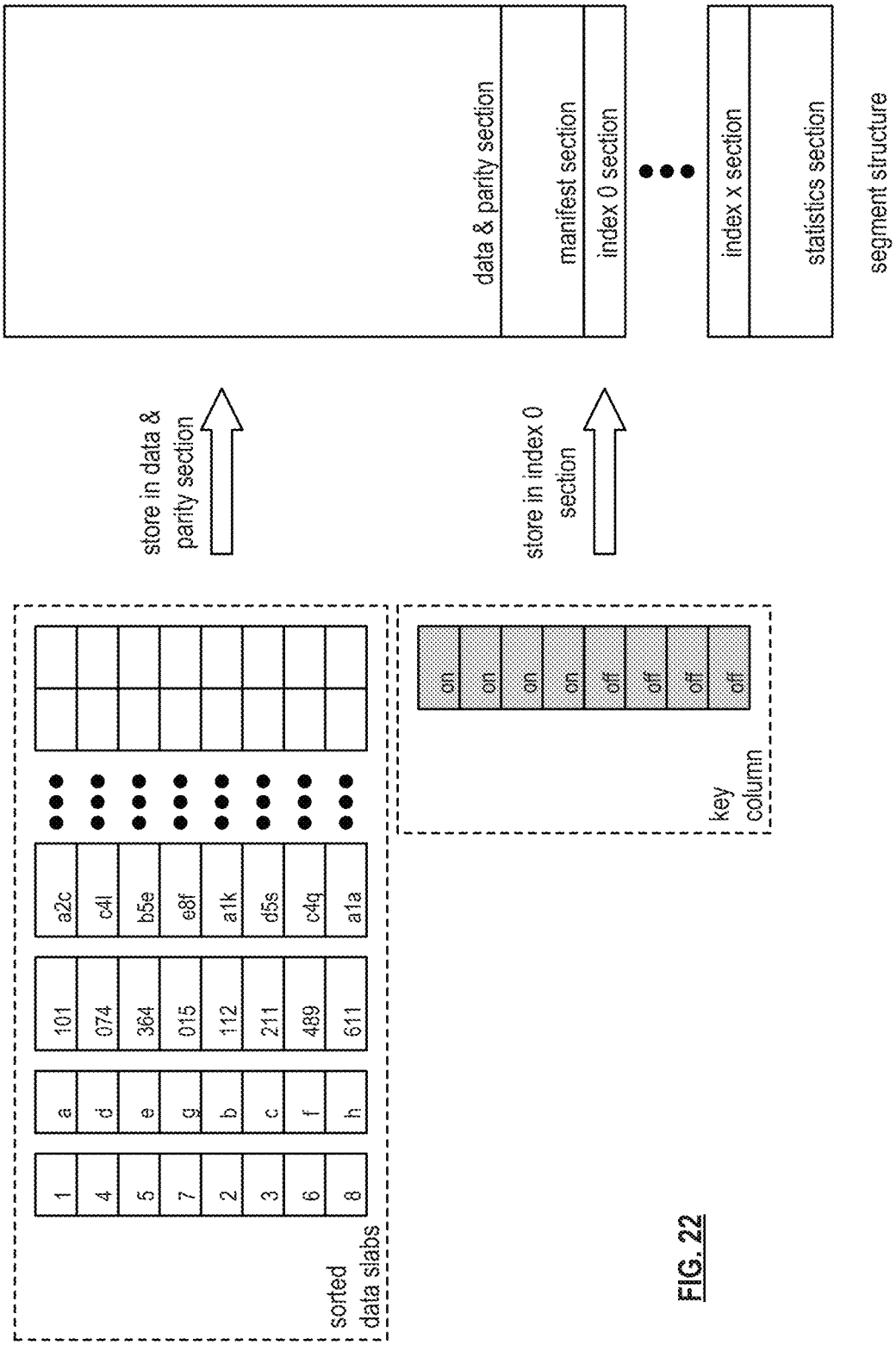

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within in coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
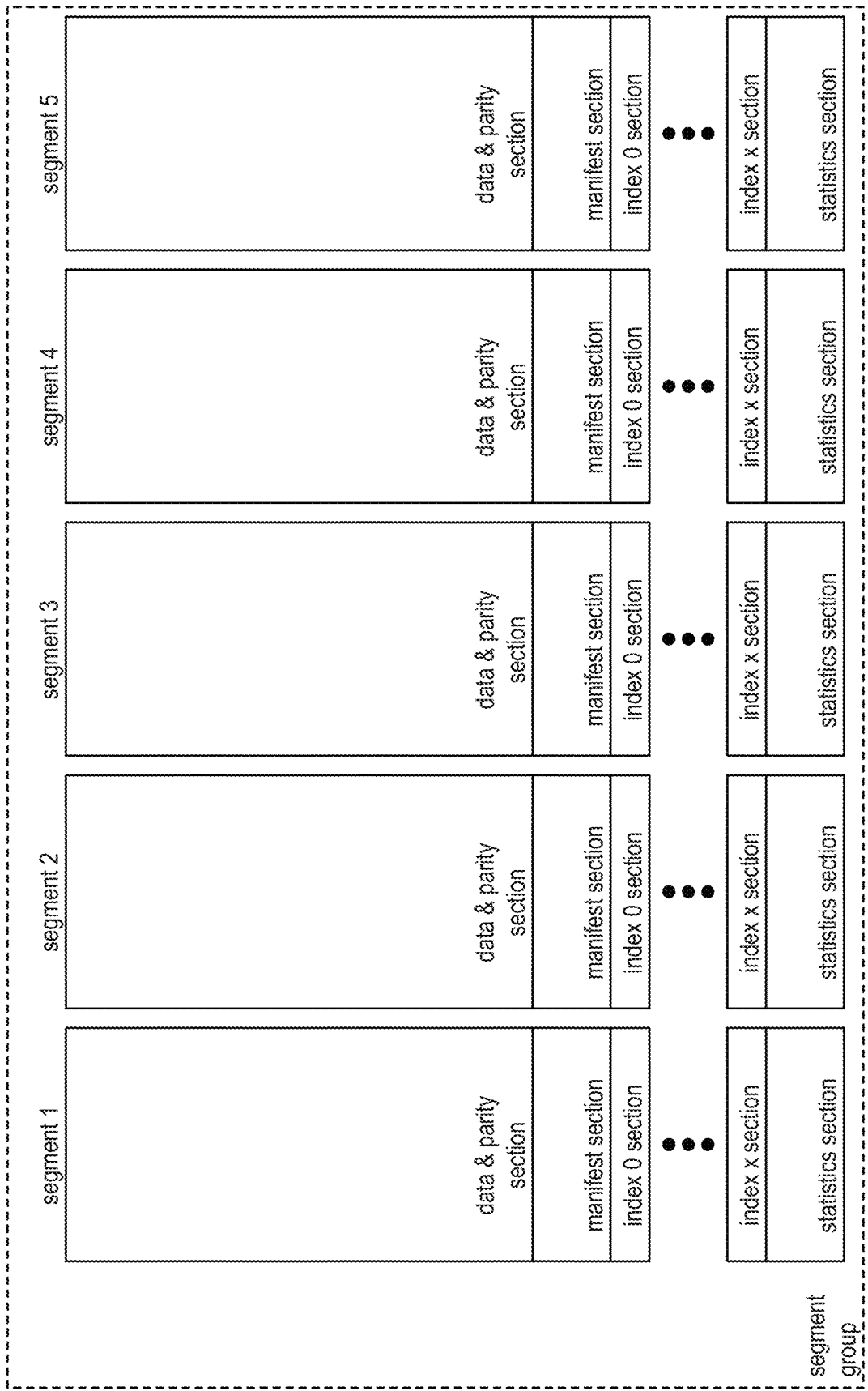

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
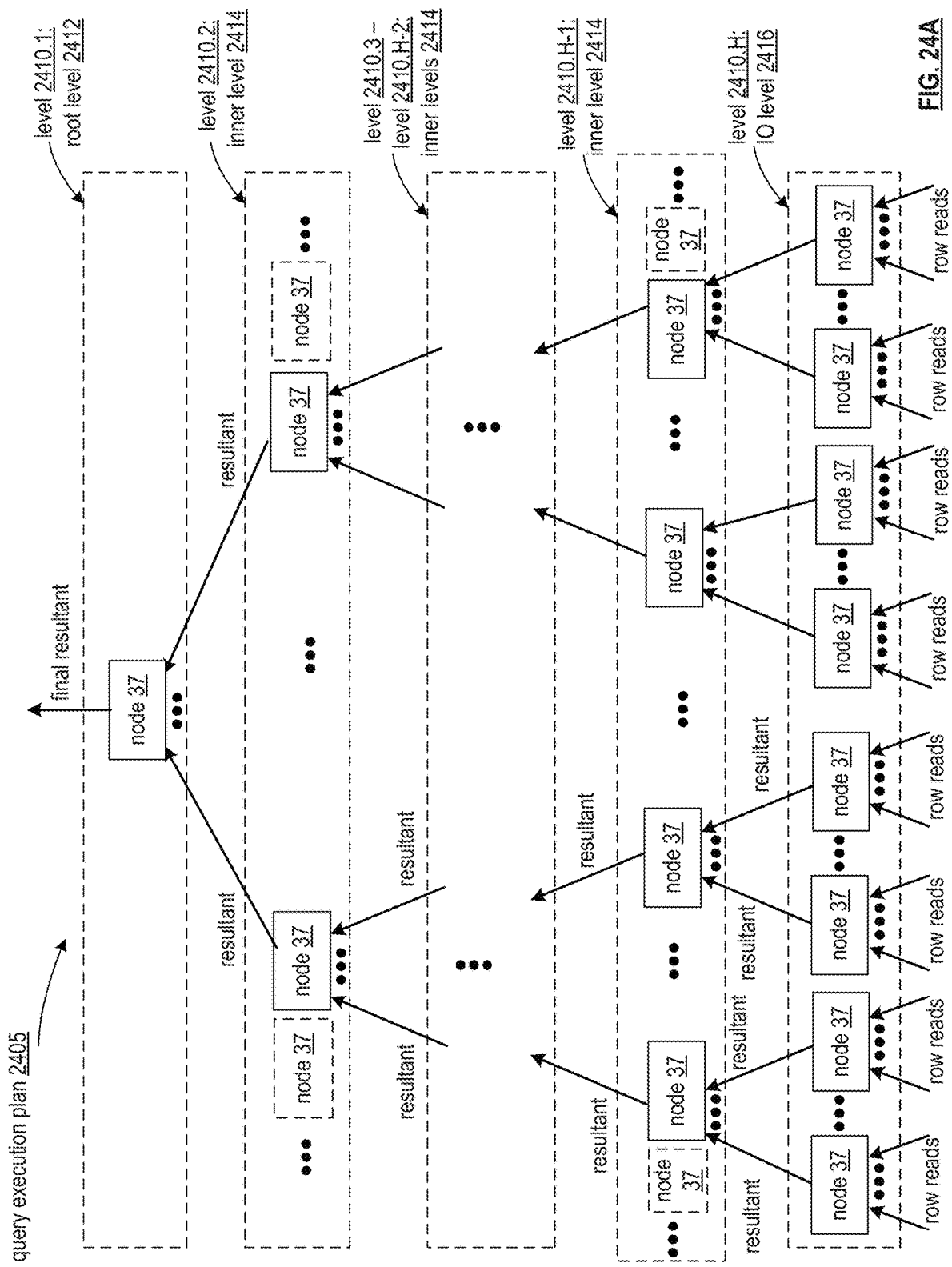
FIG. 24A is a schematic block diagram of a query execution plan in accordance with various embodiments of the present invention.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-$n$, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-

2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
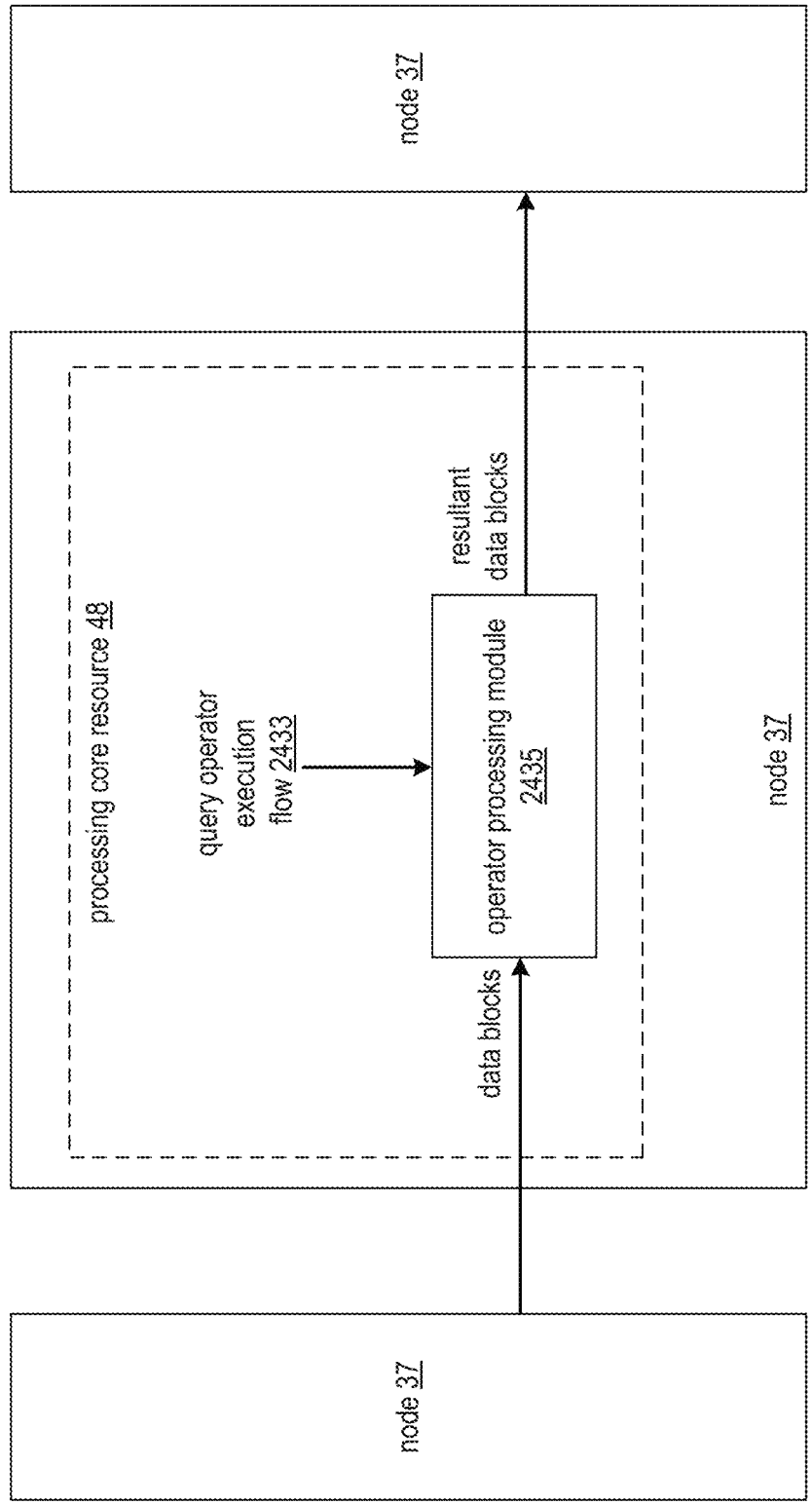
FIG. 24B is a schematic block diagrams of a node that implements an operator processing module in accordance with various embodiments of the present invention.

FIG. 24B illustrates an embodiment of a node 37 executing a query in accordance with the query execution plan 2405 by implementing an operator processing module 2435. The operator processing module 2435 can operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes an operator processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2416 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2412 can be gathered into a final result of the query, for example, by the node 37 at root level 2412 if this inner level is the top-most inner level 2414 or the only inner level 2414. As another example, resultants generated by each of the plurality of nodes at this inner level 2412 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the operator processing module 2435 can be implemented by a single processing core resource 48 of the node 37, for example, by utilizing a corresponding processing module 44. In such embodiments, each one of the processing core resources 48-1-48-n of a same node 37 can be executing at least one query concurrently via their own operator processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query. Alternatively, the operator processing module 2435 can be implemented can be implemented via multiple processing core resources 48 and/or via one or more other processing modules of the node 37.

FIGS. 25A-25D present an embodiments of a query expression processing module 2512 that is operable to generate the query operator execution flow 2433 of FIG. 24B. In particular, a given query expression, for example, received via user input, may present a plurality of operators of the query in a non-normalized form. The query expression processing module 2512 discussed in conjunction with FIGS. 25A-25D can be operable to convert the given query expression into a normalized form and is operable to generate the query operator execution flow 2433 in accordance with the normalized form.

Figure 25A:
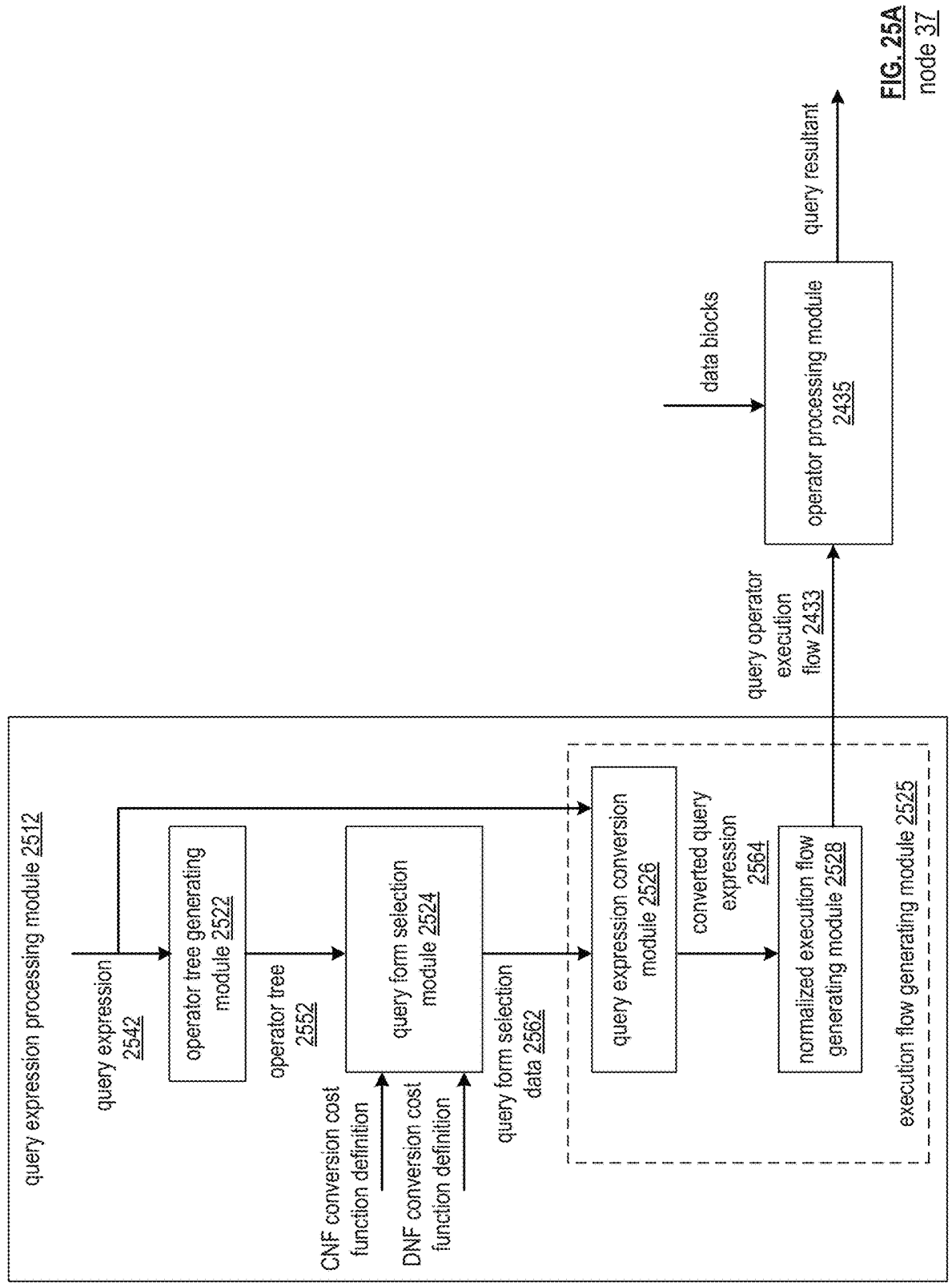
FIG. 25A is a schematic block diagrams of a node that implements a query expression processing module and an operator processing module in accordance with various embodiments of the present invention.

FIG. 25A illustrates an embodiment where the query expression processing module 2512 is implemented by node 37, for example, where some or all nodes 37 discussed herein are operable to implement the query expression processing module 2512. In such embodiments, all query expression processing modules 2512 implemented by all nodes at a same level of the query execution plan 2405 can be operable to deterministically generate query operator execution flows 2433 in the same fashion, for example, where each node at this same level of the query execution plan 2405 independently determines the same query operator execution flows 2433 for its execution of a same given query. In some embodiments, the query expression processing modules 2512 can be implemented by the core processing resource 48 utilized to implement the corresponding operator processing module 2435, where each one of a set of query expression processing modules 2512-1-2512-*n* and a corresponding one of a corresponding set of operator processing modules 2435-1-2435-*n* are implemented by one of the set of processing core resources 48-1-48-*n*. At least one processing module 44 and/or at least one other processing module of the node 37 can be otherwise utilized to implement the query expression processing module 2512.

In other embodiments, the query expression processing module 2512 can be alternatively implemented by another one or more processing modules of the database system 10, such as a centralized processing module that communicates with multiple nodes 37, such as some or all nodes at a same level of the query execution plan 2405 or some or all nodes across multiple levels of the query execution plan 2405. For example, the query operator execution flow 2433 can be generated and/or otherwise determined by a centralized processing module for a given query via the query expression processing module 2512 as discussed herein. A notification indicating the query operator execution flow 2433 determined by the query expression processing module 2512 can be sent by the centralized processing module to multiple nodes of the query execution plan 2405, where these nodes utilize this query operator execution flow 2433 indicated in the notification received from the centralized processing module for the given query to process the given query. The query expression processing module 2512 can otherwise be implemented utilizing processing resources of the parallelized query and results sub-system 13.

Rather than converting every query expression in the same fashion to generate all query operator execution flows in accordance with the same normalized form, the query expression processing module 2512 discussed in conjunction with FIGS. 25A-25D is operable to intelligently select the query form that will be utilized for each given query from a plurality of query options, based on determining the cost associated with converting and/or processing the given query in accordance with each of the plurality of query form options. This introduces improvements to database systems that enable faster, more efficient, and/or less memory consumption in query expression conversion and/or query execution. In particular, by selecting a lowest cost query form option for each incoming query for execution, each query can be converted and/or executed in accordance with the most cost-effective option, such as the fastest option, the least memory-intensive option, and/or otherwise the most efficient option.

For example, this plurality of query form options can include conjunctive normal form (CNF form) and disjunctive normal form (DNF form). In particular, some incoming query expressions may be in a non-normalized form that is almost CNF form and/or is easily converted to CNF form. These queries can be significantly more costly to convert to DNF form than CNF form and/or may be significantly more costly to execute in accordance with a DNF query operator execution flow than a CNF query operator execution flow. Similarly, other incoming query expressions may be in a non-normalized form that is almost DNF form and/or is easily converted to DNF form. These queries can be significantly more costly to convert to CNF form than DNF form and/or may be significantly more costly to execute in accordance with a CNF query operator execution flow than a DNF query operator execution flow. Rather than requiring that all queries be converted to the same normalized form, thus resulting in inefficient conversion and/or execution of queries via the required normalized form that would be more efficiently converted and/or executed via a different normalized form, the query expression processing module 2512 illustrated in FIGS. 25A-25D enable some queries to be converted and executed in accordance with CNF form, and others to be converted and executed in accordance with DNF form.

As illustrated in FIG. 25A, the query expression processing module can be implemented via an operator tree generating module 2522, a query form selection module 2524, a query expression conversion module 2526, and/or a normalized execution flow generating module 2528. The query expression conversion module 2526, and/or a normalized execution flow generating module 2528 can be utilized to implement an execution flow generating module 2525 of the query expression processing module 2512. Each of the operator tree generating module 2522, a query form selection module 2524, a query expression conversion module 2526, and/or a normalized execution flow generating module 2528 can be implemented via one or more processing modules, such as one or more processing modules, such as one or more processing modules 44, of a same node or of a plurality of different nodes 37; one or more processing modules of a same processing core resource 48 of a plurality of different processing core resource 48 of a same or of a plurality of different nodes; and/or one or more other processing modules of the database system 10.

The query expression processing module 2512 can receive and/or otherwise determine a query expression 2542 indicating a query to be executed by a corresponding operator processing module 2435. This query expression 2542 can correspond to and/or be based on the raw query expression received by the database system, such as a raw query expression generated via user input to a client device communicating with the database system 10 and/or graphical user interface associated with the database system 10 to prompt a user to enter a query for execution. The query expression 2542 can indicate an original, nested ordering of a plurality of operators associated with the raw query expression.

The operator tree generating module 2522 can be utilized to generate an operator tree 2552 by processing the determined query expression 2542. The operator tree 2552 can indicate and/or be based on the original, nested ordering of a plurality of operators. The operator tree 2552 can be generated by parsing the determined query expression 2542 to extract the plurality of operators while preserving the original, nested ordering of the plurality of operators indicated in query expression 2542. In particular the operator tree 2552 can indicate and/or be represented as a hierarchical tree of operator nodes corresponding to predicates of the query expression 2542. This can include conditional statements relating to particular columns of a table included in the domain of the query that are utilized to filter data to be included in the resultant.

Operator nodes that are leaf nodes can correspond to simple predicates of the query expression. For example, one simple predicate can correspond to "COLUMN_A<100", and another simple predicate can correspond to "COLUMN_B=='BLUE'" where COLUMN_A and COLUMN_B are particular fields and/or columns of a table and/or relational database of the database system 10. Operator nodes of the operator tree 2552 that are not leaf nodes and instead have at least one child operator node can correspond to complex predicates that are a function of its child operator nodes via an operator applied to the child operator nodes. For example, a complex predicate of the query expression can indicate "COLUMN_A<100 AND COLUMN_B=='BLUE'", for example, to indicate only a selection of rows where both the value of COLUMN_A is less than 100 and where the value of COLUMN_B is equal to 'BLUE.' This complex predicate can be represented in the operator tree as an AND operator node of the operator tree with two leaf nodes corresponding to the two simple predicates "COLUMN_A<100" and "COLUMN_B=='BLUE'". The operator tree can indicate its operator nodes as operators of the query expression to be performed as a function of the results of execution of each of its child operator nodes, where a root operator node corresponds to a final operator to be performed to generate the resultant. The hierarchical tree structure can thus directly correspond to the nested ordering of the plurality of operators indicated in query expression 2542. An example query expression 2542 and corresponding operator tree 2552 are presented in FIG. 25C.

A query form selection module 2524 can be implemented to generate query form selection data 2562 based on the operator tree 2552. In particular, the query form selection module 2524 can perform a plurality of cost functions that correspond to each of the plurality of query form options upon the operator tree 2552. In the example presented in FIG. 25A, the query form selection module 2524 utilizes a CNF conversion cost function and a DNF conversion cost function, for example, indicated by a CNF conversion cost function definition and a DNF conversion cost function definition that are received by, stored in memory accessible by, and/or otherwise determined by the query expression processing module 2512.

The query form selection data 2562 can indicate a selected one of the plurality of query form options for execution of the given query. For example, the query form selection module 2524 can determine a plurality of cost data for each of the plurality of query form options as output to each of the corresponding plurality of cost functions performed on the operator tree. The query form selection module 2524 can then select the one of the plurality of query form options with the most favorable cost data, for example, indicating the one of the plurality of options is determined to be and/or estimated to be most efficient for conversion and/or execution of the given query.

The execution flow generating module 2525 can utilize the query form selection data 2562 to generate the query operator execution flow 2433. In particular, the execution flow generating module 2525 can generate the query operator execution flow 2433 in accordance with the selected one of the plurality of query form options. As illustrated in FIG. 25A, this can include utilizing the query expression conversion module 2526 to generate a converted query expression 2564, for example, by performing one of a plurality of conversion functions corresponding to the selected one of the plurality of query form options upon the query expression 2542 and/or upon the operator tree 2552.

For example, if the query form selection data 2562 indicates a selection to process the query in CNF form, the query expression conversion module 2526 can perform a CNF conversion function upon the query expression 2542 to generate the converted query expression 2564, where the converted query expression 2564 indicates a different nested ordering of the same or different plurality of operators as the query expression 2542 that is in accordance with CNF form. Similarly, if the query form selection data 2562 indicates a selection to process the query in DNF form, the query expression conversion module 2526 can perform a DNF conversion function upon the query expression 2542 to generate the converted query expression 2564, where the converted query expression 2564 indicates a different nested ordering of the same or different plurality of operators as the query expression 2542 that is in accordance with DNF form.

The query expressed by converted query expression 2542 can be generated to be equivalent to the query expression 2542 and/or can be generated to otherwise render the same resultant as the query expression 2542, despite the converted query expression 2564 indicating a different nested ordering of the same or different plurality of operators as the query expression 2542. In some cases, the query expression is already expressed in accordance with the selected query form indicated by the query form selection data 2562, and the converted query expression 2564 can thus indicate the same nested ordering of the plurality of operators as the query expression 2542.

As illustrated in FIG. 25A, the execution flow generating module 2525 can utilize the normalized execution flow generating module 2528 to generate the query operator execution flow 2433 from the converted query expression 2564. This can include performing one of a plurality of query flow generating functions corresponding to the selected one of the plurality of query forms indicated in the query form selection data 2562 upon the converted query expression 2564. This can include applying one or more conversion rules corresponding to the to the selected one of the plurality of query forms indicated in the query form selection data 2562 to generate the query operator execution flow 2433 from the converted query expression 2564. This can include generating a normalized operator tree, for example, by utilizing the same or different operator tree generating module 2522 to generate an operator tree from the converted query expression 2564, and can further include utilizing this normalized operator tree to generate the query operator execution flow 2433. The resulting query operator execution flow 2433 can indicate and/or be based on the nested ordering of the plurality of operators indicated by the converted query expression 2564 and/or can be in accordance with the selected one of the plurality if query forms.

The query operator execution flow 2433 can be utilized to execute the query by one or more nodes 37 that implement the query expression processing module 2512, and/or that communicate with the query expression processing module 2512 via system communication resources 14. These one or more nodes 37 can execute the query via the query operator execution flow 2433 generated by the query expression processing module 2512 by utilizing the operator processing module 2435 to generate resultant data blocks from input data blocks in accordance with execution of the operators of the query operator execution flow 2433, as discussed in further detail herein.

Figure 25B:
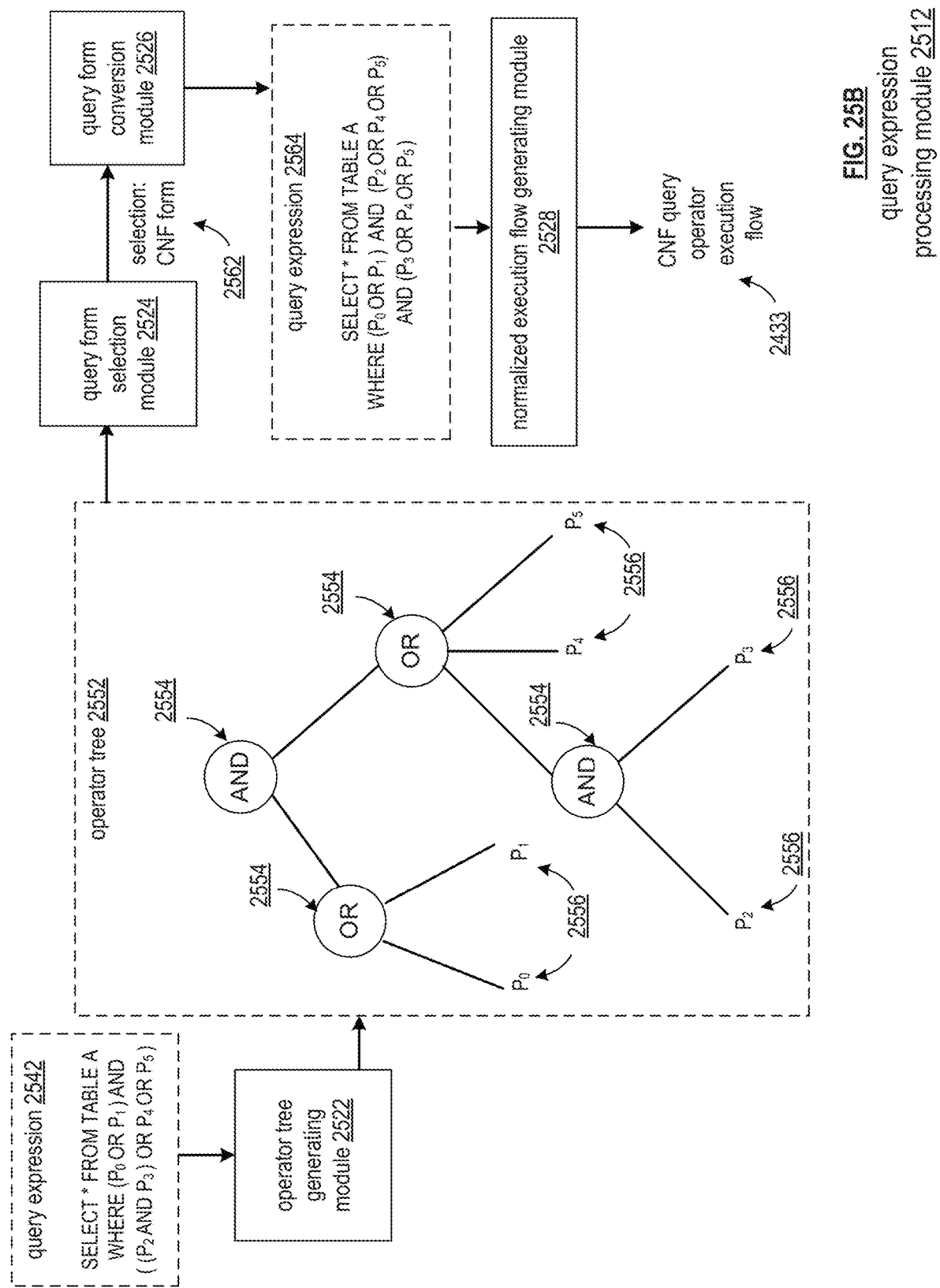
FIG. 25B is a schematic block diagram of a query expression processing module in accordance with various embodiments of the present invention.

FIG. 25B illustrates a particular example of utilizing query expression processing module 2512 to generate a query operator execution flow 2433. In this example, a query expression 2542 is determined for a given query that includes, indicates, and/or is based on the SQL query expression "SELECT * FROM TABLE A WHERE ($P_0$ OR $P_1$) AND (($P_2$ AND $P_3$) OR $P_4$ OR $P_5$)". In this example, $P_0$, $P_1$, $P_2$, $P_3$, $P_4$, and $P_5$ are simple predicates of the query expression. Operator tree generating module 2522 generates the example operator tree 2552 illustrated in FIG. 25B from this example query expression 2542, preserving the nested ordering of the query operators as a hierarchical structure indicating the simple predicates $P_0$, $P_1$, $P_2$, $P_3$, $P_4$, and $P_5$ as a plurality of leaf nodes 2556 of the operator tree 2552 and indicating the plurality of operators performed upon these simple predicates as a plurality of inner nodes 2554 of the operator tree 2552.

In this example, the query form selection module 2524 can generate query form selection data 2562 indicating a selection of CNF form. The query form conversion module can generate a converted query expression 2564 by converting the query expression 2542 into CNF form based on the query form selection data 2562 indicating a selection to process the query in accordance with CNF form. In this example, the converted query expression 2564 can indicate and/or can be based on the expression "SELECT * FROM TABLE A WHERE ($P_0$ OR $P_1$) AND ($P_2$ OR $P_4$ OR $P_5$) AND ($P_3$ OR $P_4$ OR $P_5$)." The converted query expression 2564 can otherwise express in CNF form the same query as query expression 2542. In some cases, a converted operator tree expressing the query in CNF form can be generated instead of in addition to the converted query expression 2564. A normalized execution flow generating module 2528 can generate query operator execution flow 2433 as a CNF query operator execution flow from the corresponding converted query expression 2564 that is in CNF form.

Figure 25C:
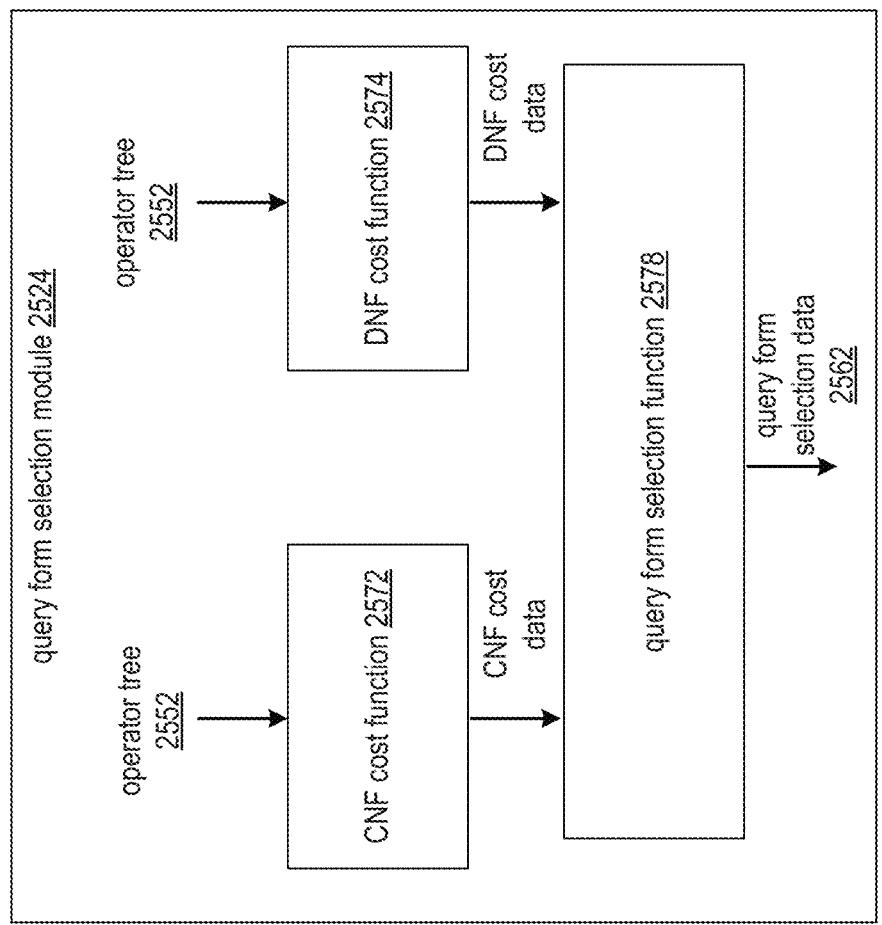
FIG. 25C is a schematic block diagram of a query form selection module in accordance with various embodiments of the present invention.

FIG. 25C illustrates an embodiment of the query form selection module 2524 that selects from a plurality of query form options that include CNF form and DNF form. A CNF cost function 2572 can be performed upon operator tree 2552 to generate CNF cost data, and a DNF cost function 2574 can be performed upon the operator tree 2552 to generate DNF cost data. The CNF cost data can indicate a determined and/or estimated processing cost value and/or a determined and/or estimated memory cost value associated with converting the query expression to CNF form and/or associated with executing the query of the query expression via a query operator execution flow 2433 that is in accordance with CNF form. The DNF cost data can indicate a determined and/or estimated processing cost value and/or a determined and/or estimated memory cost value associated with converting the query expression to DNF form and/or associated with executing the query of the query expression via a query operator execution flow 2433 that is in accordance with DNF form. A query form selection function 2578 can be performed by the query form selection module 2524. For example, performing the query form selection function 2578 can include comparing the CNF cost to the DNF cost. Performing the query form selection function 2578 can include selecting CNF form in the query form selection data 2562 in response to determining the CNF cost data is more favorable than the DNF cost data and/or in response to determining the CNF cost compares favorably to a predetermined CNF cost threshold. Performing the query form selection function 2578 can include selecting DNF form in the query form selection data 2562 when the DNF cost data is more favorable than the CNF cost data and/or when the DNF cost data compares favorably to a predetermined DNF cost threshold.

The CNF cost function 2572 and DNF cost function 2574 can be performed via a recursive function performed upon of the operator tree 2552 and/or otherwise via a depth-first traversal of the operator tree 2552. In particular, performing the CNF cost function 2572 can include assigning each node a CNF cost as a function of the CNF costs assigned to its child nodes. Similarly performing the DNF cost function 2574 can include assigning each node a DNF cost as a function of the DNF costs assigned to its child nodes. As both cost functions require a same depth-first traversal of the operator tree, a single recursive function and/or single depth-first traversal of the operator tree 2552 can be performed to generate both the CNF cost data and the DNF cost data in tandem. Thus, performing the CNF cost function 2572 and DNF cost function 2574 can include performing a single recursive cost function that generates both CNF cost data and DNF cost data at each node of the operator tree as a function of the CNF cost data and DNF cost data, respectively, generated for its child nodes.

Figure 25D:
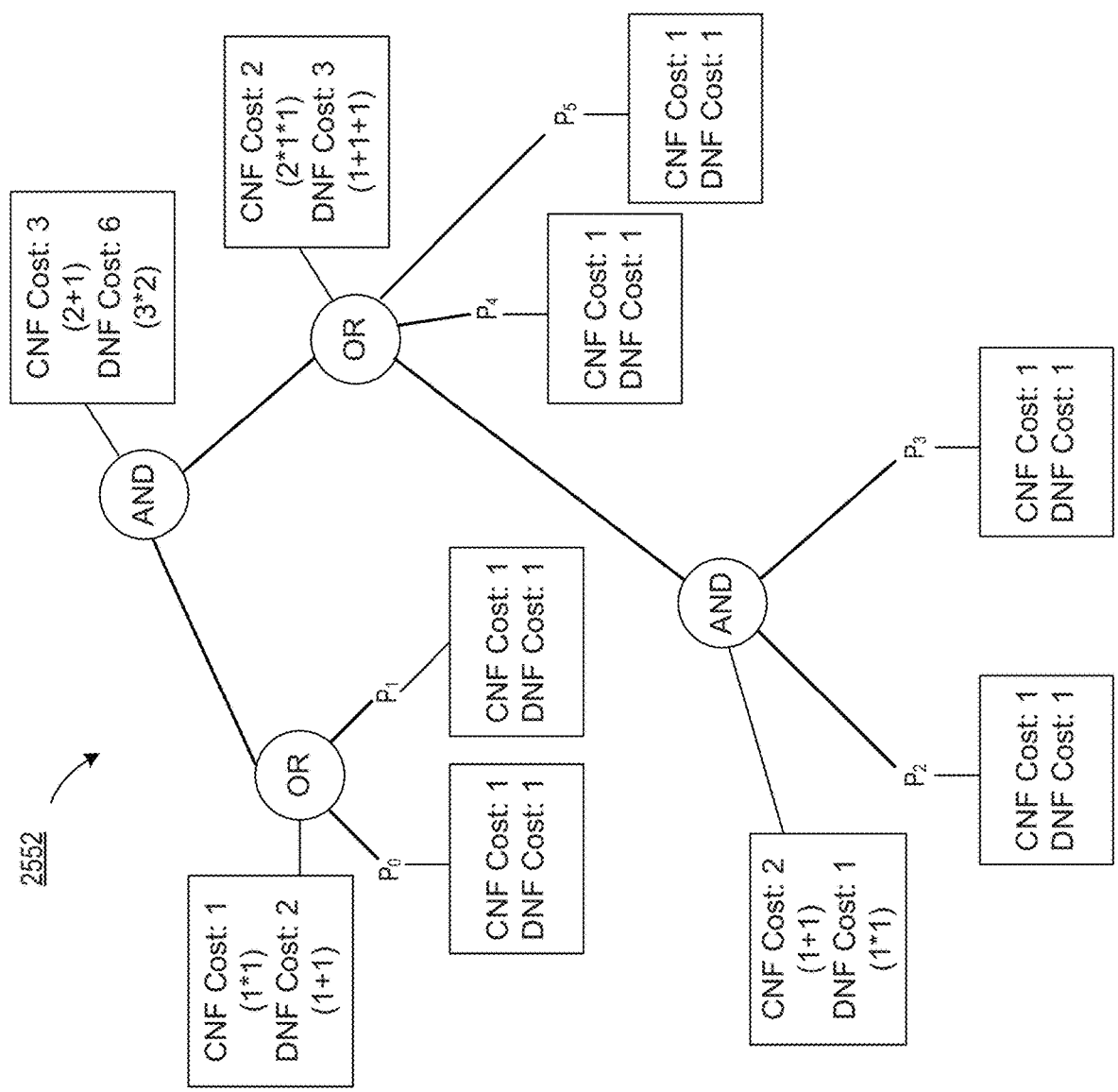
FIG. 25D illustrates an example of generating a conjunctive normal form cost and a disjunctive normal form cost for an example operator tree in accordance with various embodiments of the present invention.

FIG. 25D illustrates a particular example of generating the CNF cost data and DNF cost data by applying an example CNF cost function 2572 and example DNF cost function 2574 to the example operator tree 2552 of FIG. 25B. In this example, the CNF cost function dictates that the CNF cost of every leaf node 2556 is equal to 1, or another same value. The DNF cost function also dictates that the DNF cost of every leaf node 2556 is equal to 1, or another same value. In other embodiments, the CNF cost and DNF cost of a given node can similarly be set equal to any same value in applying the CNF cost function and DNF cost function, respectively. Alternatively, in some embodiments, the CNF cost and DNF cost of a given node can be set equal to different values.

In the example CNF cost function of FIG. 25D, the CNF cost function further dictates that the CNF cost assigned to inner nodes 2554 corresponding to AND operators is calculated as the sum of the CNF costs of its child nodes. The CNF cost function further dictates that the CNF cost assigned to inner nodes 2554 corresponding to OR operators is calculated as the product of the CNF costs of its child nodes. In the example DNF cost function of FIG. 25D, the CNF cost function further dictates that the DNF cost assigned to inner nodes 2554 corresponding to OR operators is calculated as the sum of the DNF costs of its child nodes. The DNF cost function further dictates that the DNF cost assigned to inner nodes 2554 corresponding to AND operators is calculated as the product of the DNF costs of its child nodes.

Propagating these calculated costs up the operator tree yields CNF costs and DNF costs for every node of the tree, where the CNF cost and DNF cost of the root node are ultimately calculated. The CNF cost of the operator tree can be equal to or based on the CNF cost calculated for the root node, and the DNF cost of the operator tree can be equal to or based on the DNF cost calculated for the root node. Thus, applying these example recursive definitions to the root node of the operator tree to generate a CNF cost and DNF cost of the root node yields the CNF cost and DNF cost, respectively, of the operator tree. In the particular example of FIG. 25D, calculating the CNF cost of the example operator tree 2552 in this fashion yields a CNF cost of 3, and calculating the DNF cost of the operator tree in this fashion yields a DNF cost of 6.

The CNF cost function of a node as presented in this example can be expressed as the following recursive definition CNF_cost applied to a node:

CNF_cost(node) { if(node.children == null)

return 1 if (node.type == OR)

return $\sum_{i=1}^{node.children.len} CNF\_cost(node.children[i]))$ if (node .type == AND)

return $\prod_{i=1}^{node.children.len} CNF\_cost(node.children[i]))$}

Similarly, the DNF cost function of a node as presented in this example can be expressed as the following recursive definition DNF_cost applied to a node:

DNF_cost(node) { if(node.children == null)

return 1 if (node.type == OR)

return $\sum_{i=1}^{node.children.len} DNF\_cost(node.children[i]))$ if (node .type == AND)

return $\prod_{i=1}^{node.children.len} DNF\_cost(node.children[i]))$}

In these example recursive definitions, node.children corresponds to a set or list of the children of the node indexed from 1 to the number of child nodes, where node.children.len corresponds to the number of children in the set or list of the children of the node, and where node.children[i] corresponds to the ith child node of the node in set or list of the children of the node. Node.type can correspond to the type of the node, for example, indicating the particular type of operator. The CNF cost of the operator tree can be generated by applying this CNF cost definition to the root node, for example, as a recursive function performed on the root node. The DNF cost of the operator tree can similarly generated by applying this DNF cost definition to the root node, for example, as a recursive function performed on the root node.

While this example CNF cost function 2572 and example DNF cost function 2574 only defines costs associated with AND or OR operators, other operators, such as all other possible query operators of a query expression and/or all types of operators utilized to express a query expression as an operator tree can have similar recursive definitions as a calculation performed upon the costs of their child node.

When CNF cost and DNF cost is calculated in this fashion, performing the query form selection function 2578 can include determining the lower value of the CNF cost and DNF cost determined for the operator tree, as the lower value corresponds to the more favorable cost in this example. The corresponding query form can be selected to generate the query form selection data 2562. In the example illustrated in FIG. 25B, CNF form is selected in the query form selection data 2562 in response to the CNF cost of 3 being less than the DNF cost of 6 as illustrated in FIG. 25D.

In some embodiments, a scaling factor is determined for the CNF cost and/or the DNF cost. For example, the scaling factor for the DNF cost can be greater than the scaling factor of the CNF cost based on a DNF query expression operator flow generally being more costly to generate than a CNF query expression operator flow. In some cases, the DNF scaling factor is larger than one, and the CNF is not assigned a scaling factor and/or is assigned a scaling factor of exactly one. A raw CNF cost and DNF cost can be generated based on the operator tree as illustrated in FIG. 25D, for example, where the raw CNF cost in the example illustrated is equal to 3 and the raw DNF cost is equal to 6. The raw CNF cost can be multiplied by a predetermined CNF scaling factor to generate a final CNF cost, and/or the final CNF cost can be set equal to the raw CNF cost based on the CNF scaling factor being equal to one. The raw DNF cost can be multiplied by a predetermined DNF scaling factor to generate a final DNF cost.

For example, if the CNF scaling factor is equal to one and the DNF scaling factor is equal to two, in the particular example illustrated in FIG. 25D, the final CNF cost is equal to the raw CNF cost of 3 multiplied by the CNF scaling factor of 1, yielding a final CNF cost of 3. The final DNF cost is equal to the raw DNF cost of 6 multiplied by the DNF scaling factor of 2, yielding a final DNF cost of 12. In this example, the CNF form is still chosen because the final CNF cost is lower than the final DNF cost.

Consider another example where the predetermined CNF scaling factor is again equal to one and where the predetermined DNF scaling factor is again equal to two. In this example, suppose the raw CNF cost calculated for the operator tree is equal to four, and the raw DNF cost calculated for the operator tree is equal to three. Despite the raw DNF cost being lower than the raw CNF cost, the final DNF cost is equal to two multiplied by three, yielding a final DNF cost of six, while the final CNF cost is equal to four. Because the final CNF cost is lower, and thus more favorable, due to the DNF scaling factor being higher than the CNF scaling factor, the CNF form will be selected in performing the query form selection function 2578.

In some embodiments, the query expression processing module and/or another processing module of the database system determines the predetermined CNF scaling factor and/or the predetermined DNF scaling factor. In particular, the DNF scaling factor can be determined, relative to a fixed CNF scaling factor of one, as a function of a relative increase in time, memory, and/or processing resources required to create a DNF query expression operator flow from a converted expression in DNF form rather than creating a CNF query expression operator flow from a converted expression in CNF form. The value of the scaling factor can be computed based on measuring the time for generating a CNF query expression operator flow and a DNF query expression operator flow for each of a plurality of query expressions. In particular, each of a plurality of different query expressions can be converted into CNF form and into DNF form. A CNF query expression operator flow can be generated for each of the query expressions based on their CNF form, and the time and/or processing resources required to generate each CNF query expression operator flow from their respective converted query expression in CNF form can be measured to generate a corresponding plurality of CNF query expression operator flow processing measurements. A DNF query expression operator flow can be generated for each of the query expressions based on their DNF form, and the time and/or processing resources required to generate each DNF query expression operator flow from their respective converted query expression in DNF form can be measured to generate a corresponding plurality of DNF query expression operator flow processing measurements. The average of and/or other aggregation of the CNF query expression operator flow processing measurements can be generated and compared to the average of and/or other aggregation of the DNF query expression operator flow processing measurements. In particular, the scaling factor can be equal to and/or generated based on a ratio of the average value of the DNF query expression operator flow processing measurements divided by the average value of the CNF query expression operator flow processing measurements.

In some cases, a set of different CNF query expression operator flow processing measurement averages and a set of different CNF query expression operator flow processing measurement averages can be determined for each of a set of subsets of this plurality of query expressions, where each different subset in the set of subsets corresponds to a different type of query expression. In this case, a set of DNF scaling factors can be determined, where each scaling factor is generated for a corresponding one of the set of groupings and thus corresponds to one of a set of different types of query expressions. In particular, each DNF scaling factor in the set can be generated as a ratio of, or otherwise based on, the average of the DNF query expression operator flow processing measurements in the corresponding subset and the average of the CNF query expression operator flow processing measurements in the corresponding subset. For incoming query expressions, one of the set of DNF scaling factors can be selected based on determining which one of the set of query expression types the incoming query expression corresponds to or compares most favorably to, and by selecting the DNF scaling factor that corresponds to this corresponding query expression type. This selected DNF scaling factor can be applied to the raw DNF cost to generate the final DNF cost. In this case, the CNF scaling factor for every type of query expression can optionally the same, for example, where each of a corresponding set of CNF scaling factors are all equal to one. Alternatively, the CNF scaling factor for some types of query expressions can be greater than the DNF scaling factor for these types of query expressions based on generation of the CNF query expression operator flow for query expressions of the corresponding type having an average time and/or requiring average processing resources that are greater and/or less favorable than the average time and/or average processing resources determined to be required for the query expressions of the corresponding type.

In various embodiments, a query expression processing module 2512 of a database system includes at least one processor and a memory that stores executable instructions. The executable instructions, when executed by the at least one processor, cause the query expression processing module to determine a query expression indicating a query for execution. An operator tree is generated based on a nested ordering of a plurality of operators indicated by the query expression. Conjunctive normal form (CNF) conversion cost data is generated based on the operator tree, and disjunctive normal form (DNF) conversion cost data is also generated based on the operator tree. Conversion selection data is generated based on the CNF conversion cost data and the DNF conversion cost data. The conversion selection data indicates a selection to perform either a CNF conversion or a DNF conversion. A normalized query expression is generated by performing either the CNF conversion or the DNF conversion upon the query expression, based on the which one of these two conversions are selected in the conversion selection data. Execution of the query is facilitated in accordance with the normalized query expression, for example, by the query expression processing module and/or by an operator processing module that communicates with the query expression processing module.

FIG. 25E illustrates a method for execution by a node 37. For example, the node can utilize at least one processing module of the node 37 to execute operational instructions stored in memory accessible by the node, where the execution of the operational instructions causes the node 37 to execute the steps of FIG. 25E. Different nodes 37 of the same or different computing device 18 can independently execute the method of FIG. 25E concurrently, for example, based on different query expressions for different queries assigned to the different nodes. In some cases, the method of FIG. 25E is performed by a particular processing core resource 48 of a node 37, where different processing core resources 48 of the same node can independently execute the method of FIG. 25E concurrently, for example, on different query expressions for different queries assigned to the different processing core resources 48. The method of FIG. 25E can be performed by a node 37 in accordance with embodiments of node 37 discussed in conjunction with FIGS. 25A-25D, and/or in conjunction with other embodiments of node 37 discussed herein. Some or all of the method of FIG. 25E can be performed by another processing module of the database system 10.

In particular, the method of FIG. 25E can be performed by a query expression processing module 2512 and/or an operator processing module 2435. For example, the query expression processing module 2512 and/or the operator processing module 2435 can include a processor and memory that includes executable instructions. The executable instructions, when executed by the processor, cause the query expression processing module 2512 and/or the operator processing module 2435 to execute some or all of the steps of FIG. 25E.

Step 2582 includes determining a query expression indicating a query for execution. Step 2584 includes generating an operator tree based on a nested ordering of a plurality of operators indicated by the query expression. Step 2586 includes generating conjunctive normal form (CNF) conversion cost data based on the operator tree. Step 2588 includes generating disjunctive normal form (DNF) conversion cost data based on the operator tree. Step 2590 includes generating conversion selection data, based on the CNF conversion cost data and the DNF conversion cost data, that indicates a selection to perform either a CNF conversion or a DNF conversion. Step 2592 includes generating a normalized query expression by performing either the CNF conversion or the DNF conversion upon the query expression, based on the which one of these two conversions are selected in the conversion selection data. Step 2594 includes facilitating execution of the query in accordance with the normalized query expression.

In various embodiments, the nested ordering of the plurality of operators indicated by the query expression is presented in a non-normalized form. In various embodiments, the normalized query expression is different from the query expression.

In various embodiments, the operator tree indicates the plurality of operators as a plurality of operator nodes of the operator tree. Generating the CNF conversion cost data includes calculating a CNF cost for each of the plurality of operator nodes of the operator tree. Generating the DNF conversion cost data includes calculating a DNF cost for each of the plurality of operator nodes of the operator tree. In various embodiments, calculating the CNF cost for each of the plurality of operator nodes of the operator tree includes applying a depth-first CNF calculation via a recursive process applied to the operator tree. In various embodiments, calculating the DNF cost for each of the plurality of operator nodes of the operator tree conversion cost data includes applying a depth-first DNF calculation via the recursive process applied to the operator tree.

In various embodiments, calculating the CNF cost for each of the plurality of operator nodes of the operator tree includes, for each OR node in the operator tree, multiplying the CNF cost of each child node of the each OR node. In various embodiments, calculating the CNF cost for each of the plurality of operator nodes of the operator tree includes, for each AND node in the operator tree, summing the CNF cost of each child node of the each AND node. In various embodiments, calculating the DNF cost for each of the plurality of operator nodes of the operator tree includes, for each OR node in the operator tree, summing the DNF cost of each child node of the each OR node. In various embodiments, calculating the DNF cost for each of the plurality of operator nodes of the operator tree includes, for each AND node in the operator tree, multiplying the DNF cost of each child node of the each AND node.

In various embodiments, every leaf node of the operator tree is assigned a same DNF cost and is further assigned a same CNF cost, such as the value of one. In various embodiments, every leaf node's DNF cost is equal to every leaf node's CNF cost. In various embodiments, the DNF conversion cost data and the CNF conversion cost data are generated concurrently by generating a CNF cost and DNF cost for each of a plurality of operator nodes of the operator tree by performing a single depth-first traversal of the operator tree.

In various embodiments, generating the conversion selection data includes selecting the CNF conversion when the CNF conversion cost data is more favorable than the DNF conversion cost data, and generating the conversion selection data includes selecting the DNF conversion when the DNF conversion cost data is more favorable than the CNF conversion cost data. In various embodiments, the CNF conversion cost data is more favorable than the DNF conversion cost data when a CNF cost value calculated for the operator tree that is indicated in the CNF conversion cost data, is greater than a DNF cost value calculated for the operator tree that is indicated in the DNF conversion cost data. In various embodiments, generating the conversion selection data includes selecting the CNF conversion when the CNF cost value indicated in the CNF conversion cost data is equal to the DNF cost value indicated in the DNF conversion cost data.

In various embodiments, generating the conversion selection data includes automatically selecting the CNF conversion when the CNF conversion cost data compares favorably to a predetermined threshold CNF conversion cost. For example, the CNF conversion is selected in response to determining a CNF cost value calculated for the operator tree is less than, equal to, and/or otherwise compares favorably to a predetermined CNF value. In such cases where the CNF conversion cost data compares favorably to the predetermined threshold CNF conversion cost, the CNF conversion is selected regardless of the DNF conversion cost. For example, the DNF conversion cost data can indicate a more favorable conversion cost than the CNF conversion cost data, but the conversion selection data is generated to indicate selection of the CNF conversion based on the CNF conversion cost data comparing favorably to the predetermined threshold CNF conversion cost. As a particular example, the DNF cost value calculated for the operator tree is less than the CNF cost value calculated for the operator tree, but the conversion selection data is generated to indicate selection of the CNF conversion based on the CNF cost value calculated for the operator tree comparing favorably to the predetermined threshold CNF cost value.

In various embodiments, generating the conversion selection data includes automatically selecting the CNF conversion when the DNF conversion cost data compares unfavorably to a predetermined threshold DNF conversion cost. For example, the DNF conversion is selected in response to determining a DNF cost value calculated for the operator tree is less than, equal to, and/or otherwise compares unfavorably to a predetermined DNF value. In such cases where the DNF conversion cost data compares unfavorably to the predetermined threshold DNF conversion cost, the CNF conversion is selected regardless of the CNF conversion cost. For example, the DNF conversion cost data can indicate a more favorable conversion cost than the CNF conversion cost data, but the conversion selection data is generated to indicate selection of the CNF conversion based on the DNF conversion cost data comparing unfavorably to the predetermined threshold DNF conversion cost. As a particular example, the DNF cost value calculated for the operator tree is less than the CNF cost value calculated for the operator tree, but the conversion selection data is generated to indicate selection of the CNF conversion based on the DNF cost value calculated for the operator tree comparing unfavorably to the predetermined threshold DNF cost value.

In various embodiments, the normalized query expression is automatically set to the query expression in response to determining the query expression is either CNF form or DNF form. In various embodiments, the method includes determining whether or not the query expression is already in either CNF form or DNF form. For example, determining whether the query expression already in either CNF form or DNF form can be based on the operator tree generated in step 2584. The method further includes foregoing the generating of the CNF conversion cost data and the generating of the DNF conversion cost data in response to determining the query expression is already in either CNF form or DNF form. For example, steps 2586, 2588, and/or 2590 are not performed when the query expression is determined to be in either CNF form or DNF form already. The CNF conversion cost data and the DNF conversion cost data are generated in response to determining the query expression is not already in CNF form or DNF form, for example, where steps 2586, 2588, and/or 2590 are only performed when the query expression is determined to not already be in either CNF form or DNF form.

In various embodiments, facilitating execution of the query in accordance with the normalized query expression includes generating a query operator execution flow based on the normal query expression and further includes performing a plurality of operator executions of a plurality of operators of the query operator execution flow.

In various embodiments, the CNF conversion is selected in the conversion selection data. The normalized query expression is generated by performing the CNF conversion upon the query expression based on the CNF conversion being selected in the conversion selection data. The method further includes determining a second query expression indicating a second query for execution; generating a second operator tree based on a nested ordering of a second plurality of operators indicated by the second query expression; generating second CNF conversion cost data based on the second operator tree; generating second DNF conversion cost data based on the second operator tree; generating second conversion selection data, based on the second CNF conversion cost data and the second DNF conversion cost data, that indicates a selection to perform upon a DNF conversion upon the second query expression; generating a second normalized query expression by performing the DNF conversion upon the second query expression based on the second conversion selection data; and/or facilitating execution of the second query in accordance with the second normalized query expression.

In various embodiments, facilitating execution of the query includes performing a first plurality of operator executions of a first plurality of operators in accordance with a CNF query operator execution flow generated for the query based on the query expression undergoing a CNF conversion. Performance of the first plurality of operator executions spans a first temporal period, for example, from a time of the first one of the plurality of operator executions to time of the last one of the plurality of operator executions. Facilitating execution of the second query includes performing a second plurality of operator executions of a second plurality of operators in accordance with a DNF query operator execution flow generated for the second query based on the query expression undergoing a CNF conversion. Performance of the second plurality of operator executions spans a second temporal period, for example, from a time that the first one of the second plurality of operator executions is performed to time that the last one of the second plurality of operator executions is performed.

The first temporal period can have a non-null overlap with the second temporal period. For example, the query and the second query can be concurrently executed by the operator processing module 2435 based on selecting operators from a plurality of operator execution flows for execution in each of a plurality of operator execution steps, as discussed in greater detail in conjunction with FIG. 29A. In each operator execution step, one of a plurality of queries that includes the query and second query is selected undergo an operator execution of one of its operators. The plurality of queries can be selected over a sequential set of the plurality of operator execution steps, for example, in accordance with a turn-based ordering of the plurality of queries.

In various embodiments, a non-transitory computer readable storage medium includes at least one memory section that stores operational instructions that, when executed by a processing module that includes a processor and a memory, cause the processing module to determine a query expression indicating a query for execution. An operator tree is generated based on a nested ordering of a plurality of operators indicated by the query expression. Conjunctive normal form (CNF) conversion cost data is generated based on the operator tree, and disjunctive normal form (DNF) conversion cost data is also generated based on the operator tree. Conversion selection data is generated based on the CNF conversion cost data and the DNF conversion cost data. The conversion selection data indicates a selection to perform either a CNF conversion or a DNF conversion. A normalized query expression is generated by performing either the CNF conversion or the DNF conversion upon the query expression, based on the which one of these two conversions are selected in the conversion selection data. Execution of the query is facilitated in accordance with the normalized query expression.

Figure 26A:
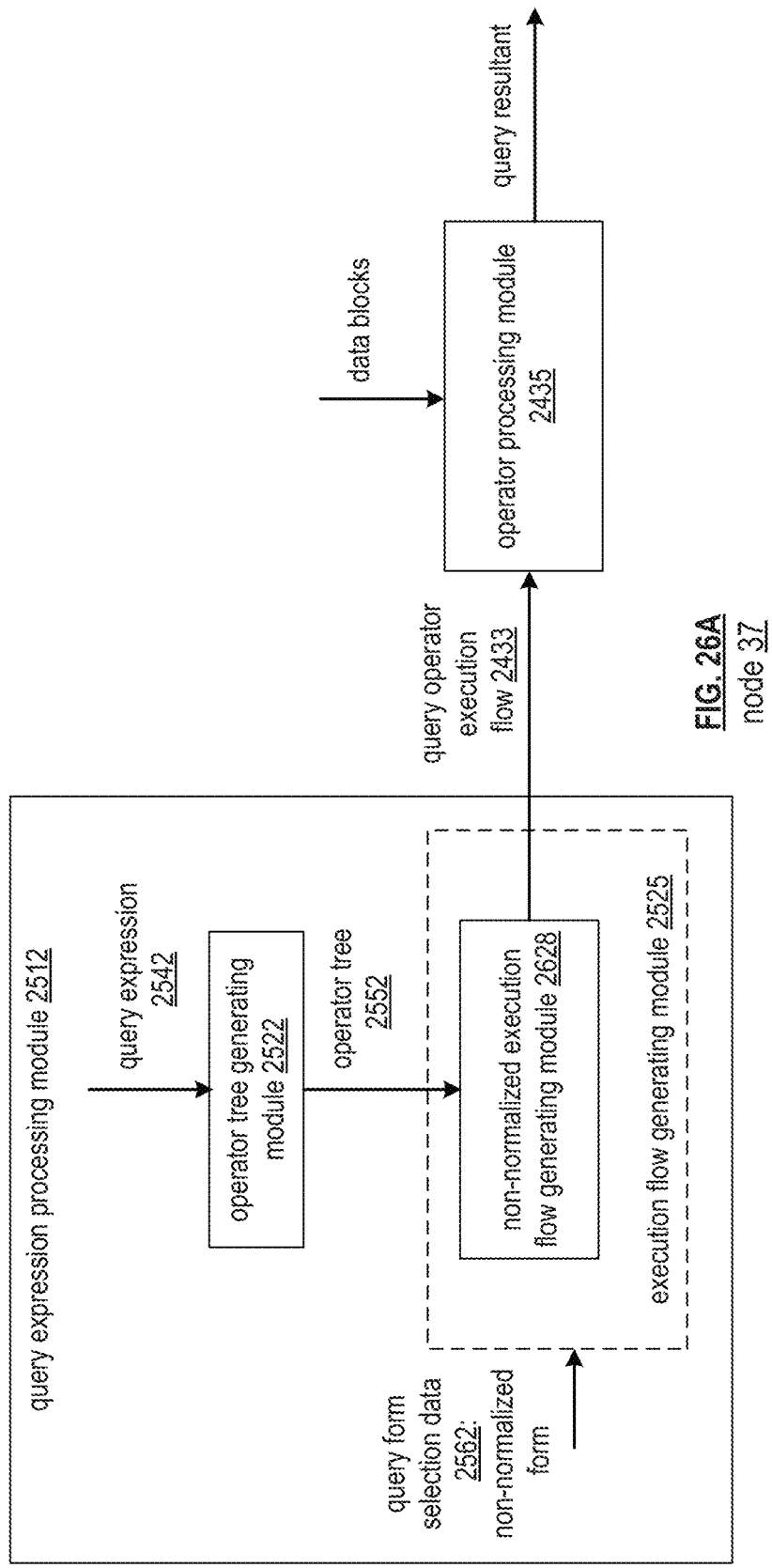
FIG. 26A is a schematic block diagrams of a node that implements a query expression processing module and an operator processing module in accordance with various embodiments of the present invention.
Figure 26B:
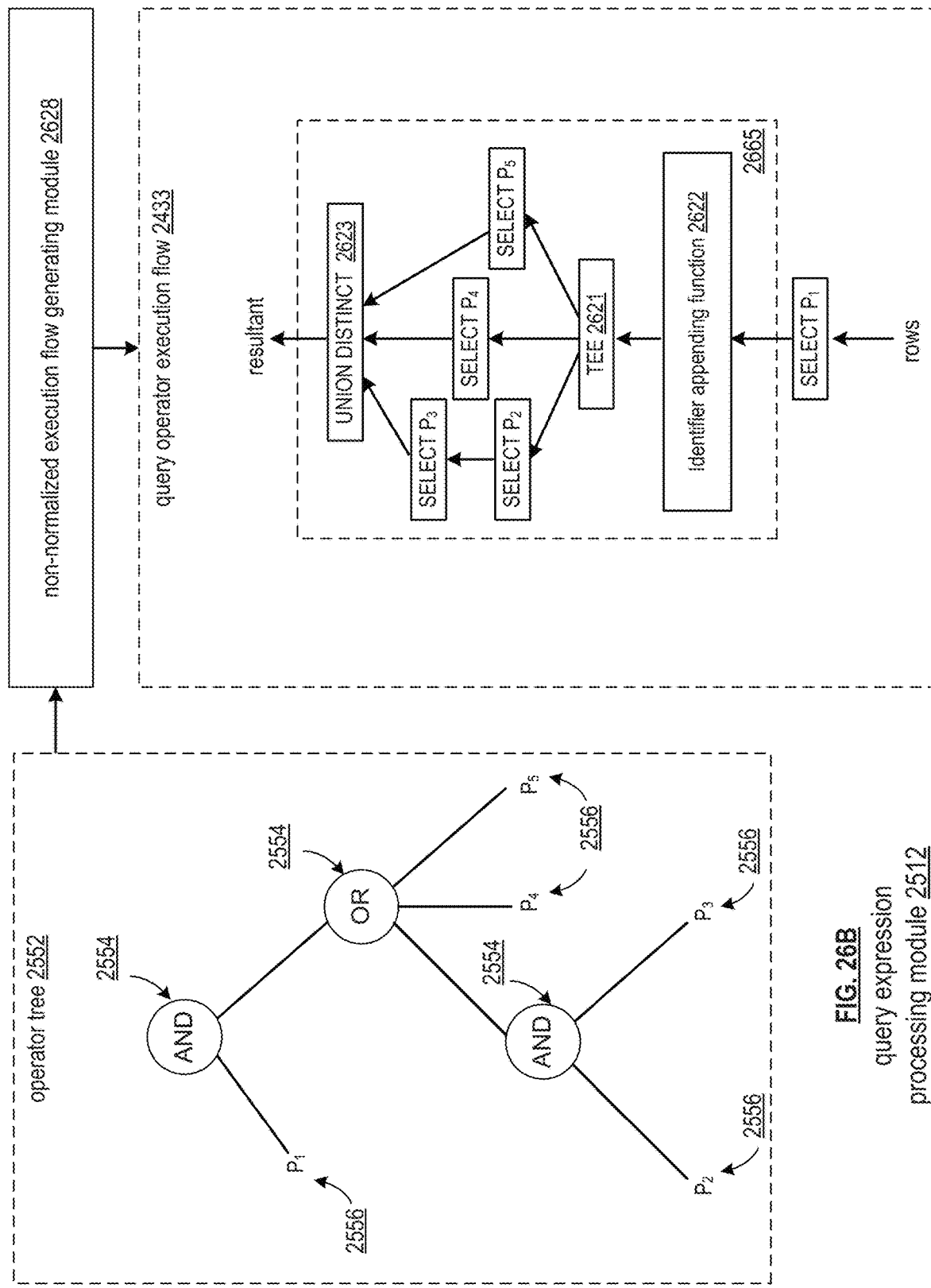
FIG. 26B is a schematic block diagram of a query expression processing module in accordance with various embodiments of the present invention.
Figure 26C:
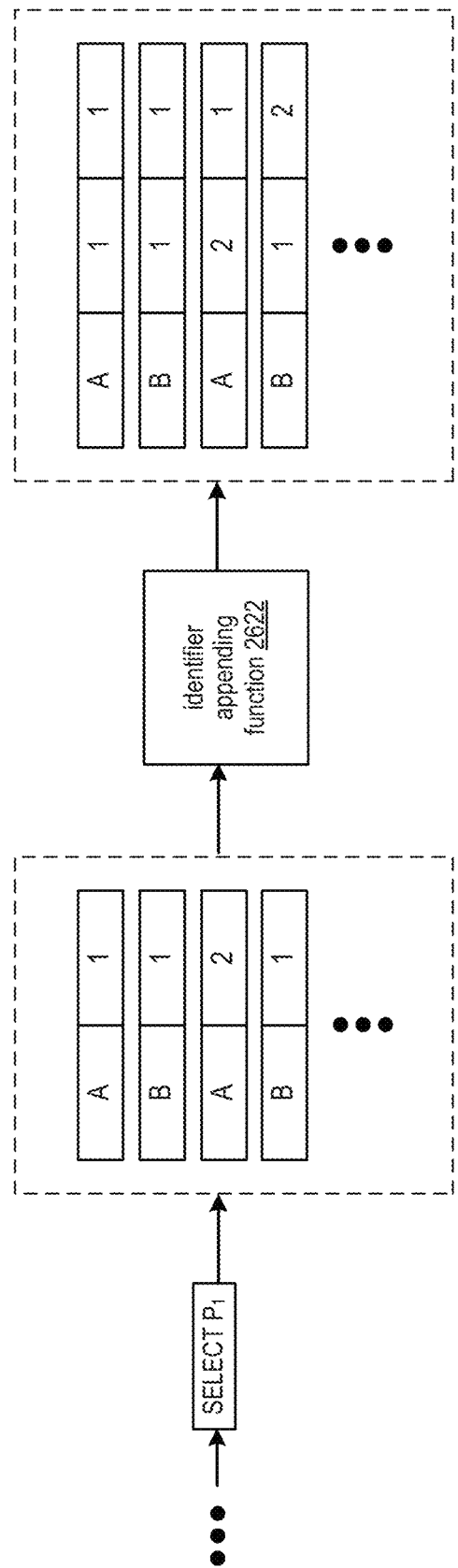
FIG. 26C illustrates an example of utilizing an identifier appending function upon an example set of rows in accordance with various embodiments of the present invention.

FIGS. 26A-26C illustrates another embodiment of the query expression processing module 2512. The query expression processing module 2512 of FIGS. 26A-26C can be implemented instead of or in addition to the query expression processing module 2512 of FIGS. 25A-25D. The query expression processing module 2512 of FIGS. 26A-26C can be implemented via any one or more processing modules of the database system 10, as discussed in conjunction with the embodiments of query expression processing module 2512 of FIGS. 25A-25D.

The query expression processing module 2512 of FIGS. 26A-26C is operable to implement the same or different execution flow generating module 2525 as illustrated in FIG. 26A. In particular, the execution flow generating module 2525 can be implemented by utilizing a non-normalized execution flow generating module 2628 that generates query operator execution flows 2433 for given queries that are not in accordance with CNF form or DNF form and/or are otherwise not necessarily in accordance with a normalized form. In particular, the non-normalized execution flow generating module 2628 is operable to generate a query operator execution flow 2433 based on the form of the determined query expression 2542, even if this given query expression 2542 is in CNF form or DNF form. The resulting query operator execution flow 2433 can reflect the nested ordering of the plurality of operators of the given query expression 2542 prior to any conversion into CNF form or DNF form, even if the given query expression is not in accordance with CNF form or DNF form. For example, the non-normalized query operator execution flow 2433 can be generated based on the operator tree 2552 generated for the determined query expression 2542 and reflecting the nested ordering of the plurality of operators of the query expression 2542. Alternatively, the query expression 2542 itself can be processed to generate the query operator execution flow 2433 in accordance with the non-normalized form, for example, where an operator tree 2552 is not generated and/or not utilized to generate the query operator execution flow 2433. Such embodiments of the query expression processing module 2512 presents improvements to database systems by enabling queries to be executed in their original expressed form without necessitating a costly conversion process to convert the query into a normalized form and/or without necessitating a more complicated and/or costly execution of the query in accordance with the normalized form.

The execution flow generating module 2525 can determine implement the non-normalized execution flow generating module 2628 to generate query operator execution flow 2433 for a given query expression based on query form selection data 2562 indicating to execute the query in non-normalized form. In some cases as discussed in further detail in conjunction with FIGS. 27A, a query form selection module 2524 of the query expression processing module 2512 can select from a plurality of query form options that includes a non-normalized form option, and the non-normalized execution flow generating module 2628 is implemented to generate query operator execution flow only when the query form selection data 2562 indicates the selection to execute the query in non-normalized form. The indication to execute the query in accordance with the non-normalized form can be otherwise received and/or determined by the query expression processing module 2512. In other embodiments, the non-normalized execution flow generating module 2628 is utilized to generate non-normalized query operator execution flows 2433 for every incoming query. In some cases, the query operator execution flow 2433 generated for a given query is in accordance with a normalized form such as either CNF form or DNF form, for example, based on the original query expression 2542 being already expressed in either CNF form or DNF form without any conversion.

Generating a normalized query operator execution flow in accordance with either CNF form or DNF form includes adhering to particular rules that guarantees that execution of the corresponding query via the normalized query operator execution flow will yield a correct resultant. This includes ensuring that the resultant does not include duplicated rows and/or aggregation values that were generated based on output of another operator that included duplicated rows. Generating the non-normalized query operator execution flow 2433 similarly requires ensuring that the corresponding query is guaranteed to execute correctly, producing the same resultant as would be produced if the query operator execution flow 2433 was in accordance with a normalized form.

Consider a query operator execution flow 2433 utilized by an operator processing module 2435 of a node 37 in accordance with the node's execution of a corresponding query. The operator processing module 2435 can process data blocks in accordance with an "upward" flow of data via the query operator execution flow 2433, where flow of data blocks is propagated "upwards" in accordance with an ordering of operators in the query operator execution flow 2433 from the bottom of the query operator execution flow 2433 to the top of the query operator execution flow 2433. The bottom of the query operator execution flow 2433 can correspond to reads of and/or access to data blocks corresponding to the domain of the query, such as input data blocks received from another node at the IO level 2416 of the query execution plan and/or input data blocks that otherwise include rows extracted from stored segments of the database system. The top of the query operator execution plan can correspond to the resultant outputted by the query, such as a plurality of resultant data blocks.

In embodiments where this node 37 is included in an inner level 2414 of the query execution plan 2405, and where the query execution plan 2405 includes exactly one inner level 2414, the query operator execution flow 2433 utilized by this node's operator processing module 2435 to facilitate the node's execution of the corresponding query can correspond to the entirety of the plurality of operators of the corresponding query expression 2542. In particular, when the query operator execution flow 2433 is generated by the non-normalized execution flow generating module 2628, this query operator execution flow 2433 can further correspond to and/or reflect the original nested ordering of the plurality of operators of the corresponding query expression 2542.

FIG. 26B illustrates a particular example of a query operator execution flow generated by a non-normalized execution flow generating module 2628 for an example operator tree 2552 for a query expression with a nested ordering of a plurality of operators that is in neither CNF nor DNF form. Generating the query operator execution flow can include building the query operator execution flow recursively from the operator tree, for example, via a depth-first approach. In particular, individual sub-flows of the query operator execution flow can be generated based on corresponding operator nodes. For example, simple predicates of the leaf nodes 2556 can correspond to select operators or filtering operators of the query operator execution flow. As the depth-first approach propagates up the operator tree, a set of distinct sub-flows already generated for child operator nodes of a particular operator node of the tree can be combined, based on the type of the particular operator node, to generate a single sub-flow that includes and/or is based on the set of distinct sub-flows.

Each of a set of sub-portions for each of a set of child operator nodes of an AND operator node can be placed in series in the query operator execution flow, where data blocks are processed by each sub-flow one at a time in accordance with a serial ordering, and where output of each sub-flow is utilized as input to a next sub-flow in the serial ordering, enabling the upward propagation of data blocks. Each of a set of sub-flows for each of a set of child operator nodes of an OR operator node can be placed in parallel in the query operator execution flow, where each sub-flow can be executed concurrently and/or where their output is not utilized as input to other sub-flows that are children of the OR operator node.

In a normalized query operator execution flow, the bottom of a sub-flow generated for an OR operator node in a corresponding operator tree can include a TEE operator that allows all incoming data blocks to be duplicated and/or otherwise branched as input data blocks to each of the set of sub-flows corresponding to the child nodes of the OR operator node in the operator tree 2552. This enables each parallelized sub-flow to process all incoming data separately. The top of a sub-flow generated for an OR node can include a UNION operator that performs a union upon all data blocks outputted by each of the OR's parallelized sub-flows via operators of one or more serialized sub-flows contained within each parallelized sub-flow. Correct query output is guaranteed despite this UNION operator in normalized query execution flows, as additional filtering parameters are included in each parallelized sub-flow in generation of normalized query execution flows to guarantee no two parallel sub-flows are capable of including the same row of their output. For example, an OR of two simple predicates $P_1$ and $P_2$ can be reflected in a CNF query operator execution flow via three parallelized branches: one branch performs $P_1$ AND $P_2$ via a serialized selection of $P_1$ from the input, and then a selection of $P_2$ from the output of the selection of $P_1$; a second branch performs $P_1$ AND $!P_2$, where "!" denotes the negation operation, via a serialized selection of $P_1$ from the input, and then a selection of $!P_2$ from the output of the selection of $P_1$; and a second branch performs $!P_1$ AND $P_2$, via a serialized selection of $!P_1$ from the input, and then a selection of $P_2$ from the output of the selection of $!P_1$. However, such mechanisms can rely on the structure of normalized query expressions, such as the inclusion of only simple predicates as children of OR operator nodes in the operator tree, to yield this correct output, requiring that the query expression be converted into the corresponding normalized form.

To similarly guarantee query correctness without converting the query into a normalized form such as CNF or DNF form, the non-normalized execution flow generating module 2628 can employ a different mechanism in generating the query operator execution flow 2433. In particular, consider a sub-flow 2665 of the query operator execution flow 2433 that is generated based on the OR operator node of the example operator tree 2552 in FIG. 26B. This sub-flow includes a TEE OPERATOR 2621 branching to three sub-flows generated for each of the OR operator node's three child nodes in the operator tree 2552, in a similar fashion as a TEE included for OR operator nodes of normalized query expressions. However, prior to the TEE in the query operator execution flow, an identifier appending function 2622 is serially included. This identifier appending function 2622, when executed on individual row included in incoming data blocks to the sub-flow 2665, is operable to append and/or label each individual row with an identifier, for example, by appending an additional column to each incoming row that includes an identifier determined for the row that, alone or in conjunction with other values of other columns of the incoming row, uniquely identifies the row and/or otherwise distinguishes the row from other incoming rows. These rows with the appended identifiers are generated as output of the identifier appending function 2622, and are thus utilized as input to the TEE OPERATOR 2621.

Once each parallel sub-flow corresponding to the children of this OR operator node processes its incoming data blocks received from TEE OPERATOR 2621, the outputted data blocks can be utilized as input to a UNION DISTINCT operator 2623. This UNION DISTINCT operator is included in OR operator node's corresponding sub-flow 2665 rather than a normal UNION operator to remove all duplicate rows received as input. While removing duplicate rows could render the query incorrect if multiple rows with duplicate data were included in the input data blocks of sub-flow 2665, the appended identifier distinguishes these duplicate rows that must be included in the output of the sub-flow 2665 for query correctness. Thus, the combination of the identifier appending function 2622 and the UNION DISTINCT operator 2623 ensures that all identical rows originally present the incoming data blocks to sub-flow 2665 are distinguishable and therefore preserved by UNION DISTINCT operator 2623. The combination of the identifier appending function 2622 and the UNION DISTINCT operator 2623 further ensures that all identical rows that are present due to being outputted by multiple parallel branches of the TEE OPERATOR 2621 and that were not originally included incoming data blocks to sub-flow 2665 are detected as duplicates based on having identical row values, including the identical appended identifier, and are therefore removed by UNION DISTINCT operator 2623. This mechanism of guaranteeing both preservation of identical rows of the database system as well as removal of duplicated rows in output of the multiple parallel branches of the TEE OPERATOR 2621 guarantees query correctness with regards to the OR operator, and enables queries to be processed correctly in the non-normalized form.

In embodiments where the query expression includes multiple OR operators, multiple corresponding OR operator sub-flows 2665 can be generated in this fashion. For example, all sub-flows generated for OR operators can include the identifier appending function 2622 prior to TEE OPERATOR 2621, and can include the UNION DISTINCT rather than a UNION. In some embodiments, only one, outermost OR operator of a plurality of nested OR operators in the operator tree 2552 has a corresponding OR operator sub-flow 2665 with the identifier appending function 2622 and the UNION DISTINCT. In some embodiments, nested OR operators included in one or more of the parallel sub-flows of this OR operator, based on branching from the outermost operator at least one node down the operator tree 2552 as a descendent node of the OR operator, need not include their own identifier appending function 2622 and the UNION DISTINCT in their corresponding sub-flow that is nested within the outermost OR operator's sub-flow 2622, as all duplicates will be eventually removed by the UNION DISTINCT of the outermost OR. In such embodiments, these nested OR operators will be generated to have corresponding sub-flows with a UNION operator rather than a UNION DISTINCT operator, no identifier appending function 2622 is included.

In some embodiments, serial OR operators, such as a plurality of outermost OR operators adjoined in series as children or descendants of an AND operator or other operator in the operator tree, can each include their own identifier appending function 2622 prior to TEE OPERATOR 2621, and can include the UNION DISTINCT rather than a UNION. This can be favorable, as the additional memory and/or processing resources required to maintain the appended identifier of each row and/or to maintain propagation of a plurality of unnecessary duplicates in serial flow of the query operator execution plan can be unnecessarily costly and can be reduced by removing all duplicates for each serial application of an OR statement upon the data.

Alternatively, for a plurality of serial OR operators, a plurality of serialized corresponding OR operator sub-flows 2665 are generated, where only the bottom-most OR operator sub-flow 2665 in the query operator execution flow 2433 includes the identifier appending function 2622 prior to TEE OPERATOR 2621, and where this bottom-most OR operator sub-flow 2665 includes a UNION rather than a UNION DISTINCT. This bottom-most OR operator can be flagged, for example, via the recursive process employed to generate the query operator execution flow 2433 from the operator tree, and/or the identifier appending function 2622 can otherwise be included in the OR operator sub-flow 2665 that is determined to be the bottom-most one of a plurality of OR operator sub-flows. Alternatively, the bottom-most TEE operator of a plurality of TEE operators in the query operator execution flow 2433 can be identified and/or flagged in the recursive process, and the query operator execution flow can be updated after being fully generated to insert the identifier appending function 2622 prior to this bottom-most TEE operator. In some embodiments, one or more other OR operator sub-flows 2665 for one or more serial ORs are generated to not include the identifier appending function 2622, where the non-normalized query operator execution flow 2433 includes no more than one identifier appending function 2622, regardless of how many OR operators are present in the query expression.

In some cases, for the plurality of serialized corresponding OR operator sub-flows 2665, only the top-most OR operator sub-flow 2665 in the query operator execution flow 2433 is generated to include the UNION DISTINCT operator 2623 rather than a UNION operator, where all other OR operator sub-flows 2665 include the UNION rather than the UNION DISTINCT. In some embodiments, the non-normalized query operator execution flow 2433 can therefore include no more than one UNION DISTINCT operator 2623, regardless of how many OR operators are present in the query expression. In such embodiments, the top-most OR can be flagged and/or identified in the recursive process and/or can be identified in the resulting query execution flow 2433, for example, where only the top-most UNION identified in the query operator execution flow 2433 is converted to a UNION DISTINCT to generate the final query operator execution flow 2433 for the non-normalized query expression, for example, in conjunction with inserting the one identifier appending function 2622 only before the bottom-most TEE in the query operator execution flow 2433.

In some embodiments, the non-normalized execution flow generating module 2628 can determine whether or not to include UNION DISTINCTS and identifier appending function 2622 in other OR operator sub-flows 2665. This determination can be based on the expected number and/or proportion of unique rows to the corresponding TEE, which can be determined based on tracking of historical information and/or based on known distribution of values of the data, for example, as discussed in conjunction with FIGS. 31A-31B. This determination can be based on applying a cost comparison of performing a union distinct versus a normal union, for example, based on tracked performance metrics for utilization of union distinct versus a normal union for additional nested and/or serial OR operator sub-flows 2665 historically.

In some embodiments, the non-normalized execution flow generating module is operable to generate an updated, negation-free operator tree by propagating all negation operators in the operator tree to the leaf nodes, where some or all of the leaf node simple predicates are negated as a result. Propagation of a negation operators can include applying De Morgan's law to child nodes of the negation operator in the operator tree 2552 to reflect an equivalent logical expression. For example, when a negation node of the operator tree has an AND node as a child, the AND node can be converted into an OR node, where the children of prior AND node are negated as children of the OR node. Similarly, when a negation node of the operator tree has an OR node as a child, the OR node can be converted into an AND node, where the children of prior OR node are then negated as children of the new AND node. These negations can be further propagated as necessary until all negations are at the leaf node level of the operator tree. The non-normalized query operator execution flow can then be generated without any negation operators, where instead the SELECT operators reflect the negated simple predicate for the leaf node-level negations of the updated operator tree.

FIG. 26C illustrates an example embodiment of the identifier appending function 2622. In this example, the identifier appending function 2622 is operable to append a column containing a value indicating the of the count of other incoming rows thus far that are identical to the given row. This value can be incremented for a set of identical columns as each new row with exactly the set of identical columns is processed.

In the particular example presented in FIG. 26C, the incoming rows include two columns. The identifier appending function 2622 appends a third column to each row indicating the current count of received rows that include the exact set of values in the first two rows. The counter begins at one in this example, where rows appended with the value of one denotes the set of values of the set of all previous columns in the row correspond to the first instance of the set of the set of values for the set of all previous columns for incoming rows received thus far. A first instance of a row that includes the value 'B' in the first column and the value '1' in the second column is thus appended with a column indicating the value '1'. However, a second instance of a row that includes the value 'B' in the first column and the value '1' in the second column is appended with a column indicating the value '2', indicating this is the second instance of a row with these two values in its two columns.

The identifier appending function 2622 of FIG. 26C can be implemented by utilizing a window function, such as the SQL WINDOW function. In particular, the ROW NUMBER function can be performed over a window function that includes a PARTITION BY and/or ORDER BY function to achieve these results. The identifier appending function 2622 of FIG. 26C can otherwise be operable to increment a counter for each particular set of values in response to each particular set of values being processed. In other embodiments, the identifier appending function 2622 instead increments another counter, for example, where every identifier itself is unique across all incoming rows. This can include assigning a unique identifier appended to each row, where each unique identifier is different from all other unique identifiers appended to all other rows, or is different from all other unique identifiers appended to all other rows with a sufficiently high probability. In some embodiments, such a unique identifier can be alternatively appended to the rows in storage, for example, when the rows are received for storage and/or are processed for storage. In such cases, the same unique identifier is utilized for a given row in every query operator execution flow. In these embodiments, the identifier appending function 2622 is not included in query operator execution flow, as the unique identifier has already been appended and/or otherwise assigned to the row.

Figure 26D:
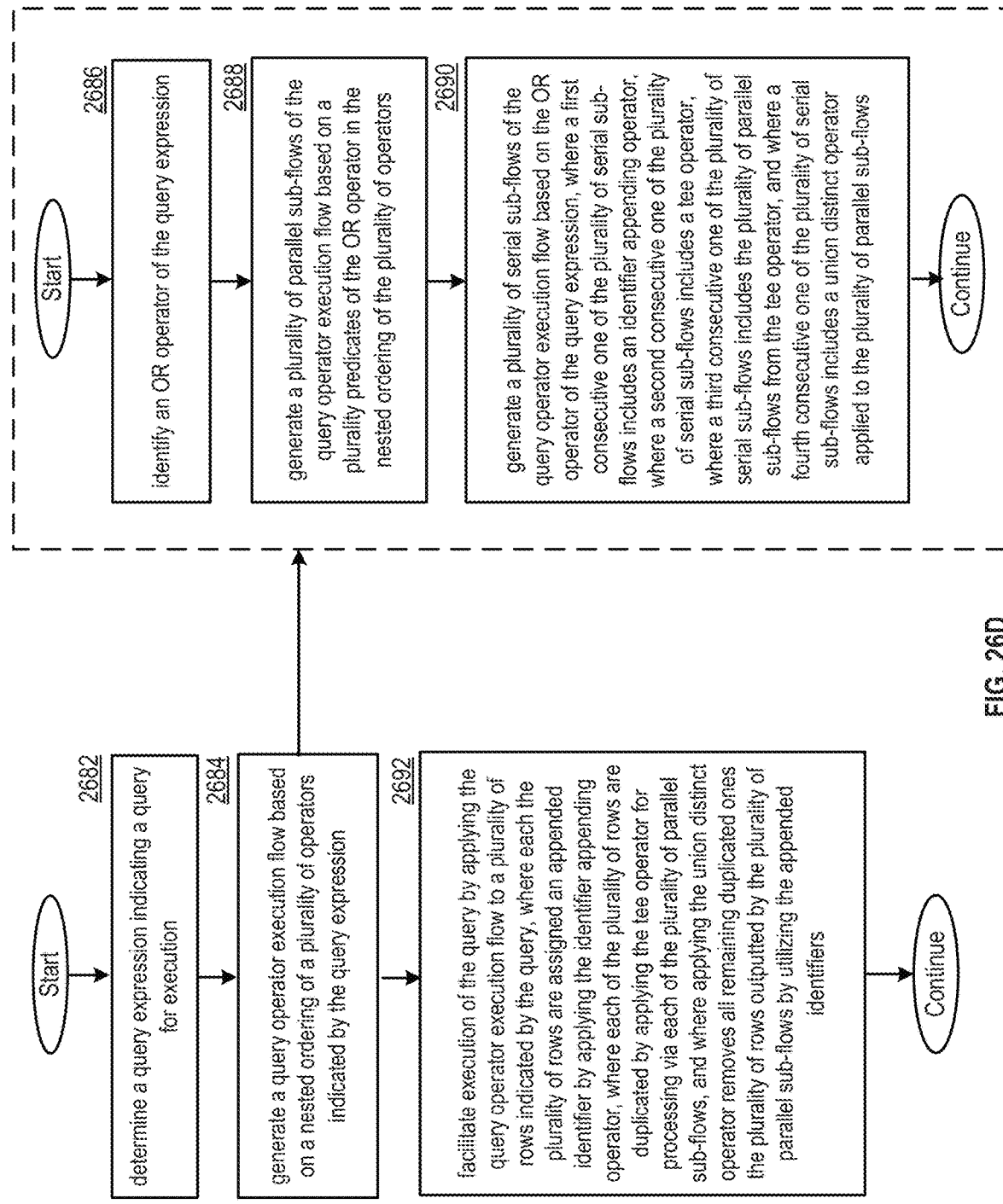
FIG. 26D is a logic diagram illustrating a method of executing a query in accordance with a non-normalized form in accordance with various embodiments of the present invention.

FIG. 26D illustrates a method for execution by a node 37. For example, the node can utilize at least one processing module of the node 37 to execute operational instructions stored in memory accessible by the node, where the execution of the operational instructions causes the node 37 to execute the steps of FIG. 26D. Different nodes 37 of the same or different computing device 18 can independently execute the method of FIG. 26D concurrently, for example, based on different query expressions for different queries assigned to the different nodes. In some cases, the method of FIG. 26D is performed by a particular processing core resource 48 of a node 37, where different processing core resources 48 of the same node can independently execute the method of FIG. 26D concurrently, for example, on different query expressions for different queries assigned to the different processing core resources 48. The method of FIG. 26D can be performed by a node 37 in accordance with embodiments of node 37 discussed in conjunction with FIGS. 26A-26C, and/or in conjunction with other embodiments of node 37 discussed herein. Some or all of the method of FIG. 26D can be performed by another processing module of the database system 10.

In particular, the method of FIG. 26D can be performed by a query expression processing module 2512 and/or an operator processing module 2435. For example, the query expression processing module 2512 and/or the operator processing module 2435 can include a processor and memory that includes executable instructions. The executable instructions, when executed by the processor, cause the query expression processing module 2512 and/or the operator processing module 2435 to execute some or all of the steps of FIG. 26D.

Step 2682 includes determining a query expression indicating a query for execution. Step 2684 includes generating a query operator execution flow based on a nested ordering of a plurality of operators indicated by the query expression. Generating the query operator execution flow of step 2684 can be accomplished via performance of the sub-method of FIG. 26D that includes steps 2686, 2688, and 2690. Step 2682 includes identifying an OR operator of the query expression. Step 2688 includes generating a plurality of parallel sub-flows of the query operator execution flow based on a plurality predicates of the OR operator in the nested ordering of the plurality of operators. Step 2690 includes generating a plurality of serial sub-flows of the query operator execution flow based on the OR operator of the query expression. A first consecutive one of the plurality of serial sub-flows includes an identifier appending operator, such as the identifier appending function 2622. A second consecutive one of the plurality of serial sub-flows includes a tee operator, such as TEE operator 2621. A third consecutive one of the plurality of serial sub-flows includes the plurality of parallel sub-flows from the tee operator. A fourth consecutive one of the plurality of serial sub-flows includes a union distinct operator, such as UNION DISTINCT operator 2623, applied to the plurality of parallel sub-flows. In various embodiments, the query operator execution flow generated in step 2684 is in neither CNF form nor DNF form.

Step 2692 can be performed once generating the query operator execution flow of step 2684 is complete, for example, based on steps 2686, 2688, and 2690 of the sub-method being performed to facilitate performance of step 2684. Step 2692 includes facilitating execution of the query by applying the query operator execution flow to a plurality of rows indicated by the query, for example as a plurality of input data blocks to the query operator execution flow. Each the plurality of rows is assigned an appended identifier by applying the identifier appending operator. Each of the plurality of rows are duplicated by applying the tee operator for processing by applying each of the plurality of parallel sub-flows. Applying the union distinct operator removes all remaining duplicated ones the plurality of rows outputted by the plurality of parallel sub-flows by utilizing the appended identifiers.

In various embodiments, at least two of the plurality of rows are identical. The at least two of the plurality of rows are assigned different appended identifiers, and none of the at least two of the plurality of rows are removed by applying the union distinct operator based on being assigned the different appended identifiers. In various embodiments, applying the identifier appending operator to each of the at least two of the plurality of rows includes incrementing a value of the appended identifier for each subsequently processed one of the at least two of the plurality of rows based on determining the subsequently processed one of the at least two of the plurality of rows is identical to at least one previously processed one of the at least two of the plurality of rows. In various embodiments, a set of different rows in the plurality of rows have a same appended identifier assigned by applying the identifier appending operator to each of the set of different rows, and none of the set of different rows are removed by applying the union distinct operator based on each of the set of different rows being distinct from all other ones of the set of different rows.

In various embodiments, generating the query operator execution flow includes generating an operator tree based on the ordering of a plurality of operators indicated by the query expression. The operator tree indicates the plurality of operators as a plurality of operator nodes of the operator tree. In various embodiments, generating the query operator execution flow includes identifying at least one negation operator in the operator tree, and further includes generating a modified operator tree by propagating the at least one negation operator to leaf nodes of the operator tree. In various embodiments, propagating the at least one negation operator to leaf nodes of the operator tree includes applying a plurality of propagations of each negation operator down the operator tree by at least one operator node of the operator tree. Applying each of the plurality of propagations at a corresponding operator node of the operator tree includes applying De Morgan's law to perform a conversion of the corresponding operator node. Performing the conversion of the corresponding node includes one of: converting the corresponding node from an AND operator to an OR operator; or converting the corresponding node from an OR operator to an AND operator.

FIG. 27A illustrates an embodiment of the query expression processing module 2512 that is operable to generate query form selection data 2562 indicating a selection from CNF form, DNF form, and a non-normalized form, such as the non-normalized form discussed in conjunction with FIGS. 26A-26C. As discussed in conjunction with FIGS. 25A-25D, it can be favorable to elect between CNF form and DNF form for incoming queries, rather than performing a conversion to the same form for all queries. As discussed in FIG. 26A-26C, the non-normalized query execution flow can also be a favorable option. Some query expressions may be most efficiently processed when a non-normalized query execution flow is generated from the query expression and utilized for execution of the corresponding query, where the non-normalized query operation execution flow is more efficient than or otherwise favorable over a DNF query operation execution flow or a CNF query operation execution flow for the given query expression. However, some query expressions may be more efficiently processed when a CNF or DNF query operation execution flow is generated and executed. In particular, CNF form can be more favorable than both DNF form and non-normalized form for query expressions that are already in CNF form and/or are very similar to CNF form where only a minor conversion is required. Similarly, DNF form can be more favorable than both CNF form and non-normalized form for query expressions that are already in DNF form and/or are very similar to DNF form where only a minor conversion is required.

The embodiment presented in FIG. 27A enabling the form of the query operator execution flow that will be generated and utilized to execute incoming queries to be selected from three options: CNF form, DNF form, and a non-normalized form. This improves database systems by increasing efficiency of generating of the query operator execution flows based on the query expression and/or by increasing efficiency of query execution by ensuring that a favorable form of query operator execution flow is being executed for each given query.

As illustrated in FIG. 27A, an operator tree 2552 can be generated via the operator tree generating module 2522 from a query expression 2542. The query form selection module 2524 can generate CNF cost data, DNF cost data, and non-normalized cost data from the operator tree 2552 and/or the query expression 2542 itself. In particular, a CNF cost function 2572 can be performed upon the operator tree 2552 to generate CNF cost data; a DNF cost function 2574 can be performed upon the operator tree 2552 to generate DNF cost data; and a non-normalized cost function 2776 can be performed upon the operator tree 2552 to generate non-normalized cost data. The CNF cost function, DNF cost function, and/or non-normalized cost function can be performed in accordance with a corresponding CNF cost function definition, a corresponding DNF cost function definition, and/or a corresponding non-normalized cost function definition, respectively. The CNF cost function definition, the DNF cost function definition, and/or the non-normalized cost function definition can be received by the query expression processing module 2512, stored in memory accessible by the query expression processing module 2512, and/or can otherwise be determined by query expression processing module 2512.

The CNF cost function 2572 can be implemented to determine and/or estimate one or more costs, such as time cost, processing cost, memory cost, and/or other efficiency cost associated with converting the query expression to CNF form, generating the CNF query operator execution flow from the converted query expression, and/or executing the query in accordance with the CNF query operator execution flow. The DNF cost function 2574 can be implemented to determine and/or estimate one or more costs, such as time cost, processing cost, memory cost, and/or other efficiency cost associated with converting the query expression to DNF form, generating the DNF query operator execution flow from the converted query expression, and/or executing the query in accordance with the DNF query operator execution flow. While a non-normalized execution flow does not necessarily require conversion of the query expression, the non-normalized cost function 2776 can be implemented to determine and/or estimate one or more costs, such as time cost, processing cost, memory cost, and/or other efficiency cost associated generating the non-normalized query operator execution flow from the query expression and/or the operator tree, and/or executing the query in accordance with the non-normalized query operator execution flow.

The CNF cost function 2572, DNF cost function 2574, and/or non-normalized cost function 2776 can be based on the positioning of particular operator nodes, such as AND nodes and OR nodes, in the operator tree. This positioning can be utilized to determine whether resulting query operator execution flows in each form would have large numbers of parallelized sub-flows, whether generation of the resulting query operator execution flows would be complicated, and/or whether execution of the resulting query operator execution flows would be costly to execute. This information can dictate the corresponding costs associated with each of the three query forms.

In some embodiments, the CNF cost function 2572 and DNF cost function 2574 as discussed in conjunction with FIGS. 25C and 25D can be performed upon the operator tree to generate the CNF cost data and DNF cost data, respectively, of FIG. 27A. In some cases, this can include generating a final DNF processing cost based on multiplying a raw DNF processing cost by a DNF scaling factor and/or can include generating a final CNF processing cost based on multiplying a raw CNF processing cost by a CNF scaling factor, as discussed previously in conjunction with FIGS. 25A-25E. In some cases, a non-normalized scaling factor can be similarly utilized to generate a final non-normalized cost as a product of a raw non-normalized cost, for example, generated based on the operator tree, multiplied by the non-normalized scaling factor.

The non-normalized scaling factor can similarly be determined based on measuring a processing time and/or resources associated with generating non-normalized query operator execution flows for each of a same or different plurality of query expressions from which DNF query operator execution flows and/or CNF query operator execution flows are generated with their corresponding processing time and/or resources measured, as discussed previously discussed previously in conjunction with FIGS. 25A-25E. In particular, an average processing time and/or resources measured to generate a plurality of or CNF query operator execution flows from converted CNF expressions of the plurality of query expressions can be calculated and/or determined; an average processing time and/or resources measured to generate a plurality of DNF query operator execution flows from converted DNF expressions of the plurality of query expressions can be calculated or determined; and/or an average processing time and/or resources measured to generate a plurality of or non-normalized query operator execution flows from converted non-normalized expressions, and/or the original expression, of the plurality of query expression can be calculated and/or determined. The relative averages calculated for generation of this plurality of CNF query operator execution flows, this plurality of DNF query operator execution flows, and this plurality of non-normalized query operator execution flows, can be compared and/or utilized to generate the corresponding scaling factors. For example, the ratios between the CNF scaling factor, the DNF scaling factor, and/or the non-normalized scaling factor can be set equal to and/or selected based on the corresponding ratios between the average processing time and/or resources calculated for generation of the plurality of CNF query operator execution flows, the plurality of DNF query operator execution flows, and the plurality of non-normalized query operator execution flows.

While the CNF cost function 2572 and DNF cost function 2574 of FIGS. 25C and 25D are related to cost of conversion and/or generating the resulting query operator execution flow, the corresponding cost data can also be correlated with and/or related to the ultimate processing cost, such as execution costs of executing the query in the corresponding form. In particular, an increasing complexity of conversion to CNF or DNF, indicated by higher corresponding CNF or DNF costs generated via the method of FIG. 25D, can be indicative of a more complicated query operator execution flow that would be generated from the conversion, which could me more inefficient in execution than a query operator execution flow resulting from a more simple conversion. For example, a complicated DNF conversion can result in a large number of parallelized sub-flows, which can require greater amounts of memory for execution and/or can be otherwise more inefficient than query operator execution flows with a smaller number of parallelized sub-flows. Alternatively, a different CNF cost function 2572 and DNF cost function 2574 can be performed to generate different the CNF cost data and DNF cost data, for example, where additional runtime considerations are utilized to generate the CNF cost data and DNF cost data.

In some embodiments, the non-normalized cost function can be based on the positioning of the single UNION DISTINCT operator 2623 and the corresponding identifier appending function 2622 in the non-normalized query operator execution flow. For example, the cost can be based on the duration of execution in which duplicates are required to be stored and processed. For example, non-normalized query operator execution flows with a greater number of operators between the UNION DISTINCT operator 2623 and the corresponding identifier appending function 2622 in the flow can have a greater cost than non-normalized query operator execution flows with a smaller number of operators between the UNION DISTINCT operator 2623 and the corresponding identifier appending function 2622 in the flow. As another example, non-normalized query operator execution flows with a smaller number of operators between the top of the flow and the UNION DISTINCT operator 2623 can have a greater cost than non-normalized query operator execution flows with a greater number of operators between the top of the flow and the UNION DISTINCT operator 2623. As another example, non-normalized query operator execution flows with a smaller number of operators between the bottom of the flow and the identifier appending function 2622 can have a greater cost than non-normalized query operator execution flows with a greater number of operators between the bottom of the flow and the identifier appending function 2622. As another example, non-normalized query operator execution flows with a UNION DISTINCT operator being processed over a higher number of parallelized sub-flows can have a greater cost than non-normalized query operator execution flows with the UNION DISTINCT operator being processed over a higher number of parallelized sub-flows.

In some embodiments, determining the positioning of the UNION DISTINCT operator 2623 and the corresponding identifier appending function 2622 is a function of the operator tree and/or is determinable based on the operator tree, where the non-normalized query operator execution flow itself need not be generated to compute the non-normalized cost. Alternatively, the non-normalized query operator execution flow can be first generated to determine the positioning of the operators in the flow, where the non-normalized cost function 2776 is performed upon, and/or utilizes the positioning of operators indicated by, the generated non-normalized query operator execution flow.

Once the CNF cost data, DNF cost data, and non-normalized cost data is generated for the given query expression 2542 based on the operator tree 2552, a query form selection function 2778 can be performed, for example, in accordance with a query form selection function definition that is received by the query expression processing module 2512; stored in memory accessible by the query expression processing module 2512, and/or otherwise determined by the query expression processing module 2512. The query form selection function 2778 can include selecting the one of the three query forms with the most favorable cost data, for example, indicating the corresponding query form is the most efficient query form for processing the given query.

In some embodiments, it can be favorable to utilize a CNF query operator execution flow 2433, even when a cost value of the CNF cost data is not the most favorable. In particular, generation and/or utilization of a query operator execution flow in CNF form can be generally less complicated than other forms. In such cases, CNF form can be automatically selected, regardless of the DNF cost data or non-normalized cost data, when the CNF cost data compares favorably to a predetermined CNF cost threshold. For example, if the value of the CNF cost generated in accordance with the example of FIG. 25D is less than or equal to, or otherwise compares favorably to, a predetermined maximum CNF cost value, CNF form is automatically selected. This automatic selection of CNF form can occur even if the value of the DNF cost generated in accordance with the example of FIG. 25D is less than or otherwise more favorable than the value of the CNF cost, and/or if the value of a non-normalized cost indicated in the non-normalized cost data is less than or otherwise more favorable than the value of the CNF cost.

If the CNF cost data compares unfavorably to the predetermined CNF cost threshold the query form selection function can then evaluate the DNF cost and non-normalized cost, and can select the form from CNF form, DNF form, and non-normalized form based on the CNF cost, DNF cost, and non-normalized cost. For example, if the CNF cost data compares unfavorably to the predetermined CNF cost threshold, the query form with the most favorable cost data, such as the query form with lowest corresponding cost across all three query forms, can be selected in generating the query form selection data 2562.

In some cases, the CNF cost data is generated first via the CNF cost function 2572, and the CNF cost data is compared to the predetermined CNF cost threshold. If the CNF cost data compares favorably to the predetermined CNF cost threshold, the DNF cost function and/or the non-normalized cost function are not performed, where DNF cost data and non-normalized cost data is not generated, and CNF form is automatically selected in generating the query form selection data. If the CNF cost data compares unfavorably to the predetermined CNF cost threshold, the DNF cost function and/or the non-normalized cost function are then performed, and the final query form is selected from CNF form, DNF form, and non-normalized form based on the generated CNF cost data, DNF cost data, and non-normalized cost data.

In some embodiments, other considerations can be utilized to determine whether to remove any of the options from consideration. In particular, because DNF conversion and corresponding query operator execution flow can be especially costly, DNF form can be automatically removed as an option for consideration when the DNF cost compares unfavorably to a predetermined DNF cost threshold. For example, if the value of the DNF cost generated in accordance with the example of FIG. 25D is greater than or equal to, or otherwise compares unfavorably to, a predetermined maximum DNF cost value, DNF form is automatically not selected and/or is removed from the set of options for selection. In this case, either CNF form or non-normalized form will be selected, for example, where the query form with the more favorable cost data is selected and/or where CNF form is automatically selected based on the CNF cost data comparing favorably to the predetermined CNF cost threshold. When the DNF cost compares favorably to the predetermined DNF cost threshold, the selection can be performed across all three query forms, for example if the CNF cost data was already determined to compare unfavorably to the predetermined CNF cost threshold. In particular, when the CNF cost data is determined to compare unfavorably to the predetermined CNF cost threshold, and when the DNF cost is determined to compares favorably to the predetermined DNF cost threshold, the query form can be selected from CNF form, DNF form, and non-normalized form, for example, where the one of these three query forms with the most favorable cost data is selected.

In some embodiments of performing the query form selection function 2778 by the query form selection module 2524, the non-normalized form is not considered, and the form is selected from CNF and DNF form only, for example based on their respective costs. For example, the selection from either CNF form or DNF form can be instead determined via performing the query form selection function 2578 discussed in conjunction with FIG. 25C. In some cases, the query form selection module 2524 can additionally determine, for some or all incoming query expressions, whether to generate the non-normalized cost data via performance of the non-normalized cost function 2776 and/or whether the non-normalized form should be considered as an option. The selection is made from CNF and DNF form only when the non-normalized cost data is determined not to be generated for a given query expression and/or when the non-normalized cost data is otherwise determined not to be considered for a given query expression. Similarly non-normalized cost data is generated and/or considered only when data is determined to be generated for a given query expression and/or when the non-normalized cost data is otherwise determined to be considered for a given query expression. In particular, the query expression processing module 2512 can dictate whether the non-normalized form is considered as an option by the query form selection module based on the query expression, based on the CNF and DNF costs generated for the query expression, and/or based on another determination.

Figure 27B:
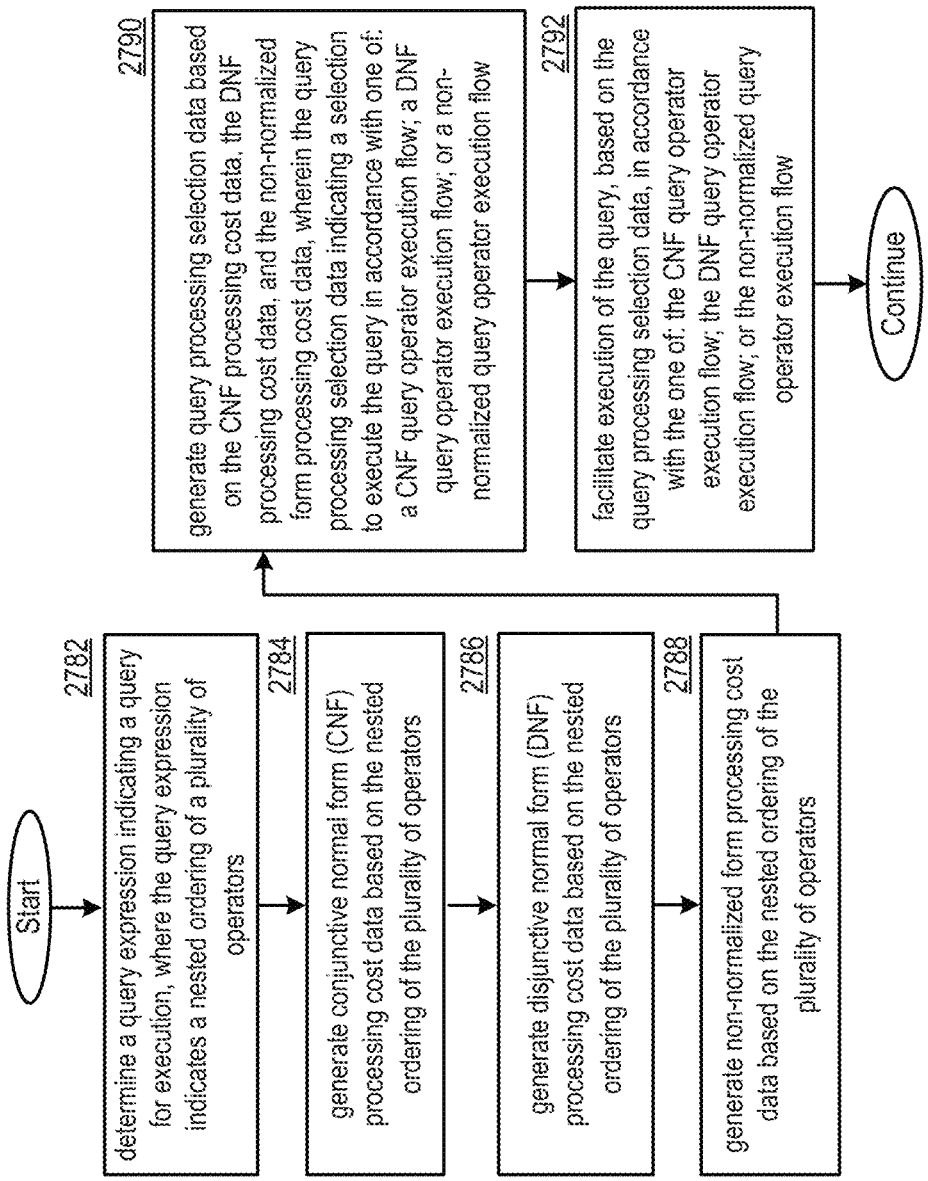
FIG. 27B is a logic diagram illustrating a method of selecting a normalized or non-normalized form for execution of a query in accordance with various embodiments of the present invention.

FIG. 27B illustrates a method for execution by a node 37. For example, the node can utilize at least one processing module of the node 37 to execute operational instructions stored in memory accessible by the node, where the execution of the operational instructions causes the node 37 to execute the steps of FIG. 27B. Different nodes 37 of the same or different computing device 18 can independently execute the method of FIG. 27B concurrently, for example, based on different query expressions for different queries assigned to the different nodes. In some cases, the method of FIG. 27B is performed by a particular processing core resource 48 of a node 37, where different processing core resources 48 of the same node can independently execute the method of FIG. 27B concurrently, for example, on different query expressions for different queries assigned to the different processing core resources 48. The method of FIG. 27B can be performed by a node 37 in accordance with embodiments of node 37 discussed in conjunction with FIGS. 27A, and/or in conjunction with other embodiments of node 37 discussed herein. Some or all of the method of FIG. 27B can be performed by another processing module of the database system 10.

In particular, the method of FIG. 27B can be performed by a query expression processing module 2512 and/or an operator processing module 2435. For example, the query expression processing module 2512 and/or the operator processing module 2435 can include a processor and memory that includes executable instructions. The executable instructions, when executed by the processor, cause the query expression processing module 2512 and/or the operator processing module 2435 to execute some or all of the steps of FIG. 27B.

Step 2782 includes determining a query expression indicating a query for execution, where the query expression indicates a nested ordering of a plurality of operators. Step 2784 includes generating conjunctive normal form (CNF) processing cost data based on the nested ordering of the plurality of operators. Step 2786 includes generating disjunctive normal form (DNF) processing cost data based on the nested ordering of the plurality of operators. Step 2788 includes generating non-normalized form processing cost data based on the nested ordering of the plurality of operators. Step 2790 includes generating query processing selection data based on the CNF processing cost data, the DNF processing cost data, and the non-normalized form processing cost data. The query processing selection data indicating a selection to execute the query in accordance with a CNF query operator execution flow; a DNF query operator execution flow; or a non-normalized query operator execution flow. Step 2792 includes facilitating execution of the query, based on the query processing selection data, in accordance with the selected one of: the CNF query operator execution flow; the DNF query operator execution flow; or the non-normalized query operator execution flow.

In various embodiments, the method further includes generating the CNF query operator execution flow by performing a CNF conversion upon the query expression when the query processing selection data indicates selection of the CNF query operator execution flow. In various embodiments, the method further includes generating the DNF query operator execution flow by performing a DNF conversion upon the query expression when the query processing selection data indicates selection of the DNF query operator execution flow. In various embodiments, the method further includes generating the non-normalized query operator execution flow that preserves the nested ordering of the plurality of operators when the query processing selection data indicates selection of the non-normalized query operator execution flow.

In various embodiments, the CNF processing cost data is based on a calculated CNF conversion cost, and the DNF processing cost data is based on a calculated DNF conversion cost. For example, the calculated CNF conversion cost and the calculated DNF conversion cost are generated as discussed in conjunction with FIGS. 25A-25E. In various embodiments, generating the query processing selection data includes comparing the CNF processing data to a predetermined CNF processing cost threshold. In various embodiments, the CNF processing data is automatically selected when the CNF processing data compares favorably to the predetermined CNF processing cost threshold. In various embodiments generating the query processing selection data further includes, when the CNF processing data compares unfavorably to the predetermined CNF processing cost threshold, identifying the most favorable processing cost by identifying one of: the CNF processing cost data, the DNF processing cost data, or the non-normalized form processing cost data, for example with a lowest or otherwise most favorable cost value. Selecting to execute the query in accordance with the one of: the CNF query operator execution flow; the DNF query operator execution flow; or the non-normalized query operator execution flow is based on selecting the query operator execution flow corresponding to the most favorable processing cost.

In various embodiments, generating the query processing selection data includes comparing the DNF processing data to a predetermined DNF processing cost threshold. The method further includes, when the DNF processing data compares unfavorably to the DNF processing cost threshold, selecting to execute the query in accordance with either the CNF query operator execution flow or the non-normalized query operator execution flow, based on whether the CNF processing cost data or the non-normalized processing cost data has a corresponding most favorable processing cost. The method further includes, when the DNF processing data compares favorably to the DNF processing cost threshold, selecting to execute the query in accordance with the CNF query operator execution flow, the DNF query operator execution flow, or the non-normalized query operator execution flow, based on whether the CNF processing cost data, the DNF processing cost data, or the non-normalized processing cost data has a corresponding most favorable processing cost.

Figure 28A:
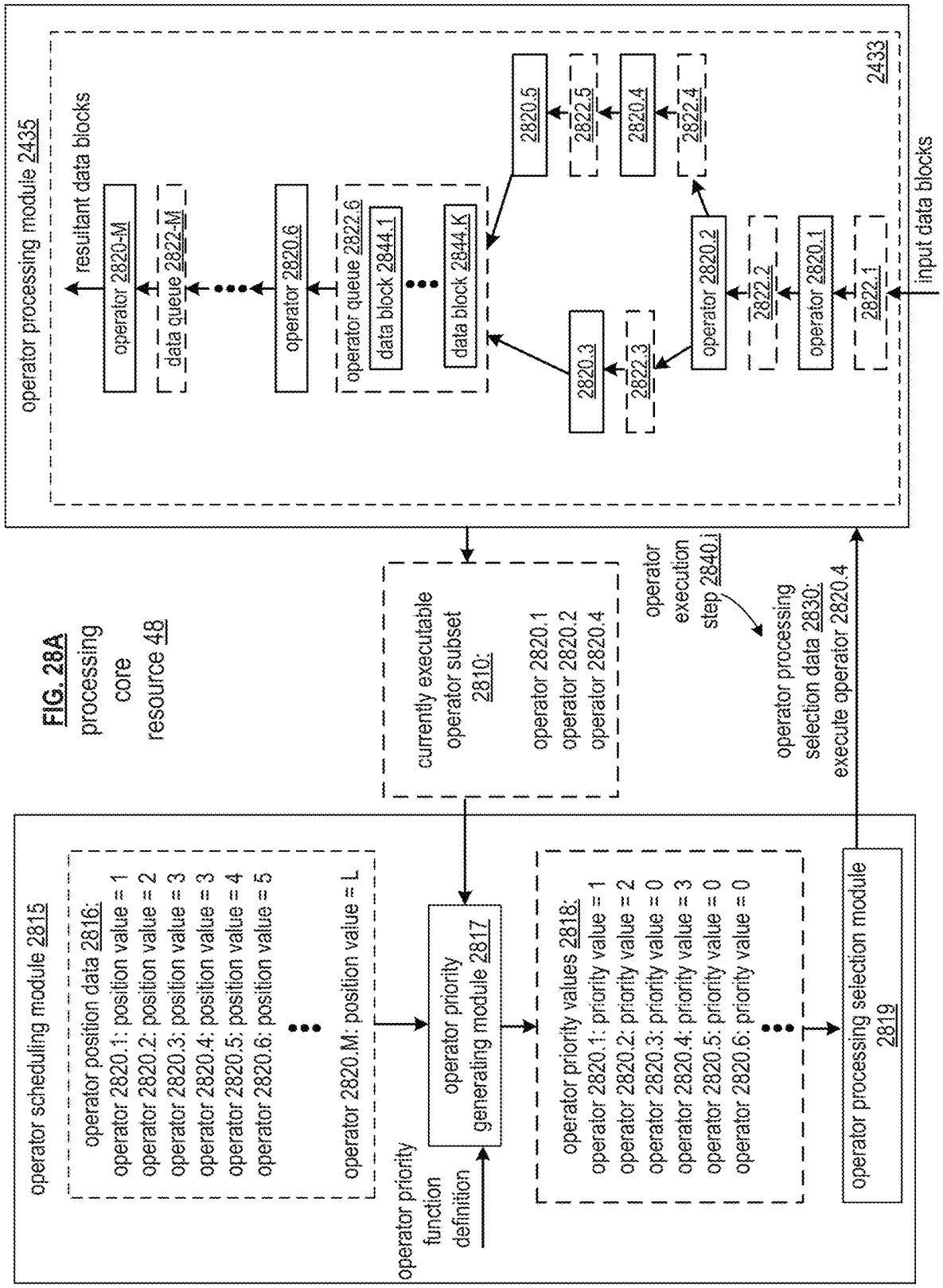
FIG. 28A is a schematic block diagrams of a processing core resource that implements an operator scheduling module and an operator processing module in accordance with various embodiments of the present invention.
Figure 28B:
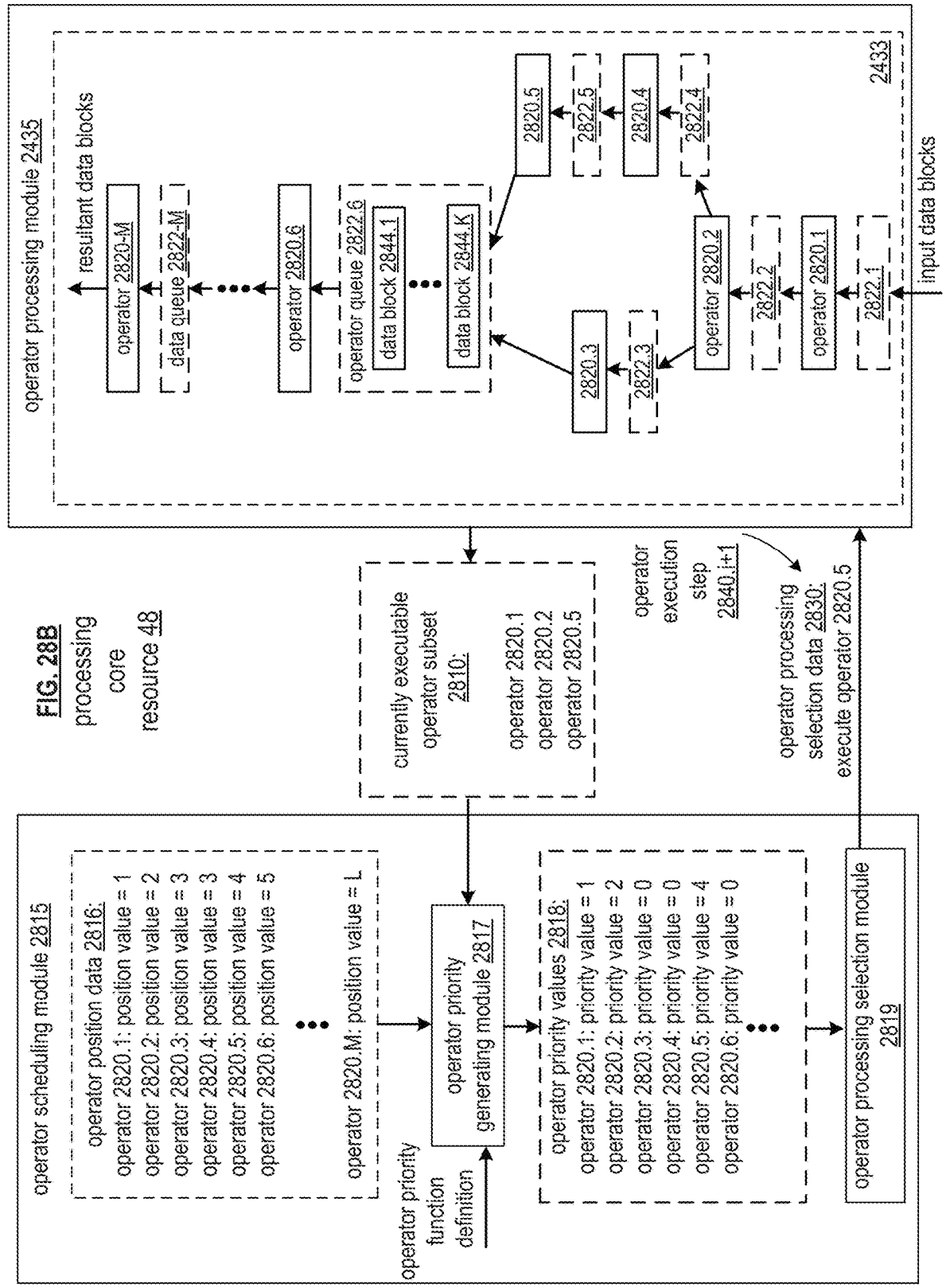
FIG. 28B is a schematic block diagrams of a processing core resource that implements an operator scheduling module and an operator processing module in accordance with various embodiments of the present invention.

FIGS. 28A-28B illustrate an example embodiment of a processing core resource 48 of a node 37 that implements an operator scheduling module 2815 to select an operator of a given query's query operator execution flow 2433 that will be executed at a given time. For example, a node's execution of a query, for example, via a single processing core resource 48 of its set of processing core resources 48-1-48-$n$, can be accomplished via a plurality of operator executions of operators 2820 of its query operator execution flow 2433 in a corresponding plurality of sequential operator execution steps. Each operator execution step 2840 of the plurality of sequential operator execution steps corresponds to execution of a particular operator 2820 of a plurality of operators 2820-1-2820-M of a query operator execution flow 2433. The particular one of the plurality of operators of the query operator execution flow 2433 that will be executed for a given one of the plurality of sequential operator execution steps is selected by the operator scheduling module 2815 in generation of operator processing selection data 2830 for the given one of the plurality of sequential operator execution steps. The operator scheduling module 2815 is operable to generate operator processing selection data 2830 for each one of the plurality of sequential operator execution steps indicating which operator will be executed in each operator execution steps.

The operator processing selection data 2830 generated by the operator scheduling module 2815 for each one of the plurality of sequential operator execution steps is utilized by the operator processing module 2435 to perform a corresponding operator execution by executing the selected one of the plurality of operators of the query operator execution flow 2433. As used herein, an operator execution corresponds to executing one operator 2820 of the query operator execution flow 2433 on one or more queued data blocks 2844 in an operator queue 2822 of the operator 2820. The operator queue 2822 of a particular operator 2820 includes data blocks that were outputted by execution of one or more other operators 2820 that are immediately below the particular operator in a serial ordering of the plurality of operators of the query operator execution flow 2433. In particular, the data blocks 2844 in the operator queue 2822 were outputted by the one or more other operators 2820 that are immediately below the particular operator via one or more corresponding operator executions of one or more previous operator execution steps in the plurality of sequential operator execution steps. Data blocks 2844 of an operator queue 2822 can be ordered based on an ordering in which the data blocks 2844 are received by the operator queue 2822. Alternatively, an operator queue 2822 is implemented as an unordered set of data blocks 2844.

If the particular operator 2820 is selected to be executed for a given one of the plurality of sequential operator execution steps, some or all of the data blocks 2844 in this particular operator 2820's operator queue 2822 are processed by the particular operator 2820 via execution of the operator to generate one or more output data blocks. For example, the input data blocks can indicate a plurality of rows, and the operation can be a SELECT operator indicating a simple predicate. The output data blocks can include only proper subset of the plurality of rows that meet the condition specified by the simple predicate.

Once a particular operator 2820 has performed an execution upon a given data block 2844 to generate one or more output data blocks, this data block is removed from the operator's operator queue 2822. In some cases, an operator selected for execution is automatically is executed upon all data blocks 2844 in its operator queue 2822 for the corresponding operator execution step. In this case, an operator queue 2822 of a particular operator 2820 is therefore empty immediately after the particular operator 2820 is executed. The data blocks outputted by the executed data block are appended to an operator queue 2822 of an immediately next operator 2820 in the serial ordering of the plurality of operators of the query operator execution flow 2433, where this immediately next operator 2820 will be executed upon its queued data blocks once selected for execution in a subsequent one of the plurality of sequential operator execution steps 2840.

Operator 2820.1 can correspond to a bottom-most operator 2820 in the serial ordering of the plurality of operators 2820.1-2820.M. As depicted in FIG. 28A, operator 2820.1 has an operator queue 2822.1 that is populated by data blocks received from another node as discussed in conjunction with FIG. 24B, such as a node at the IO level of the query execution plan 2405. Alternatively these input data blocks can be read by the same node 37 from storage, such as one or more memory devices that store segments that include the rows required for execution of the query. In some cases, the input data blocks are received as a stream over time, where the operator queue 2822.1 may only include a proper subset of the full set of input data blocks required for execution of the query at a particular time due to not all of the input data blocks having been read and/or received, and/or due to some data blocks having already been processed via execution of operator 2820.1. In other cases, these input data blocks are read and/or retrieved by performing a read operator or other retrieval operation indicated by operator 2820.

Note that in the plurality of sequential operator execution steps utilized to execute a particular query, some or all operators will be executed multiple times, in multiple corresponding ones of the plurality of sequential operator execution steps. In particular, each of the multiple times a particular operator 2820 is executed, this operator is executed on set of data blocks 2844 that are currently in their operator queue 2822, where different ones of the multiple executions correspond to execution of the particular operator upon different sets of data blocks that are currently in their operator queue at corresponding different times.

As a result of this mechanism of processing data blocks via operator executions performed over time, at a given time during the query's execution by the node 37, at least one of the plurality of operators 2820 has an operator queue 2822 that includes at least one data block 2844. At this given time, one more other ones of the plurality of operators 2820 can have operator queues 2822 that are empty. For example, an given operator's operator queue 2822 can be empty as a result of one or more immediately prior operators 2820 in the serial ordering not having been executed yet, and/or as a result of the one or more immediately prior operators 2820 not having been executed since a most recent execution of the given operator.

FIG. 28A presents the state of the query operator execution flow 2433 at a particular time after an (i−1)th one of the plurality of sequential operator execution steps 2840, illustrating the operator scheduling module's selection of the operator for execution in the ith one of the plurality of sequential operator execution steps 2840, denoted as operator execution steps 2840-i. While the operator 2820-1-2820-M of the query operator execution flow 2433 are illustrated to have corresponding operator queues 2822-1-2822-M, some of these operator queues 2822 may be empty, where these empty operator queues 2822 include no data blocks 2844. At least one operator queue 2822 is non-empty, where a non-empty operator queue 2822 includes at least one data block 2844. For example, as illustrated, operator queue 2822.6 of operator 2820.6 includes a plurality of data blocks 2844.1-2844.K. A first subset of the plurality of data blocks 2844.1-2844.K was outputted by operator 2820.3 based on a prior execution of operator 2820.3 upon data blocks previously in its data block queue 2822.3 at the time it was selected for execution. A second subset of the plurality of data blocks 2844.1-2844.K was outputted by operator 2820.5 based on a prior execution of operator 2820.5 upon data blocks previously in its data block queue 2822.5 at the time it was selected for execution. While not illustrated, other operator queues can also be non-empty. In particular, in the presented state of the query operator execution flow 2433 at after the (i−1)th one of the plurality of sequential operator execution steps 2840, consider an example where at least operators 2820.1, 2820.2, and 2820.5 are non-empty.

The operator scheduling module 2815 can be operable to intelligently select operators for execution for efficient query execution by the node. This can include employing a mechanism that aims to prevent operator queues from filling up as their corresponding operators wait to be selected for execution. In particular, the operator scheduling module 2815 is operable to prioritize and/or otherwise select operators for execution based on whether or not they are available to be executed at the current state, and further based on the operator's position in query operator execution flow 2433.

For each operator execution step 2840, the operator scheduling module 2815 can implement an operator priority generating module 2817, for example, that performs an operator priority function to generate priority values for some or all operators 2820.1-2820-M of the query operator execution flow 2433 of a given query selected for execution by the processing core resource 48. The operator priority function can be performed in accordance with an operator priority function definition that is received by the operator scheduling module 2815, that is stored in memory accessible by the operator scheduling module 2815, and/or that is otherwise determined by the operator scheduling module.

The operator priority function performed by the operator priority generating module 2817 can be a function of operator position data 2816 as well as a currently executable operator subset 2810. The operator position data 2816 can indicate position values for each of the plurality of operators 2820.1-2820.M. The operator position data 2816 of a given query can be fixed for the duration of the query's execution, as the serial ordering of these operators in the corresponding query operator execution flow 2433 does not change during the query's execution. This fixed operator position data 2816 can be generated or otherwise determined by the operator scheduling module 2815 when the query operator execution flow 2433 is generated, for example, by the execution flow generating module 2525 and/or can otherwise be determined based on the query operator execution flow 2433 being received and/or utilized to execute the corresponding query by the operator processing module 2435. The operator position data 2816 can be stored in memory of the operator scheduling module 2815, for example, for the duration of the corresponding query's execution.

The operator position data 2816 can indicate each operator's position value based on its position from the bottom of the query operator execution flow 2433 as a number of serially executed operators away from the first one of the plurality of operators in the ordering. The bottom-most operator 2820.1 is assigned a value of 1 in this example to indicate it is the first operator, where subsequently higher operators in the serial ordering have their values incremented accordingly. Note that both operator 2820.3 and operator 2820.4 are assigned a position value of 3, as they are both the third operator from the bottom after operators 2820.1 and 2820.2. Also note that operators that receive data blocks from multiple parallelized sub-flows are assigned a value based on their furthest path from the bottom, where operator 2820.6 is assigned position value of 5 based on being serially after the four operators in series 2820.1, 2820.2, 2820.4, and 2820.5. Other schemes of assigning values indicating the relative position of operators can be utilized in other embodiments.

The currently executable operator subset 2810 can indicate the set of operators, at the current state, that are ready to be executed and/or currently able to be executed. For example, any operator 2820 with an empty operator queue 2822 at a given state will not be included in the currently executable operator subset 2810 for the given state, as they have no data blocks to be executed upon via the operator 2820 and thus are not currently executable. Thus, all operators 2820 included in the currently executable operator subset have at least one data block in their operator queue 2822.

Whether or not an operator is currently executable can further be based on the type of operator. For some types of operators such as SELECT operators, TEE operators, or UNION operators, the operator can be performed on any data blocks as they are received, and do not have a threshold amount of data blocks required to be executed. As used herein, types of operators that can be executed on any number of rows of incoming data blocks, such as the SELECT operators, TEE operators, or UNION operators, are denoted as "non-blocking operators." Any non-blocking operator can be included in the currently executable operator subset 2810 at a given state and/or can otherwise be determined to be currently executable at the given state if their corresponding operator queue is non-empty.

However, other types of operators, such as JOIN operators or aggregating operators such as SUM, AVERAGE, MAXIMUM, or MINIMUM operators, require knowledge of the full set of rows that will be received as output from previous operators to correctly generate their output. As used herein, such operators 2820 that must be performed on a particular number of data blocks, such as all data blocks that will be outputted by one or more immediately prior operators in the serial ordering of operators in the query operator execution flow 2433 to execute the query, are denoted as "blocking operators." Blocking operator are only determined to be included in the currently executable operator subset 2810 at a given state if their corresponding operator queue includes all of the required data blocks to be executed. For example, some or all blocking operators are determined to be included in the currently executable operator subset 2810 at a given state only if all prior operators in the serial ordering of the plurality of operators in the query operator execution flow 2433 have had all of their necessary executions completed for execution of the query, where none of these prior operators will be further executed in accordance with executing the query. If less than all of the required data blocks are included in the operator queue 2822 of a blocking operator 2820 at a given state, the blocking operator is not currently executable, and is thus determined not to be included in the currently executable operator subset 2810 for the given state.

The currently executable operator subset 2810 can be received from the operator processing module 2435, where the currently executable operator subset 2810 is generated by or otherwise determined by the operator processing module 2435. This information can be alternatively determined by another processing module monitoring and/or able to access the state of the query operator execution flow 2433, such as whether each operator queue 2822 is empty, the size of each operator queue 2822, and/or other information regarding whether each operator is available for execution. Alternatively the operator scheduling module 2815 can track its prior operator processing selection data to determine which operators have pending data blocks in their operator queues based on an immediately prior operator having been scheduled for execution in operator processing selection data 2830 generated for a previous operator execution step 2840. The operator scheduling module 2815 can otherwise determine and/or estimate which ones of the plurality of operators 2820.1-2820.M are currently able to be executed as the currently executable operator subset 2810.

At the state presented in FIG. 28A, the currently executable operator subset 2810 includes operator 2820.1, operator 2820.2, and operator 2820.4. Thus, each of the operator queues 2822.1, 2822.2, and 2822.4 are non-empty. Other operators with non-empty operator queues, such as operator 2820.6 with its K data blocks, are not included in the currently executable operator subset, for example, because they are blocking operators.

The operator priority generating module 2817 generates a plurality of priority values for the plurality of operators and/or otherwise indicates a highest priority operator. In this example, all operators that cannot be executed, determined by not being included in the currently executable operator subset 2810 or otherwise determined to not be available for execution, are assigned a lowest priority value or otherwise least favorable priority value. In this particular example of the operator priority function, all non-executable operators are assigned a priority value of zero, regardless of their position value. Only the operators in the currently executable operator subset 2810 are assigned positive values, where higher priority values in this example correspond to more favorable priority values. In other embodiments, the non-executable operators can otherwise be assigned the same or different value that is less favorable than priority values assigned to all executable operators in the currently executable operator sub set 2810.

The priority value can further be a function of the position value for operators in the currently executable operator subset 2810. In this example, the priority value is set equal to the determined position value of the operator position data 2816. In other embodiment, the relative ordering of operators with respect to the bottom of the query operator execution flow 2433 can be indicated in a different fashion. In particular, the operator in the currently executable operator subset 2810 that is the furthest from the bottom of the query operator execution flow, and/or that otherwise requires data blocks to be flowed via the greatest number of operators of operators in the currently executable operator subset 2810, is assigned the most favorable priority value of the operators in the plurality of operators 2820.1-2820.M. In this case, operator 2820.4 has a position value indicating a furthest position from the bottom of the query operator execution flow of the operators in the currently executable operator subset 2810, and is assigned a priority value of 3, based on its position value being equal to 3 and based on being included in the currently executable operator subset 2810. In this example, higher priority values correspond to more favorable priorities, and operator 2820.4 is thus assigned the most favorable priority value.

The operator processing selection module 2819 can select the operator with the most favorable priority value indicated in the operator priority values 2818 to generate operator processing selection data 2830 that indicates this selected operator for execution in the next operator execution step 2840 of the plurality of sequential operator execution steps. In the given state illustrated in FIG. 28A, operator 2820.4 is selected by the operator processing selection module 2819 because it is determined to have the most favorable priority value at this given state, and is indicated in the operator processing selection data 2830 for execution in operator execution step 2840.*i*.

In response to the operator processing selection data 2830 indicating operator 2820.4, the operator processing module 2435 performs operator execution step 2840.*i* by executing operator 2820.4 upon some or all of its queued data blocks 2844 in its operator queue 2822.4. This results in at least one output data block 2844 that is appended to operator queue 2822.5. This changes the state of the query operator execution flow 2433 to a next state resulting from performance of operator execution step 2840.*i*, where operator queue 2822.5 now includes the data blocks outputted via execution of operator 2820.4 upon its own operator queue 2820.4, and where operator queue 2822.4 is empty or otherwise does not include the data blocks that were processed by the operator 2820.4 in operator execution step 2840.*i* to generate the output data blocks added to operator queue 2822.5.

Because operator 2820.5 was not executable in the state of FIG. 28A immediately prior to execution of operator execution step 2840.*i* in this example, if operator 2820.5 is a non-blocking operator, operator queue 2822.5 included no data blocks 2844 immediately prior to execution of operator execution step 2840.*i*. In the case where operator 2820.5 is a non-blocking operator, operator queue 2822.5 only includes the at least one data block 2844 outputted via execution of operator 2820.4 upon its own operator queue 2820.4 in operator execution step 2840.*i*. In the case where operator 2820.5 is a blocking operator, operator queue 2822.5 may have included data blocks 2844 immediately prior to execution of operator execution step 2840.*i* that were previously outputted by operator 2820.4 in one or more prior operator execution steps before operator execution step 2840.*i*. However, any data blocks included in operator queue 2822.5 immediately prior to execution of operator execution step 2840.*i* did not constitute all required data blocks for execution of operator 2820.5 in this example, as operator 2820.5 was not executable at this state.

FIG. 28B illustrates how this updated state of the example query operator execution flow 2433 can cause changed in priority values generated by the operator scheduling module 2815 for operators 2820.1-2820.M, and how this influences the selection of the next operator for execution at operator execution step 2840.*i*+1. Because operator 2820.4 was executed upon data blocks in its operator queue at operator execution step 2840.*i*, operator queue 2820.4 became empty. As no other operator execution steps 2840 have since been performed upon operator 2820.2 to populate operator queue 2822.4 with new data blocks, operator queue is still empty at this state, rendering operator 2820.4 as non-executable. As illustrated in this example, the currently executable operator subset 2810 for the state after operator execution step 2840.*i* is performed does not include operator 2820.4 because it is not executable at this state. However, operator 2820.5 is executable as a result of the data blocks outputted by operator 2820.4's execution in operator execution step 2840.*i* being added to its operator queue 2822.5, and the currently executable operator subset 2810 for this state therefore includes operator 2820.5. Operators 2820.1 and 2820.2 are included in the currently executable operator subset 2810 for this state as well as based on having been included in the currently executable operator subset 2810 for the previous state as illustrated in FIG. 28A, and based on not having been executed in operator execution step 2840.*i*, therefore rendering their operator queues 2820.1 and 2820.2 un-emptied.

The change from non-executability to executability of operator 2820.5 at this state can be due to operator queue 2822.5 changing from being empty to non-empty due to the addition of the data blocks outputted by operator 2820.4 if operator 2820.5 is a non-blocking operator. The change from non-executability to executability of operator 2820.5 at this state can be due to operator queue 2822.5 changing from including less than the required number of data blocks to including all of the required data blocks due to the addition of the data blocks outputted by operator 2820.4 if operator 2820.5 is a blocking operator. However, in some embodiments, a blocking operator is only executable if no lower-positioned operators that stream data blocks in the query operator execution flow 2433 to the blocking operator are executable, as this would indicate that additional data blocks could still be streamed up the flow to the blocking operator from these executable operators to generate additional required data blocks for execution of the blocking operator. In this case, operator 2820.5 may not be a blocking operator due to operators 2020.1 and 2820.2 being executable as well, and thus further data blocks could be processed up the flow and into operator queue 2822.5.

As illustrated in FIG. 28B, the priority data generated for this state reflects that only operators 2820.1, 2820.2, and 2820.5 are currently executable, based on the currently executable operator subset 2810 determined for this state. Because operator 2820.5 is the highest operator in the query operator execution flow from the bottom, its priority value is assigned as the most favorable priority with a highest value of 4. In this example, the same example operator priority function is utilized to assign executable operators non-zero values reflecting their position value. The operator processing selection module 2819 selects operator 2820.5 based on having the highest priority value in the operator processing selection data 2830 for operator execution step 2840.$i$+1. The operator processing module 2435 executes operator 2820.5 on its operator queue 2822.5 to perform operator execution step 2840.$i$+1 based on the operator processing selection data 2830 indicating operator 2820.5. While the next state of the query operator execution flow is not illustrated, the data blocks outputted via execution of operator 2820.5 upon its operator queue 2822.5 in operator execution step 2840.$i$+1 are appended to operator queue 2822.6 to increase the number of data blocks in operator queue 2822.6 to a number of data blocks that is larger than K data blocks.

FIGS. 28C and 28D illustrate methods for execution by a node 37. For example, the node can utilize at least one processing module of the node 37 to execute operational instructions stored in memory accessible by the node, where the execution of the operational instructions causes the node 37 to execute the steps of FIG. 28C and/or FIG. 28D. Different nodes 37 of the same or different computing device 18 can independently execute the method of FIG. 28C and/or FIG. 28D concurrently, for example, based on different query expressions for different queries assigned to the different nodes. In some cases, the method of FIG. 28C and/or FIG. 28D is performed by a particular processing core resource 48 of a node 37, where different processing core resources 48 of the same node can independently execute the method of FIG. 28C and/or 28D concurrently, for example, on different query expressions for different queries assigned to the different processing core resources 48. The method of FIG. 28C and/or FIG. 28D can be performed by a node 37 in accordance with embodiments of node 37 discussed in conjunction with FIGS. 28A-28B, and/or in conjunction with other embodiments of node 37 discussed herein. Some or all of the method of FIG. 28C and/or FIG. 28D can be performed by another processing module of the database system 10.

In particular, the method of FIG. 28C and FIG. 28D can be performed by an operator scheduling module 2815 and/or an operator processing module 2435 of a particular processing core resource 48 of a node 37. For example, the operator scheduling module 2815 and/or the operator processing module 2435 can include a processor and memory that includes executable instructions. The executable instructions, when executed by the processor, cause the operator scheduling module 2815 and/or the operator processing module 2435 to execute some or all of the steps of FIG. 28C and/or FIG. 28D.

As the method of FIG. 28C includes steps 2872, 2874, and 2876. Step 2872 includes determining a query operator execution flow for execution of a query, where the query operator execution flow includes a plurality of operators. Step 2874 includes determining a position value for each of the plurality of operators based on a number of other operators in the plurality of operators that are serially positioned before the each of the plurality of operators in the query operator execution flow. Step 2876 includes facilitating execution of the query upon a plurality of data blocks by performing a plurality of sequential operator execution steps, which can each include an operator execution step 2840 and/or corresponding scheduling of the selected operator for execution by the operator scheduling module 2815.

Performance of each of the plurality of sequential operator execution steps can include performing the method of FIG. 28D, for example, where the plurality of sequential operator execution steps are performed by repeating the method of FIG. 28D a corresponding plurality of times. Thus, the method of FIG. 28D can correspond to a single one of the plurality of sequential operator execution steps. As illustrated in FIG. 28D, step 2882 includes determining whether each of the plurality of operators of the query operator execution flow is currently executable at the corresponding one the plurality of sequential operator execution steps, for example, based on a current state of the query operator execution flow resulting from a prior one of the plurality sequential operator execution steps. Step 2884 includes generating a plurality of priority values by calculating a priority value for each of the plurality of operators of the query operator execution flow. Each one of the plurality of priority values is calculated based on whether the corresponding one of the plurality of operators of the query operator execution flow is determined to be currently executable, and is further based on the position value of the corresponding one of the plurality of operators. Step 2886 includes identifying one of the plurality of operators with a corresponding most favorable one of the plurality of priority values, such as a highest one of the plurality of priority values. Step 2888 includes facilitating execution of the one of the plurality of operators on a queued set of data blocks of the one of the plurality of operators to generate at least one output data block. Step 2890 includes identifying a next one of the plurality of operators serially positioned consecutively after the one of the plurality of operators in the query operator execution flow. Step 2892 includes appending the at least one output data block to another queued set of data blocks of the next one of the plurality of operators.

Step 2894 includes advancing to a next one of the plurality of sequential operator execution steps. For example, performing step 2894 includes initiating a next iteration of the method of 28D corresponding to a next one of the plurality of sequential execution steps that corresponds to a subsequent operator execution of the query. In particular, in this next iteration, an updated state of the query operator execution flow, resulting from generate at least one output data block in step 2888 and appending the at least one output data block to another queued set of data blocks of the next one of the plurality of operators in step 2892, can be utilized to determine whether each of the plurality of operators of the query operator execution flow is currently executable at this subsequent one the plurality of sequential operator execution steps to perform step 2882 for this subsequent one the plurality of sequential operator execution steps.

In various embodiments, determining whether the each of the plurality of operators of the query operator execution flow is currently executable at the each of the plurality of sequential operator execution steps is based on determining whether a queued set of data blocks of the each of the plurality of operators is empty. In various embodiments, the plurality of operators includes at least one blocking operator. Determining whether each of the at least one blocking operator of the query operator of the execution flow is currently executable at the each of the plurality of sequential operator execution steps is based on determining whether all of the plurality of data blocks to be processed by the query have been processed by a set of previous ones of the plurality of operators that are serially positioned before the each of the at least one blocking operator. In various embodiments, generating a plurality of priority values includes identifying ones of the plurality of operators that are determined not to be currently executable, and further includes assigning a least favorable priority value to the ones of the plurality of operators that are determined not to be currently executable.

In various embodiments, the corresponding most favorable one of the plurality of priority values is generated based on the one of the plurality of operators being included in a subset of the plurality of operators that are determined to be currently executable, and is further based on the one of the plurality of operators having a most favorable position value of all position values for all operators in the subset of the plurality of operators that are determined to be currently executable. In various embodiments, the one of the plurality of operators has a most favorable position value in the subset based on having a greater number of other operators that are serially positioned before the one of the plurality of operators in the query operator execution flow than all other operators in the subset of the plurality of operators that are determined to be currently executable.

As discussed thus far in conjunction with FIGS. 28A-28D, operator processing selection data 2830 is generated for execution of a single query, where the plurality of sequential operator execution steps each correspond to a single query being executed by the operator processing module 2435 of a processing core resource 48. In some embodiments, the operator scheduling module 2815 of a processing core resource 48 can further operable to concurrently execute multiple queries via operator processing module 2435.

Such an embodiment of scheduling execution of operators for multiple concurrently executing queries is illustrated in FIG. 29A. FIG. 29A illustrates an embodiment of an operator scheduling module 2815 that is implemented to schedule execution of operators in a set of concurrently executing queries 1-R. In particular, the processing core resource 48 can be assigned the set of multiple queries for concurrent execution by a processing module of its node 37, its computing device 18, and/or by another processing module of the database system 10. The processing core resource 48 can otherwise receive and/or determine the assigned the set of multiple queries for concurrent execution.

The operator processing selection data 2830 can be generated to indicate a selected one of the plurality of queries 1-R to be executed in the corresponding operator execution step 2840, as well as a selected one of the plurality of operators of this selected query's query operator execution flow 2433. While each of the plurality of sequential operator execution steps as discussed in conjunction with FIGS. 28A-28C corresponded to execution of one of the plurality of operators 2820.1-2820.M of the same query operator execution flow 2433, the plurality of sequential operator execution steps can correspond to operator executions of different ones of a set of multiple concurrently executing queries. In particular, a selected operator of a first query can be executed in a first step of the plurality of sequential operator execution steps, a selected operator of a second query can be executed in a second one of the plurality of sequential operator execution step that is after the first step, and a same of different selected operator of the first query can be executed in a third step of the plurality of sequential operator execution steps that is after the second step.

In this fashion, a first temporal period corresponding to the execution of the first query by the processing core resource 48 can span from the first performance of an operator execution of the first query's query operator execution flow to the last performance of an operator execution of the first query's query operator execution flow. A second temporal period corresponding to the execution of the second query by the processing core resource 48 can span from the first performance of an operator execution of the second query's query operator execution flow to the last performance of an operator execution of the second query's query operator execution flow. At least a portion of the first temporal period can overlap temporally with the second temporal period.

FIG. 29A illustrates a state of a plurality of R query operator execution flows 2433.1-2433.R at a time after execution of operator execution step 2840.($i-1$) and before execution of the next operator execution step 2840.$i$ in the plurality of sequential operator execution steps. This plurality of query operator execution flows 2433.1-2433.R can correspond to a set of R concurrently executing queries and can each have a plurality of operators 2820.1-2820.M with a corresponding plurality of operator queues 2822.1-2822.M. The number of operators M and the corresponding serial ordering of the M operators can be the same or different for each flow. For each query operator execution flow 2433, each of its operator queues 2822 can be empty or non-empty, where a subset of the plurality of operators 2820 are currently executable based on their corresponding operator queue 2822 as discussed in conjunction with FIGS. 28A-28B.

The currently executing queries 1-R can be denoted by corresponding query data 2941.1-2941-R in query set 2940 that is received by, stored in memory by, and/or otherwise determined by the operator scheduling module 2815. Each query data 2941 can indicate the operator position data 2816 of the corresponding query, which can indicate a plurality of position value or other relative position data for the query operator execution flow 2433 of the corresponding query. For example, query data 2941.1 for query 1 includes operator position data 2841.1 that indicates position values 1-M of the plurality of operators 2820.1-2820.M of the query operator execution flow 2433.1 for query 1.

The query data 2941 can optionally include query priority data indicating an assigned priority value of the query, for example, where the query priority data 2942.1-2942.R of the query data 2941.1-2942.R indicates relative priorities of the set of queries 1-R. The query data 2941 can be received with the query, for example, set by a user based on user input to a graphical user interface in conjunction with generating a query expression indicating the query. The query data 2941 can be generated automatically by a processing module of the database system 10, for example, based on the estimated processing and/or memory resources required to execute the query as discussed in conjunction with FIGS. 31A-31B. In some cases, the queries 1-R have no query priority data and/or are determined to have equal priority.

The operator scheduling module 2815 can implement a query selection module 2950 that selects which query of the set of queries 1-R will have an operator execution performed in the upcoming operator execution step 2840. The query selection module 2950 can perform a query selection function to select the query from the set of queries 1-R, for example, based on a query selection function definition that is received by the operator scheduling module 2815, stored in memory accessible by the operator scheduling module 2815, or otherwise determined by the operator scheduling module 2815.

The query selection function can dictate a turn-based selection of the plurality of queries, where each of the R queries are selected one at a time. In such cases, an operator execution is performed for each of the given queries every R operator execution steps and/or where operator executions are uniformly distributed across the set of queries 1-R. The query selection function can be implemented via a turn-based selection function when the queries 1-R are determined to have equal query priority values 2942 and/or when the query data does not include query priority values for the queries 1-R.

In other embodiments, the query priority values 2942.1-2942.R are utilized as input to the query selection function performed by the query selection module 2950. For example, a turn-based ordering can still be employed where the number of turns assigned to each query in each cycle of the turn-based ordering is determined to be proportional to and/or is otherwise determined based on the priority value of each query. For example, queries with higher or otherwise more favorable priority values are assigned a greater proportion of turns, are assigned a greater number of turns in each cycle of the turn-based ordering, and/or are otherwise selected more frequently by the query selection module that queries with lower or otherwise less favorable priority values.

The query selection module 2950 generates query selection data 2952 indicating the selected query for the upcoming operator execution step. Once this query is selected, the selection of the particular operator that will be executed in the upcoming operator execution step can be selected from the plurality of operators 2820.1-2820.M of this query's query operator execution flow 2433. Once the particular query is selection, the operator selection can be performed via the same mechanism as discussed in conjunction with FIGS. 28A-28C, for example, by utilizing the operator priority generating module 2817 and the operator processing selection module 2819.

In the particular example illustrated in FIG. 29A, query 2 is selected by the query selection module 2950 and is indicated in the query selection data 2952 accordingly. The operator priority generating module 2817 can utilize the query selection data 2952 to determine to only generate priority values for the query operator execution flow 2433.2 that corresponds to selected query 2. In such cases, only the currently executable operator subset 2810.2 and the operator position data 2816.2 is utilized by the operator priority generating module 2817 to generate a plurality of priority values 1-M for the operators 2820.1-2820.M of query operator execution flow 2433.2, for example, a same or similar fashion as discussed in conjunction with FIGS. 28A-28C.

In some embodiments, the currently executable operator subset 2810 and the operator position data 2816 is received for all queries, for example, in each cycle of the turn-based ordering, and priority values are generated for the operators of every query operator execution flow 2433.1-2433.R in response, where the priority values of each query are stored in local memory until the corresponding query is selected. In some cases, priority values of a given query operator execution flow 2433 are automatically updated in response to determining the state has changed, for example, based on an operator execution of the corresponding query being performed by the operator processing module 2435.

The plurality of operator priority values 2818 generated by operator priority generating module 2817 the for the selected query indicated in query selection data 2952 can be utilized by the operator processing selection module 2719 as discussed in FIGS. 28A-28B to generate the operator processing selection data 2830. The operator processing selection module 2817 can similarly select the operator in the selected query's query operator execution flow 2433 with the most favorable priority indicated based on the operator priority values 2818. In the example illustrated in FIG. 29A, operator 2820.4 of query 2 is selected for execution at operator execution 2840.*i*, for example, where query operator execution flow 2433.2 is the query operator execution flow 2433 of FIGS. 28A-28B in the same state prior to the same operator execution step 2840.*i*. However, in the next operator execution step 2840.*i*+1, an operator from a different query operator execution flow can be selected based on the query selection module determining to select a different query from query 2, for example, in accordance with a next ordered query in the turn-based ordering.

FIGS. 29B and 29C illustrate methods for execution by a node 37. For example, the node can utilize at least one processing module of the node 37 to execute operational instructions stored in memory accessible by the node, where the execution of the operational instructions causes the node 37 to execute the steps of FIG. 29B and/or FIG. 29C. Different nodes 37 of the same or different computing device 18 can independently execute the method of FIG. 29B and/or FIG. 29C concurrently, for example, based on different query expressions for different queries assigned to the different nodes. In some cases, the method of FIG. 29B and/or FIG. 29C is performed by a particular processing core resource 48 of a node 37, where different processing core resources 48 of the same node can independently execute the method of FIG. 29B and/or FIG. 29C concurrently, for example, on different query expressions for different queries assigned to the different processing core resources 48. The method of FIG. 29B and/or FIG. 29C can be performed by a node 37 in accordance with embodiments of node 37 discussed in conjunction with FIG. 29A, and/or in conjunction with other embodiments of node 37 discussed herein. Some or all of the method of FIG. 29B and/or FIG. 29C can be performed by another processing module of the database system 10.

In particular, the method of FIG. 29B and FIG. 29C can be performed by an operator scheduling module 2815 and/or an operator processing module 2435 of a particular processing core resource 48 of a node 37. For example, the operator scheduling module 2815 and/or the operator processing module 2435 can include a processor and memory that includes executable instructions. The executable instructions, when executed by the processor, cause the operator scheduling module 2815 and/or the operator processing module 2435 to execute some or all of the steps of FIG. 29B and/or FIG. 29C.

The method illustrated in FIG. 29B includes steps 2972, 2974, and 2976. Step 2972 includes determining a plurality of queries for execution. Step 2974 includes determining a plurality of query operator execution flows for execution of the plurality of queries, where each query operator execution flow of the plurality of query operator execution flows includes a plurality of operators for execution of one of the plurality of queries corresponding to the each query operator execution flow. Step 2976 includes facilitating execution of the plurality of queries by performing a plurality of sequential operator execution steps.

Performance of each of the plurality of sequential operator execution steps can include performing the method of FIG. 29C, for example, where the plurality of sequential operator execution steps are performed by repeating the method of FIG. 29C a corresponding plurality of times. Thus, the method of FIG. 29C can correspond to a single one of the plurality of sequential operator execution steps. As illustrated in FIG. 29C, step 2982 includes selecting one of the plurality queries for execution at the each of the plurality of sequential operator execution steps. Step 2984 includes selecting one of the plurality of operators of the one of the plurality of query operator execution flows corresponding to the one of the plurality of queries based on identifying one of the plurality of operators of the one of the plurality of query operator execution flows with a corresponding most favorable one of a plurality of priority values. Step 2986 includes facilitating execution of the one of the plurality of operators on a queued set of data blocks of the one of the plurality of operators to generate at least one output data block. Step 2988 includes advancing to a next one of the plurality of sequential operator execution steps. For example, performing step 2988 includes initiating a next iteration of the method of 29C corresponding to a next one of the plurality of sequential execution steps. In particular, in this next iteration, the same or different query can be selected from the plurality of queries in step 2982.

In various embodiments, selecting one of the plurality queries for execution at the each of the plurality of sequential operator execution steps is in accordance with a turn-based selection scheme. In various embodiments, selecting one of the plurality queries for execution at the each of the plurality of sequential operator execution steps is based on a plurality of priorities corresponding to the plurality of queries. In various embodiments, a first query is assigned a first priority, and a second query is assigned a second priority. The first query is selected in a higher proportion of the plurality of sequential operator execution steps than the second query, for example, until the first query has completed execution, based on the first priority being more favorable than the second priority. In various embodiments, each of the plurality of sequential operator execution steps includes generating the plurality of priority values based on the plurality of operators of the one of the plurality of query operator execution flows, where each of the plurality of priority values corresponds to one of the plurality of operators. For example, the plurality of priority values for a query's plurality of operators can be generated as discussed in conjunction with FIGS. 28A-28D.

Figure 30A:
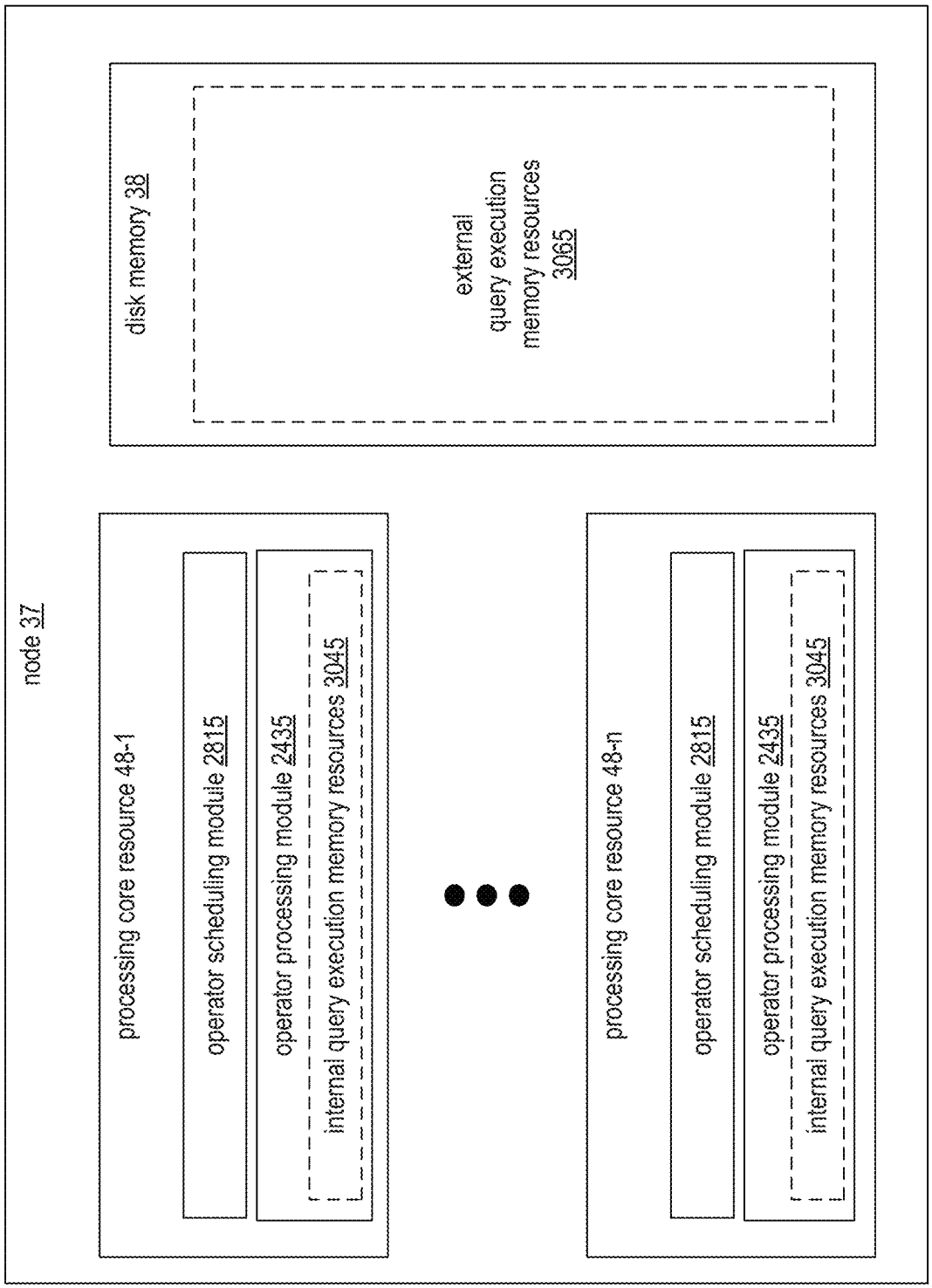
FIG. 30A is a schematic block diagrams of a node that includes a plurality of processing core resources and disk memory in accordance with various embodiments of the present invention.

FIG. 30A illustrates an embodiment of a node 37, which can be utilized to implement some or all nodes 37 of some or all computing devices 18 of the database system 10. The node 37 can include the plurality of processing core resources 48-1-48-n as discussed previously, where each processing core resource 48 executes queries by implementing its own operator processing module 2435, such as embodiments, of the operator processing module 2435 discussed in conjunction with FIGS. 24A-29B. The operator executions performed by the operator processing module 2435 of a processing core resource 48 can be scheduled by its own corresponding operator scheduling module 2815, such as the embodiments of the operator scheduling module 2815 as discussed in conjunction with FIGS. 28A-29B. This embodiment of node 37 can be utilized to implement some or all of the particular embodiments of processing core resource 48 discussed in conjunction with FIGS. 30B, 31A, 31B, and/or 32B.

Each operator processing module 2435 can be operable to execute queries by utilizing its own internal query execution memory resources 3045. For example, the operator processing module can be operable to perform operator executions and/or to store operator queues 2822 via by utilizing its internal query execution memory resources 3045. The operator processing module can otherwise execute queries via the plurality of operator executions of operators of the corresponding query operator execution flows 2433 by utilizing these internal query execution memory resources 3045. For example, the internal query execution memory resources 3045 can be implemented by utilizing cache memory 45 of the corresponding processing core resource 48 and/or by utilizing other memory of the processing core resource 48 that is utilized by its processing module 44. In some cases, the internal query execution memory resources 3045 are shared by the operator scheduling module 2815 and/or other processing modules of the corresponding processing core resource 48 to facilitate performance of other functionality of the processing core resource 48 discussed herein.

The internal query execution memory resources 3045 can include a threshold amount of memory capacity that can be utilized for query execution by the operator processing module 2435, and/or other operations of the processing core resource, at any given time. In some cases, query execution, such as a particular operator execution, generates output or otherwise requires additional memory that is not available via internal query execution memory resources 3045, for example, due to the memory capacity of the internal query execution memory resources 3045 being reached via the current state of the plurality of query execution flows 2433-1-2433-R.

In these cases, the corresponding query can be spilled to disk. When a query spills to disk, some or all of the corresponding query operator execution flow 2433, such as some or all data blocks outputted by operators 2820 and/or already included in operator queues 2822, and/or other information indicating the current state of the query operator execution flow 2433, can be transferred to or otherwise stored in disk memory 38, such as memory device 42 of the particular processing core resource 48, and/or other disk memory accessible by the node 37. External query execution memory resources 3065 of disk memory 38 can be utilized to perform the remainder of operator executions of this query operator execution flow 2433 and/or the query operator execution flow 2433 is otherwise accessed in disk memory 38 via for performance the remainder of operator executions to facilitate completion of the query's execution. Spilling to disk can result in slower execution of the corresponding query due to slower access and/or processing of the query operator execution flow 2433 in disk memory 38. Thus, in most cases as discussed herein, it is favorable to execute queries via internal query execution memory resources 3045 when possible and it is favorable to prevent executing queries from spilling to disk, when possible.

Figure 30B:
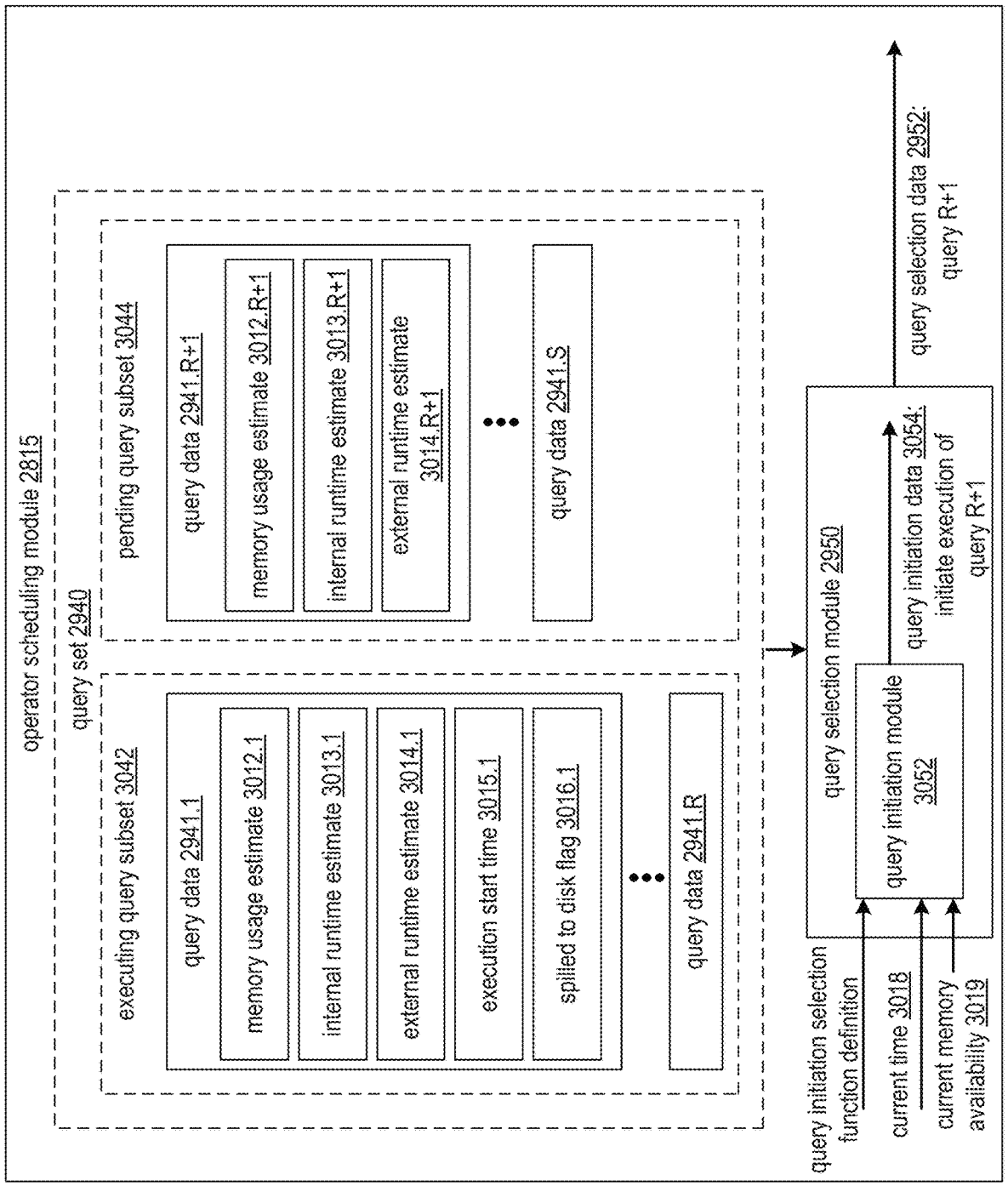
FIG. 30B is a schematic block diagrams of a processing core resource that implements an operator scheduling in accordance with various embodiments of the present invention.

FIG. 30B presents an embodiment of an operator scheduling module 2815 implemented by a processing core resource 48 that is operable to determine whether to initiate execution of new, pending queries. The query set 2940 determined by the operator scheduling module can indicate the query data 2941.1-2941.R of the set of concurrently executing queries 1-R as discussed in conjunction with FIGS. 29A-29B. These queries 1-R can correspond to an executing query subset 3042 of queries in the query set 2940 that are already executing, where at least one operator execution of the corresponding query has already been performed by the operator processing module 2435, and where at least one operator execution of the corresponding query has yet to be performed to render execution of the query completed. The query set 2940 can further indicate another, distinct subset of queries R+1-S in a pending query subset 3044 that are assigned to be executed by the processing core resource, but whose execution has not been initiated. In particular, the queries in the pending query subset 3044 have not had any operator executions scheduled by the operator scheduling module 2815 and/or have not have any operator executions performed by the operator processing module 2435.

Over time, the operator scheduling module 2815 eventually initiates execution of each query in the pending query subset 3044 by determining to schedule first operator executions of each query in the pending query subset 3044. For example, rather than selecting one of the currently executing queries 1-R from the executing query subset 3042 for execution in an upcoming operator execution step 2840 as discussed in conjunction with FIGS. 29A-29B, the query selection module 2950 can instead select one of the queries R+1-S in the pending query subset 3044 for execution in the upcoming operator execution step 2840.

Once a query is received and determined to be assigned for execution, it can be added to the pending query subset 3044 as a pending query or can otherwise be indicated in query data 2940 as a query whose execution has not yet been initiated. Once a pending query is selected for execution and has its first operator execution performed by the operator processing module 2435 in a corresponding operator execution step 2840 accordingly, this pending query can be removed from the pending query subset 3044 and can be added to the executing subset 3042, and/or can otherwise be indicated to have initiated execution. Once an executing query is scheduled for execution and has its execution completed via a final operator execution in a corresponding operator execution step 2840, this executing query can be removed from the executing query subset 3042 and/or can otherwise be indicated to have completed execution.

A new query can be added to the pending query subset 3044 at a time where the executing query subset 3042 includes exactly the set of the queries 1-R. In some cases, this query can be selected for execution at a time where all of the set of queries 1-R are still executing and thus are still in the executing query subset 3042. In other cases, this query can be selected for execution at a time where only a proper subset of queries 1-R are still executing, where at least one of the queries 1-R finished its execution between the time the new query is added to the pending query subset 3044 and the time the new query is selected for execution. In other cases, this query can be selected for execution at a time where none of queries 1-R are still executing, where all of the queries 1-R finished their execution between the time the new query is added to the pending query subset 3044 and the time the new query is selected for execution.

The query selection module 2950 can implement a query initiation module 3052 that is operable to generate query initiation data 3054 indicating whether or not to initiate execution of a pending query, such as a particular pending query in the pending query subset 3044 or any query in the pending query subset 3044. The query initiation module can generate the query initiation data 3054 by determining whether or not to initiate execution of a pending query based on performing a query initiation selection function. For example, the query initiation selection function can be operable to output a binary value indicating whether or not to initiate a pending query. The query initiation selection function can be performed based on a query initiation selection function received by the operator scheduling module 2815, stored in memory accessible by the operator scheduling module 2815, and/or otherwise determined by the operator scheduling module 2815.

The query selection module 2950 can implement the query initiation data 3054 to perform the query initiation selection function for every operator selection step 2840 of the plurality of sequential operator selection steps, where every query selection data 2952 outputted by the query selection module 2950 is based on performing the query initiation selection function. Alternatively, the query selection module 2950 can implement the query initiation data 3054 to perform the query initiation selection function for only a proper subset of operator selection steps 2840. For example, the query selection module 2950 can determine to perform the query initiation selection function in generating query selection data 2952 for a given upcoming operator execution step 2840: in a predefined proportion of operator selection steps 2840; in operator selection steps at predefined times; based on receiving a request to perform the query initiation selection function; in response to determining a new query has been added to the pending query subset 3044; in response to determining a query has been removed from the executing query set has been removed from the executing query subset 3042 based on completing its execution; in response to receiving input data blocks for execution of a pending query from another node 37 and/or from storage in memory; and/or based on another determination to perform the query initiation selection function.

If the query initiation data 3054 indicates a selection to initiate execution of a pending query, the query selection module 2950 can generate the query selection data 2952 to indicate the pending query. If the query initiation data 3054 indicates a selection to not initiate execution of a pending query, the query selection module 2950 can generate the query selection data 2952 by selecting a query from the executing query subset 3042, for example, based on executing a turn-based query selection function as discussed in conjunction with FIG. 29A. The query selection data 2952 can be processed in a same or similar fashion as discussed in conjunction with FIG. 29A to ultimately select a particular operator of the selected query's query operator execution flow 2433 by implementing the operator priority generating module 2817 and/or the operator processing selection module 2819. In cases where a pending query is selected for execution in the query selection data 2952, the operator processing selection module 2819 can automatically select the bottom-most operator in the operator flow for execution in the corresponding operator execution step 2840, for example, because other operators are not yet available to be executed lower operators have not yet outputted the data blocks to be operated upon. In such cases, the bottom-most operator in the operator flow of the selected, pending query can be automatically assigned a most favorable priority by the operator priority generating module 2817.

As illustrated in FIG. 30B, the query data 2941 of each query can include a memory usage estimate 3012, an internal runtime estimate 3013, and/or an external runtime estimate 3014. This information can be included instead or in addition to the query priority value 2942 and/or the operator position data 2916 of the embodiment of the query data illustrated in FIG. 29A. The memory usage estimate 3012 can indicate an estimated amount of memory required to execute the query, for example, based on an amount of memory required to perform operator executions of the query and/or to store operator queues of the query. The internal runtime estimate 3013 can indicate an estimated amount of time required to execute the query if internal memory resources, such as internal query execution memory resources 3045 of the operator processing module 2435 and/or of the processing core resource 48 are utilized to execute the query and/or of the query does not spill to disk during its execution. The external runtime estimate 3014 can indicate an estimated amount of time required to execute the query if external query execution memory resources 3065, such as disk memory 38 of the corresponding node 37 or of the corresponding computing device 18 that includes the processing core resource, are utilized to execute the query and/or if the query does spill to disk during its execution.

The internal runtime estimate and/or the external runtime estimate can correspond to estimated runtimes for execution of the query if run in isolation, for example, in the case where every operator execution step 2840 required to execute the query were performed consecutively, where no operator execution step 2840 in the plurality of operator execution steps between the first operator execution step of the query's execution and the last operator execution step of the query's execution correspond to performances of any other queries. In some cases, the internal runtime estimate and/or external runtime estimate can indicate or be determined based on an estimated number of operator execution steps that will be required to execute the corresponding query. An example embodiment of determining the memory usage estimate, the internal runtime estimate, and/or the external runtime estimate is discussed in further detail in conjunction with FIGS. 31A-31C.

For queries in the executing query subset 3042, the query data 2941 can further include an execution start time 3015 indicating when the corresponding query's execution was initiated and/or identifying the one of the plurality of sequential operator execution steps in which the first operator execution of the query was performed. For queries in the executing query subset 3042, the query data 2941 can also further include a spilled to disk flag 3016, which can be a binary indicator or other indication of whether or not the execution of the corresponding query has spilled to disk and/or an indication of whether the query is being executed internally via internal query execution memory resources 3045 or externally via external query execution memory resources 3065 of disk memory 3065.

Generating the query initiation data 3054 for a pending query can be based on the memory usage estimate 3012, the internal runtime estimate 3013, and/or the external runtime estimate 3014 of the pending query's query data. In particular, the query initiation selection function can be a function of a pending query's memory usage estimate 3012, the external runtime estimate 3013, and/or the external runtime estimate 3014. For example, query initiation data 3054 indicating whether to initiate execution of query R+1 can be generated by performing the query initiation selection function upon the query's memory usage estimate 3012.R+1, the internal runtime estimate 3013.R+1, and/or the external runtime estimate 3014.R+1.

The operator scheduling module 2815 can determine whether it is currently favorable to initiate execution if pending queries based on this information. This can include processing these estimates of a pending query in conjunction with estimates of currently executing queries to determine whether or not current execution initiation is favorable over waiting to execute the query, for example, by determining whether or not initiating execution is likely to cause the pending query or another currently executing query to spill to disk. In particular, as spilling to disk causes a query's execution to be less efficient, it can be more favorable to wait until enough memory is available to internally execute the query. However, if a set of many executing queries are expected to continue executing for a long length of time before freeing up space for the pending query, it can be more favorable in these cases to execute the query externally, with the knowledge and/or intention of spilling the query to disk, rather than waiting for the required amount of internal query execution memory resources 3045 to become available.

Scheduling initiation of pending queries by utilizing this information improves database systems by preventing or mitigating the changes of unnecessary spilling to disk caused by preemptive initiation of a query's execution. Scheduling initiation of pending queries by utilizing this information improves database systems by executing queries with fewer unnecessary external query executions via disk memory overall, thus improving the average speed of query execution. Scheduling initiation of pending queries by utilizing this information improves database systems because intentionally executing queries via external query executions when immediate external execution is expected to more quickly complete a pending query's execution than waiting for internal resources can also improving the average speed of query execution.

As illustrated in FIG. 30B, the query initiation module 3052 can receive, estimate, or otherwise determine the current time 3018 and/or the current memory availability 3019. The current time 3018 can optionally identify and/or be based on the current and/or upcoming one of the sequential operator execution steps, or can otherwise indicate the current time. The current memory availability 3019 can indicate an amount of currently available memory of the internal query execution memory resources 3045 utilized to execute queries, such as an estimated or measured level of memory usage of the internal memory resources utilized by the operator processing module to perform operator executions and/or to store operator queues.

As a particular example of generating the query initiation data 3054 for a particular pending query, the query initiation module 3052 can determine whether to initiate execution of the particular pending query by first comparing the memory usage estimate 3012 of the particular pending query to the current memory availability 3019. The memory usage estimate 3012 can be determined to compare favorably to the current memory availability 3019 if the memory usage estimate 3012 indicates a required amount of memory to execute the query that is less than or equal to the current memory availability 3019, and can be determined to compare unfavorably to the current memory availability 3019 if the memory usage estimate 3012 indicates a required amount of memory to execute the query that is greater than the current memory availability 3019. If the memory usage estimate 3012 compares favorably to the current memory availability 3019, the query initiation data 3054 is generated to indicate the particular query be executed.

If the memory usage estimate 3012 compares favorably to the current memory availability 3019, the query initiation module 3052 can further determine whether to initiate execution of the particular pending query by next comparing the memory usage estimate 3012 of the particular pending query to the current memory availability 3019 by determining an estimated wait time until memory will be available. This estimated wait time until memory will be available, indicating an estimated amount of time and/or operator execution steps from the current until the at least the required amount of memory to execute the query becomes available. An estimated total time required to internally execute the query via internal query execution memory resources 3045 can determined be as a function of the estimated wait time until memory will be available and the internal runtime estimate 3013, for example, where this estimated total time required to internally execute the query is determined based on a sum of the estimated wait time until memory will be available and the internal runtime estimate 3013. This estimated total time required to internally execute the query can be compared with the external runtime estimate 3014. If the estimated total time required to internally execute the query is less than the external runtime estimate 3014, and/or estimated total time required to internally execute the query otherwise is determined to be more favorable than the external runtime estimate 3014, the query initiation data 3054 is generated to indicate the particular query be not be executed, for example, based on determining to wait until internal query execution memory resources 3045 are later available to execute the query. If the estimated total time required to internally execute the query exceeds the external runtime estimate 3014, and/or estimated total time required to internally execute the query otherwise is determined to be less favorable than the external runtime estimate 3014, the query initiation data 3054 is generated to indicate the particular query be executed, for example, based on determining that it is more favorable to spill the query to disk for execution than to wait to internally execute the query. The query initiation data 3054 can further indicate an instruction that the particular query be spilled to disk, for example, rather than spilling other queries currently being executed to disk.

This estimated wait time until memory will be available can be calculated by the query initiation module 3052 or another processing module. In particular, the estimated wait time until memory will be available can be a function of the current time, the internal runtime estimates 3013 of each of the queries in the executing query subset 3042, and their respective execution start times 3015. In some cases, an internally running subset of the executing query subset 3042 can be determined by identifying only the queries in the executing query subset 3042 that have not spilled to disk and/or that are executing via internal query execution memory resources 3045, for example, based on the spill to disk flags 3016 of the queries in the executing query subset 3042. The estimated wait time until memory will be available can be calculated, for example, by performing a summation of internal runtime estimates 3013 of each of the queries determined to be in the internally running subset. The estimated wait time until memory will be available can be calculated as a function of the memory usage estimate 3012, and can indicate the estimated wait time until at least the amount of memory indicated by the memory usage estimate 3012 will be available.

In some cases, an estimated proportion of each query's execution that remains to be executed can be determined based on tracking the number of operator executions that have been performed; based on tracking how many queries have been executing via internal resources since one or more of the queries initiated execution; based on comparing the execution start time 3015 of each query to its estimated internal runtime; and/or based on another determination. Each estimated proportion can be applied to the corresponding query's internal runtime estimate to generate a plurality of time remaining estimates for each executing query in the internally executing subset. The estimated wait time until memory will be available can be calculated based on a summation of the plurality of estimated time remaining estimates.

Figure 30C:
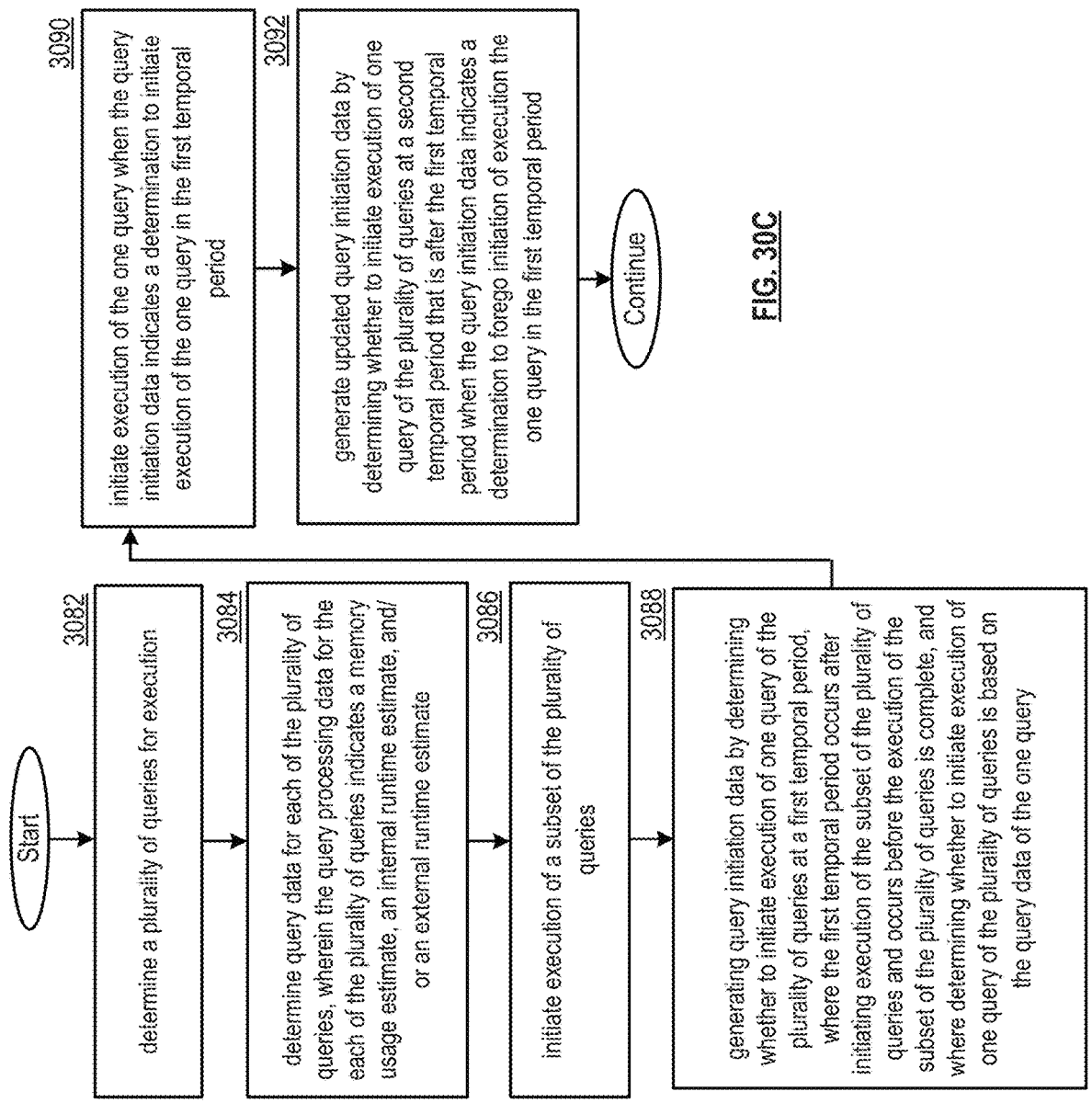
FIG. 30C is a logic diagram illustrating a method of scheduling initiation of execution of a pending query in accordance with various embodiments of the present invention.

FIG. 30C illustrates a method for execution by a node 37. For example, the node can utilize at least one processing module of the node 37 to execute operational instructions stored in memory accessible by the node, where the execution of the operational instructions causes the node 37 to execute the steps of FIG. 30C. Different nodes 37 of the same or different computing device 18 can independently execute the method of FIG. 30C concurrently, for example, based on different query expressions for different queries assigned to the different nodes. In some cases, the method of FIG. 30C is performed by a particular processing core resource 48 of a node 37, where different processing core resources 48 of the same node can independently execute the method of FIG. 30C concurrently, for example, on different query expressions for different queries assigned to the different processing core resources 48. The method of FIG. 30C can be performed by a node 37 in accordance with embodiments of node 37 discussed in conjunction with FIGS. 30A-30B, and/or in conjunction with other embodiments of node 37 discussed herein. Some or all of the method of FIG. 30C can be performed by another processing module of the database system 10.

In particular, the method of FIG. 30C can be performed by an operator scheduling module 2815 and/or an operator processing module 2435 of a particular processing core resource 48 of a node 37. For example, the operator scheduling module 2815 and/or the operator processing module 2435 can include a processor and memory that includes executable instructions. The executable instructions, when executed by the processor, cause the operator scheduling module 2815 and/or the operator processing module 2435 to execute some or all of the steps of FIG. 30C.

Step 3082 includes determining a plurality of queries for execution. Step 3084 includes determining query data for each of the plurality of queries, where each query data indicates a memory usage estimate, an internal runtime estimate, and an external runtime estimate for the corresponding one of the plurality of queries. Step 3086 includes initiating execution of a subset of the plurality of queries, for example, via previous performances of the method of FIG. 30C to initiate execution of each of these subset of the plurality of queries. Step 3088 includes generating query initiation data by determining whether to initiate execution of one query of the plurality of queries at a first temporal period, where the one query of the plurality of queries is not included in the subset of the plurality of queries whose execution was already initiated in step 3086. The first temporal period occurs after initiating execution of the subset of the plurality of queries and occurs before the execution of the subset of the plurality of queries is complete. Determining whether to initiate execution of one query of the plurality of queries is based on the query data of the one query. Step 3090 includes initiating execution of the one query when the query initiation data indicates a determination to initiate execution of the one query in the first temporal period. Step 3092 includes generating updated query initiation data by determining whether to initiate execution of one query of the plurality of queries at a second temporal period that is after the first temporal period when the query initiation data indicates a determination to forego initiation of execution the one query in the first temporal period. For example, step 3092 can be performed any number of times based on prior query initiation data indicates a determination to forego initiation of execution the one query in a corresponding temporal period of the prior query initiation data.

In various embodiments, the internal runtime estimate corresponds to an estimated runtime of a corresponding query when executed utilizing internal query execution memory resources of the node, and the external runtime estimate corresponds to an estimated runtime of a corresponding query when execution includes spilling the query to external disk.

In various embodiments, generating the query initiation data includes determining current memory availability data based on the subset of the plurality of queries, comparing the memory usage estimate of the one query to the current memory availability data, and/or determining to initiate execution of the one query in the first temporal period when the memory usage estimate of the one query compares favorably to the current memory availability data. In various embodiments, the method includes facilitating execution of the subset of the plurality of queries prior to the first temporal period by utilizing at least a portion of internal query execution memory resources, such as internal query execution memory resources of the corresponding processing core resource 48. In various embodiments, the current memory availability data is determined based on the at least a portion of the internal query execution memory resources of the node that are utilized to facilitate execution of the subset of the plurality of queries. In various embodiments, the current memory availability data is determined based on the memory usage estimate of the query data for each of the subset of the plurality of queries.

In various embodiments, generating the query initiation data further includes, when the memory usage estimate of the one query compares unfavorably to the current memory availability data: calculating a memory availability wait time estimate based on the query data for each of the subset of the plurality of queries; determining an internal execution completion time estimate for the one query based on the memory availability wait time estimate and the internal runtime estimate for the one query; comparing the internal execution completion time estimate to the external runtime estimate; determining to initiate execution of the one query in the first temporal period when the internal execution completion time estimate compares unfavorably to the external runtime estimate; and/or determining to forego initiation of execution of the one query in the first temporal period when the internal execution completion time estimate compares favorably to the external runtime estimate.

In various embodiments, execution of the one query is initiated in the first temporal period based on the memory usage estimate of the one query comparing unfavorably to the current memory availability data and further based on the internal execution completion time estimate comparing unfavorably to the external runtime estimate. The method can further include facilitating execution of the one query by utilizing external disk memory based on the memory usage estimate of the one query comparing unfavorably to the current memory availability data. In various embodiments, calculating the memory availability wait time estimate is based on a plurality of execution initiation times for initiation of execution of queries the subset of the plurality of queries. Calculating the memory availability wait time estimate is based on the internal runtime estimate for ones of the subset of queries that are executing utilizing internal query execution memory resources.

Figure 31A:
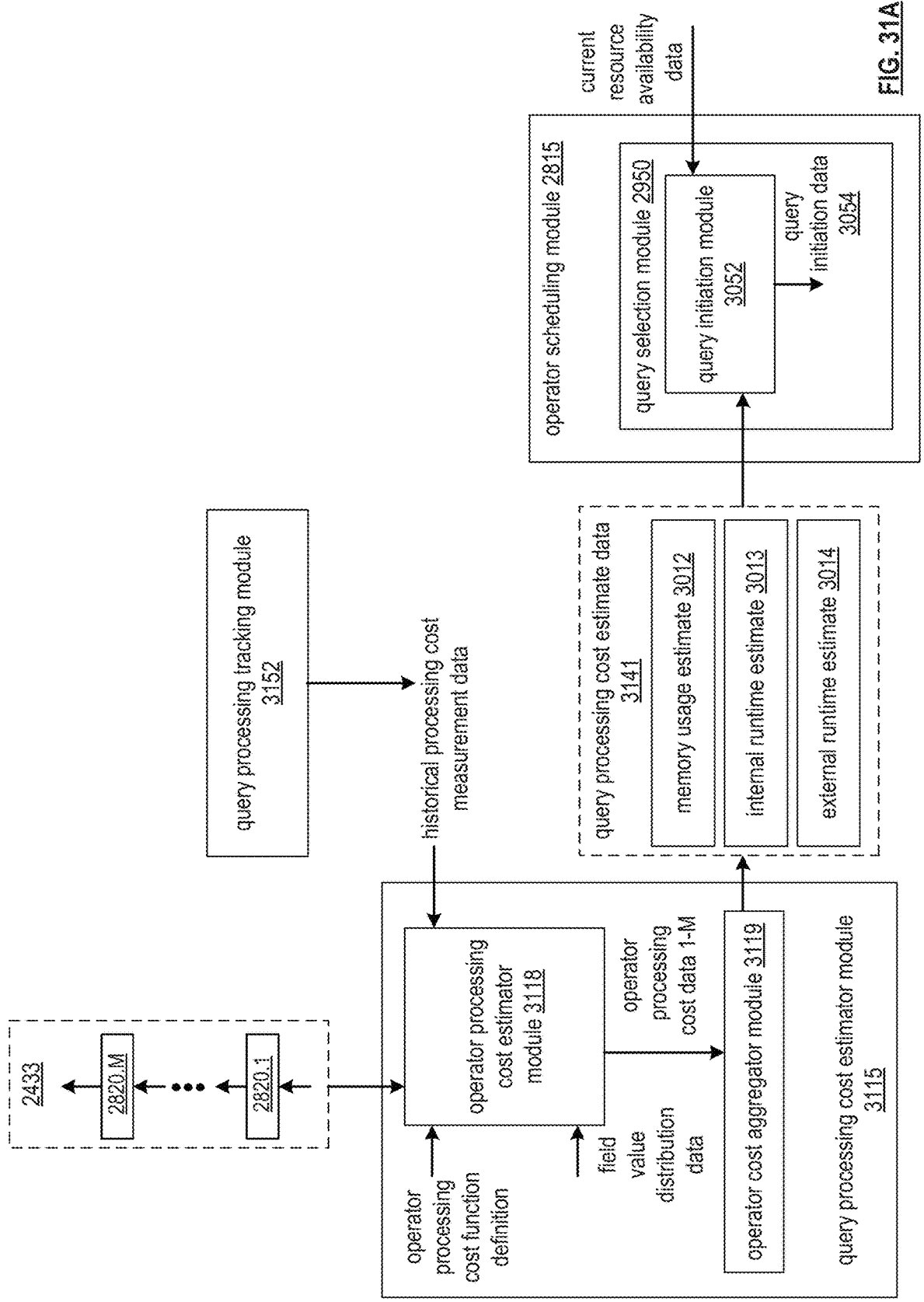
FIG. 31A is a schematic block diagrams a query processing cost estimator module that generates query processing cost estimate data utilized by an operator scheduling module of a processing core resource in accordance with various embodiments of the present invention.
Figure 31B:
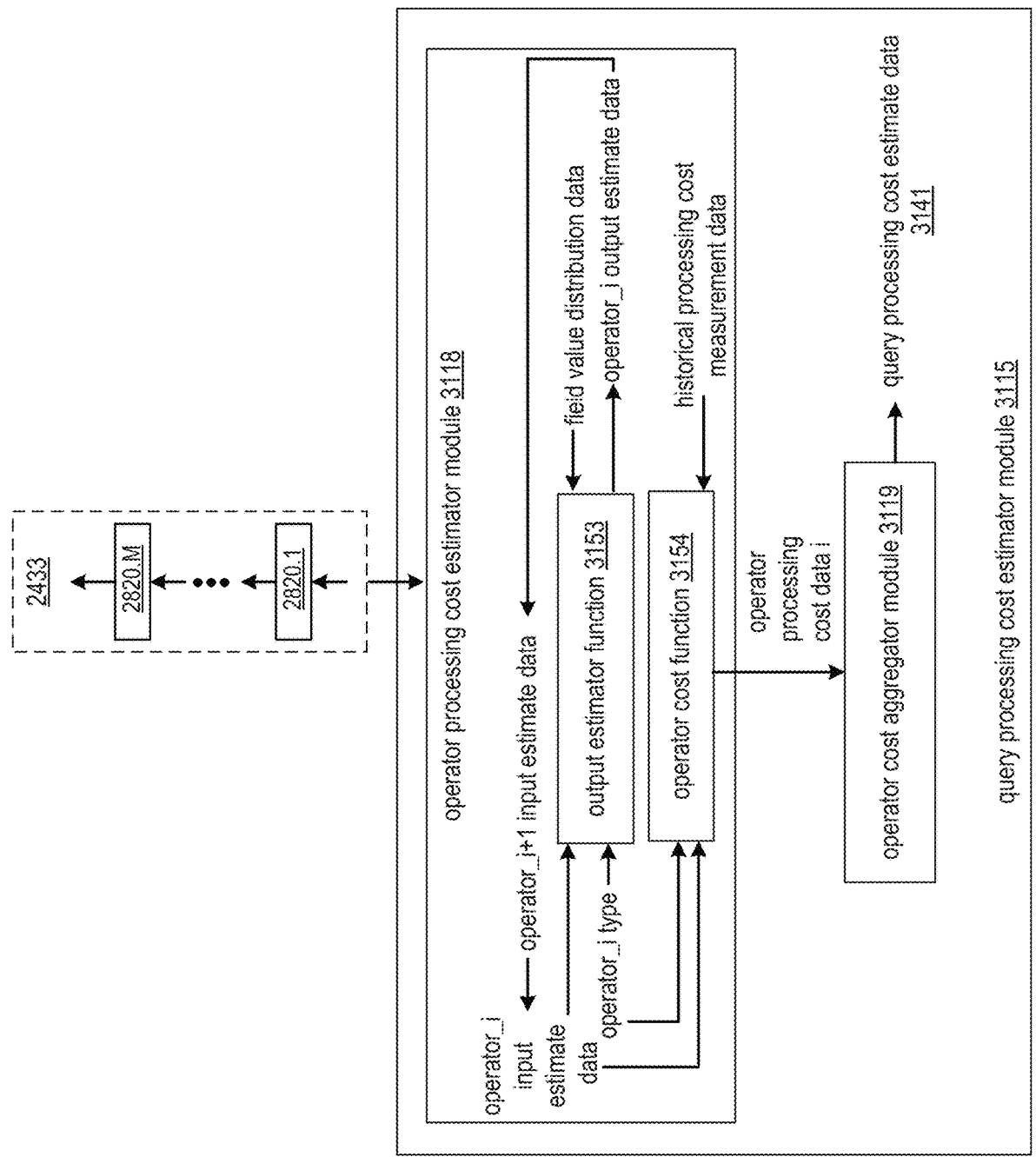
FIG. 31B is a schematic block diagrams a query processing cost estimator module in accordance with various embodiments of the present invention.

FIGS. 31A and 31B illustrate embodiments of the database system where a query processing cost estimator module 3115 is implemented to generate query processing cost estimate data for queries to be executed by a processing core resource 48 of the database system 10. This query processing cost estimate data 3141 of a given query can include the memory usage estimate 3012, the internal runtime estimate 3013, and/or the external runtime estimate 3014 utilized by the operator scheduling module 2815 to schedule initiation of execution of the query, for example, as discussed in conjunction with FIGS. 30B-30C. In particular, field value distribution data and/or historical processing cost measurement data can be utilized to generate more accurate memory usage estimates and runtime estimates for incoming queries. This improves database systems by enabling scheduling of query initiation as discussed in conjunction with FIGS. 30B-30C to be further optimized via automatic generation of memory usage estimates and runtime estimates and via more accurate memory usage estimates and runtime estimates.

The query processing cost estimator module 3115 can be implemented via at least one processing core resource 48, which can include the same processing core resource 48 or different processing core resource 48 as the processing core resource 48 that implements the operator scheduling module 2815 that receives and utilizes query processing cost estimate data 3141 that is generated by the query processing cost estimator module 3115. For example, some or all processing core resources 48 that implement an operator scheduling module 2815 can further implement their own query processing cost estimate data 3141 that is operable to generate query processing cost estimate data 3141 for queries assigned for execution by its processing core resource 48. The query processing cost estimator module 3115 can alternatively be implemented via another at least one processing module of the database system 10, which can be implemented by the same or different node 37 and/or by the same or different computing device 18. In some cases, a central query processing cost estimator module 3115 can generate query processing cost estimate data 3141 for a plurality of queries each assigned to one or more of a plurality of processing core resources of the same or different node 37, and the query processing cost estimate data 3141 for a given query can be sent to the assigned one or more processing core resources 48 via system communication resources 14 and/or can be otherwise accessible by the assigned one or more processing core resources 48.

As illustrated in FIG. 31A, the query processing cost estimator module 3115 can receive, access in memory, or otherwise determine a query operator execution flow 2433 of a query to be executed by the database system. An operator processing cost estimator module 3118 can be implemented by the query processing cost estimator module 3115 to generate a plurality of operator cost data 1-M, where each operator cost data includes one or more calculated actual and/or estimated metrics indicating processing cost, memory cost, runtime cost, and/or other costs indicating amounts of resources necessary to execute a corresponding one of the plurality of operators 1-M of the query operator execution flow 2433. The operator processing cost estimator module 3118 can execute an operator processing cost function upon each operator in isolation and/or upon each operator in the context of their positioning in the operator flow relative to other operators. An operator cost aggregator module 3119 can generate a the query processing cost estimate data 3141 as a function of the plurality of operator processing cost estimate data 1-M generated by the operator processing cost estimator module 3118, for example, by performing a summation upon the operator processing cost estimate data 1-M.

The operator scheduling module 2815 can receive and/or access the resulting query processing cost estimate data 3141, for example, to determine the query data 2941 for the corresponding query to be executed by the corresponding operator processing module 2435 that has its operator executions scheduled by the operator scheduling module 2815. A query initiation module can utilize the query processing cost estimate data 3141 of a given query in conjunction with determined current resource availability data to generate query initiation data 3054 indicating whether the given query should have its execution initiated as discussed in conjunction with FIGS. 30B-30C. This current resource availability data can, for example, include the current memory availability and/or estimated wait time until memory will be available discussed previously. The current resource availability data can be generated by the operator scheduling module 2815 based on the query processing cost estimate data 3141 generated previously for currently executing queries, for example, where the current resource availability data is calculated based on the memory usage estimates 3012, internal runtime estimates 3013 and/or external runtime estimates 3014 of currently executing queries as discussed previously, and where these memory usage estimate 3012, internal runtime estimate 3013 and/or external runtime estimate 3014 were also calculated in query processing cost estimate data 3141 generated by the query processing cost estimator module 3115.

Calculating each operator cost data can include utilizing field value distribution data, such as probability density function data, histogram data, or other information indicating the distribution of values of particular fields, such as particular columns of rows stored for one or more tables of the database system. This field value distribution data can be received by the query processing cost estimator module 3115, can be stored in memory accessible by the query processing cost estimator module 3115, and/or can be otherwise determined by the query processing cost estimator module 3115.

Calculating each operator cost data for a given query can include utilizing historical processing cost measurement data, for example, indicating actual, measured processing cost data such as memory performance, runtime performance, or other processing performance for previously executed queries by the same and/or different processing core resource 48 as the processing core resource 48 that implements the operator processing module 2435 that will execute the given query and/or by utilizing the same and/or different type of processing device and/or memory device as the operator processing module 2435 that will execute the given query. This historical processing cost measurement data can be received by the query processing cost estimator module 3115, can be stored in memory accessible by the query processing cost estimator module 3115, and/or can be otherwise determined by the query processing cost estimator module 3115. For example, the historical processing cost measurement data can be generated by a query processing tracking module 3152 that is operable to measure processing cost data of executing queries on one or more processing core resources 48 by measuring memory performance, runtime performance, or other processing performance. Alternatively or in addition, the query processing tracking module 3152 is operable to store records of historical processing cost data that is measured by the query processing tracking module 3152 or by a different processing module.

An example embodiment of generation of the operating processing cost data by the operator processing cost estimator module 3118 is illustrated in FIG. 31B. In particular, rather than estimating operator costs in isolation, FIG. 31B illustrates a mechanism for processing operators that preserves their position in the context of the query operator execution flow 2433, where operating cost for each operator is based on estimated output determined for previous operators in the query operator execution flow 2433. Utilizing this position-preserving mechanism for generating operator cost estimates improves the accuracy of operator processing cost estimates, and thus improves the accuracy of query processing cost estimate data 3141. This more accurate query processing cost estimate data 3141 improves database systems by providing more accurate memory usage estimates and runtime estimates, enabling scheduling of query initiation as discussed in conjunction with FIGS. 30B-30C to be further optimized.

The operator processing cost estimator module can process each of the operators 1-M one at a time, in an ordering based on a serialized ordering of the operators 1-M indicated in the query operator execution flow 2433. For example, the bottom-most operator is processed first, an operator that receives output data blocks of the bottom-most operator is processed second, and so on. In the case of multiple parallelized sub-flows, operators each sub-flow are processed in an ordering in accordance with their serialized ordering within the sub-flow, but each sub flow of the multiple parallelized sub-flows can be processed in any order.

For each operator 2820 in the query operator execution flow 2433, operator type data and operator input estimate data can be determined by the operator processing cost estimator module 3118. The operator type data can indicate the type of the operator 2820, for example, indicating than an operator is a UNION operator or a SELECT operator. The operator type data can further indicate parameters of a simple predicate of the operator 2820, if applicable, where the operator type data of a SELECT operator further indicates the simple predicate "COL_A<100." The operator input estimate data can indicate: a known or estimated size, such as number of columns or bytes, for each row included as input; a known or estimated number of rows that will be included as input; and/or known or estimated values and/or a known or estimated distribution of values for some or all fields of the set of row determined or estimated to be included as input.

The operator input estimate data of the bottom-most operator can be determined based on the domain of the query, such as the number of rows required by the query, for example, based on a known total number of rows in in tables required by the query. The operator input estimate data for each subsequently processed operator 2820 can be set equal to and/or can be determined based on the operator output estimate data for one or more immediately prior operators in the query operator execution flow that output their data blocks to this subsequently processed operator 2820. For example, a next operator in the flow immediately following the bottom-most operator is determined to have operator input estimate data based on the operator output estimate data generated for the bottom-most operator. An operator that has input data blocks received from multiple, immediately prior operators can be determined to have operator input estimate data based on the operator output estimate data generated for each of these multiple, immediately prior operators.

In the example presented in FIG. 31B, consider operator_i as an ith operator being processed of the M operators. The operator_i input estimate data is the input estimate data determined for this ith operator, and can be determined based on output estimate data of one or more immediately prior operators in the query operator execution flow 2433, such as the (i−1)th operator. The operator_i type data is the type data determined for this ith operator.

The operator_i input estimate data and operator_i type data is utilized as input to an operator cost function 3154, which generates operator processing cost data for the ith operator based on the type of the operator and/or the size and/or amount of input indicated in the input estimate data. The operator cost function 3154 can utilize the historical processing cost measurement data and/or can perform a deterministic function defined based on analytical processing of the historical processing cost measurement data. In particular, previous processing costs measurements for execution of prior operators of the same type upon similar sizes and/or types of input can be utilized to calculate an estimate of the operator processing cost data for this operator. The operator cost aggregator module 3119 can receive each operator cost as it is generated, and can sum or otherwise process the operator cost data 1-M once it has all been generated to calculate the query processing cost estimate data 3141.

The operator_i input estimate data and operator_i type data is also utilized as input to an output estimate function 3153, which generates operator_i output estimate data for the ith operator based on the type of the operator and/or the input of the operator. In some cases, the operator_i output estimate data is equivalent to all of the operator_i input estimate data, for example, where a UNION operator's output is estimated to be equivalent to an aggregation of a set of operator input estimate data, where each of the set of operator input estimate data corresponds to each of a set of operator output estimate data of a set of parallelized operators that send their output to the UNION operator. In other cases, the operator_i output estimate data is based on a level of filtering estimated to be applied the operator_i input estimate data. For example, the level of filtering applied can be based on a simple predicate when the operator is a SELECT operator. In particular, the field value distribution data can be applied to estimate or determine a proportion of the operator_i input estimate data expected to meet the requirements of the simple predicate, where the operator_i output estimate data is based on this estimated or determined proportion. As illustrated, this operator_i output estimate data can be used to generate operator_i+1 input estimate data for the (i+1)th operator, for example, where the (i+1)th operator is serially immediately after the ith operator in the query operator execution flow 2433 and receives its input data blocks as data blocks outputted by the ith operator.

Figure 31C:
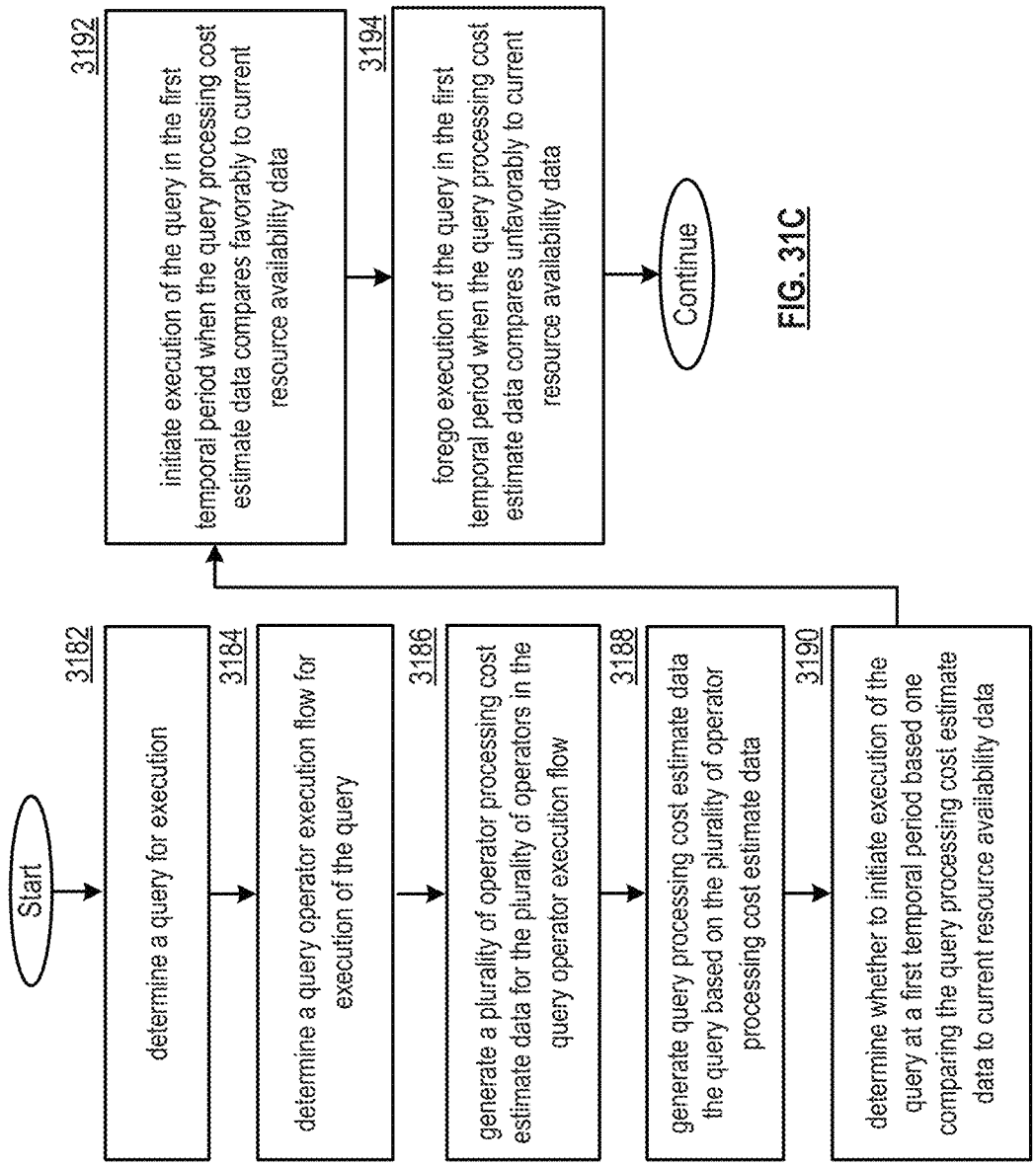
FIG. 31C is a logic diagram illustrating a method of generating query processing cost estimate data to schedule execution of a pending query in accordance with various embodiments of the present invention.

FIG. 31C illustrates a method for execution by a node 37. For example, the node can utilize at least one processing module of the node 37 to execute operational instructions stored in memory accessible by the node, where the execution of the operational instructions causes the node 37 to execute the steps of FIG. 31C. Different nodes 37 of the same or different computing device 18 can independently execute the method of FIG. 31C concurrently, for example, based on different query expressions for different queries assigned to the different nodes. In some cases, the method of FIG. 31C is performed by a particular processing core resource 48 of a node 37, where different processing core resources 48 of the same node can independently execute the method of FIG. 31C concurrently, for example, on different query expressions for different queries assigned to the different processing core resources 48. The method of FIG. 31C can be performed by a node 37 in accordance with embodiments of node 37 discussed in conjunction with FIGS. 31A-31B, and/or in conjunction with other embodiments of node 37 discussed herein. Some or all of the method of FIG. 31C can be performed by another processing module of the database system 10, for example, when the query processing cost estimator module 3115 is implemented via a centralized processing module of the database system 10.

In particular, the method of FIG. 31C can be performed by a query processing cost estimator module 3115, an operator scheduling module 2815, and/or an operator processing module 2435. For example, the query processing cost estimator module 3115, the operator scheduling module 2815, and/or the operator processing module 2435 can include a processor and memory that includes executable instructions. The executable instructions, when executed by the processor, cause the query processing cost estimator module 3115, the operator scheduling module 2815, and/or the operator processing module 2435 to execute some or all of the steps of FIG. 31C.

As illustrated in FIG. 31C, step 3182 includes determining a query for execution. Step 3184 includes determining a query operator execution flow for execution of the query. Step 3186 includes generating a plurality of operator processing cost estimate data for the plurality of operators in the query operator execution flow. Step 3188 includes generating query processing cost estimate data the query based on the plurality of operator processing cost estimate data. Step 3190 includes determining whether to initiate execution of the query at a first temporal period based one comparing the query processing cost estimate data to current resource availability data. Step 3192 includes initiating execution of the query in the first temporal period when the query processing cost estimate data compares favorably to current resource availability data. Step 3194 includes foregoing execution of the query in the first temporal period when the query processing cost estimate data compares unfavorably to current resource availability data.

In various embodiments, the operator cost data is generated based on tracked empirical cost data generated for a plurality of operators executed for a plurality of previously executed queries. In various embodiments, the method includes initiating execution of a set of queries, where the first temporal period is after execution of the set of queries is initiated and is before execution of the set of queries is complete. The method further includes generating the current resource availability data based on query processing cost estimate data generated for each of the set of queries. In various embodiments, the operator processing cost estimate data corresponding to each of the plurality of operators is calculated based on the operator type of the each of the plurality of operators. In various embodiments, the operator processing cost estimate data corresponding to each of the plurality of operators is calculated based on input row data that indicates at least one of: a determined number of input rows, a determined row length of each of the input rows; and/or a determined number of columns included in each of the input rows.

In various embodiments, the query operator execution flow indicates a serial positioning of each of the plurality of operators, and determining the input row data for at least one first operator with a first serial positioning in the plurality of operators is based on domain data indicated by the query. In various embodiments, determining the input row data for each operator of the plurality of operators with serial positioning after the at least one operator includes determining at least one previous operator with serial positioning immediately prior to the each operator, and further includes determining output row estimate data for the at least one previous operator. The output row estimate data of the at least one previous operator is generated based on the type of operator of the at least one previous operator and is further based on the input row data determined for the at least one previous operator. The input row data for the each operator is based on the output row estimate data determined for the at least one previous operator. In various embodiments, the at least one previous operator is a simple predicate that indicates at least one filtering parameter upon at least one field of data stored by the database system. Determining the output row estimate data for the at least one previous operator is based on applying the at least one filtering parameter to tracked distribution information, where the tracked distribution information indicates a distribution of values of the at least one field.

FIG. 32A illustrates embodiments of an operator scheduling module 2815 that implements an external execution query selection module 3252 to intelligently schedule queries based on optimizing which query will be spilled to disk, when it is determined that internal memory is low and/or that at least one currently executing query needs to spill to disk. This functionality improves database systems by optimizing query execution efficiency for concurrently executing queries, and by enabling particular queries to be prioritized for faster, internal processing via internal query execution memory resources 3045.

Consider a case where spilling to disk is necessary based on memory usage of a set of currently executed queries. If queries are being executed in accordance with a fixed ordering, for example, where the query selection module implements a turn-based selection function as discussed previously, there is no control over which query will trigger a requirement to dump to disk. In some cases, it is advantageous to select that a large, expensive query spill to disk and be externally executed, as this large query is slow to process either internally or externally. In such cases, a requesting user may not expect immediate results, and/or this large query could ultimately spill to disk at a later time due to later internal memory constraints. Furthermore, dictating that the expensive query spill to disk instead of one or more inexpensive queries can help ensure that these inexpensive queries can continue their execution in memory internally, enabling these inexpensive queries to be quickly executed without being slowed by the large, expensive query.

To enable this functionality, an interrupt of a predefined ordering of query execution can be triggered in response to detection of a condition indicating a predetermined threshold low memory availability. For example, as illustrated in FIG. 29A, the operator scheduling module 2815 can receive a low memory interrupt 3250 or other notification indicating low memory generated by the operator processing module 2435 and/or generated by a processing module monitoring and/or utilized to implement the internal query execution memory resources 3045. This interrupt can alternatively or additionally be triggered as a function of the estimated memory usage and/or estimated internal runtime of the currently executed queries and/or queries scheduled for execution soon. In particular, the operator scheduling module 2815 can determine low memory interrupt 3250 by determining and/or estimating a low memory condition itself, for example given the estimated memory usage and/or estimated internal runtime of the currently executing queries and/or when the memory availability is expected to be fully consumed by these executing queries. This information can be estimated utilizing query data 2941 in query set 2940 of currently executing queries as discussed in conjunction with FIGS. 30B, 31A, and 31B.

When the memory availability is expected to be fully consumed via execution of a next scheduled operator, the operator scheduling module 2815 can forego utilization of turn-based ordering and can instead select a different one of the set of currently executed queries, or a query that is scheduled for execution but has not been initiated, based on their query data 2941. As illustrated in FIG. 31A, an external execution query selection module 3252 can be implemented by the query selection module 2950 to generate query selection data 2952 indicating a selected query to be executed in the upcoming operator execution step 2840 and/or to be automatically spilled to disk in the upcoming operator execution step 2840. In some cases, the external execution query selection module 3252 is only implemented by the query selection module 2950 when the low memory interrupt 3250 is received and/or determined by the query selection module 2950. For example, the turn-based query selection function discussed in conjunction with FIG. 29A is utilized by the query selection module 2950 by default to select queries for most operator execution steps 2840, and an external execution query selection function is utilized select queries for operator execution steps 2840 only when the low memory interrupt 3250 is received and/or determined by the query selection module 2950.

When the external execution query selection function is determined to be performed in response to the low memory interrupt 3250, an external execution query selection function definition can be utilized by the external execution query selection module 3252 to perform an external execution query selection function to select the query to be indicated in the query selection data 2952 of the upcoming operator execution step 2840. The external execution query selection function definition can be received by the operator scheduling module 2815, can be stored in memory accessible by the operator scheduling module 2815, and/or can otherwise be determined by the operator scheduling module 2815. Performing the external execution query selection module 3252 can be utilized to generate the query selection data 2952 by selecting one of the currently executing queries 1-R to be spilled to disk and/or by selecting one of the queries in query set 1-S of FIG. 30B, including pending queries R+1–S.

Execution of the external execution query selection function definition can include determining query in the query set 2940 with a highest execution cost and/or can otherwise include determining a query in the query set 2940 that is most favorable of the queries in query set 2940 to be spilled to disk in response to the low memory interrupt 3250. For example, the external execution query selection module 3252 can select the query to be indicated in query selection data 2952 of the upcoming operator execution step 2840 as the query in the query set 2940 that has the highest or least favorable memory usage estimate 3012; the highest or least favorable internal runtime estimate; a longest or least favorable estimated wait to finish running internally as a function of internal runtime and start time as discussed in conjunction with FIG. 30A.

In some cases, a remaining processing cost is determined for each currently executing queries in query set 2940, and/or is determined for all queries in query set 2940 including pending queries. The remaining processing cost of a given query can be calculated as a function of its memory usage estimate 3012, internal runtime estimate 3013, and/or execution start time 3015 indicated in the query data 2941 of the given query. For example, the remaining processing cost of a given query can indicate the actual or estimated amount of time remaining to complete execution of the given query; actual or estimated amount of additional memory resources to complete execution of the given query; and/or another metric indicating processing resources that have yet to be consumed via the remainder of execution of the given query. The external execution query selection module 3252 can be operable to select the query to be spilled to disk in query selection data 2952 by selecting the query from only the queries currently executing, and/or from all queries including the pending queries.

In this example, query 2 is selected to be spilled to disk by the external execution query selection module 3252 in response to the low memory interrupt 3250, for example, based on query 2 having the highest or otherwise least favorable execution cost across the set of currently executing queries 1-R or across the set of all queries 1-S; based on query 2 having the highest or otherwise least favorable remaining processing cost of the set of the set of currently executing queries 1-R; and/or based on query 2 otherwise being determined to be most favorable, of the set of queries 1-R, to be spilled to disk.

Alternatively or in addition, a particular query can automatically be spilled to disk for the entirety of its execution in response to determining: it has an estimated memory usage that is higher than or otherwise compares unfavorably to a corresponding predetermined memory usage threshold; it has an estimated internal runtime that is higher than or otherwise compares unfavorably to a corresponding predetermined internal runtime threshold; and/or has an estimated memory usage that is higher than current memory availability by at least a predetermined threshold amount or otherwise compares unfavorably to the current memory availability. For example, rather than only selecting a query to be spilled disk when a low memory interrupt 3250 is detected, all incoming queries that have not begun their execution can have some or all of their query data 2941 compared to such predefined thresholds via the external execution query selection module 3252, where the query selection data indicates a query to be spilled to disk in response to its execution cost comparing favorably to such predefined thresholds. This preemptive spilling of expensive queries to disk for their entire execution can be favorable in preserving internal query execution memory resources 3045 for the currently executing queries.

The operator processing module 2435 can execute at least one operator of the query operator execution flow 2433 of the selected query in the corresponding operator execution step 2840 by utilizing the query selection data 2952 generated by the operator scheduling module 2815 to determine the selected query. For example, the query selection data 2952 can be utilized by the operator priority generating module 2817 and/or the operator processing selection module 2819 to select the particular operator that will be performed from the query operator execution flow 2433 of the selected query. The operator processing selection data 2830 can otherwise be generated to indicate the query selection data 2952, where this operator processing selection data 2830 is utilized by the operator processing module 2435 to perform the selected operator of the selected query. Alternatively, only the query selection data 2952 is generated and sent to the operator processing module 2435 to be utilized in facilitating an operator execution. In some cases, the query selection data 2952 indicates the instruction to spill the selected query to disk alternatively or in addition to indicating an instruction to execute at least one operator of the selected query.

The operator processing module 2435 can facilitate spilling the query operator execution flow 2433 of the query selected in the query selection data 2952 in response to receiving the query selection data 2952. In the example illustrated in FIG. 32A, query 2 is selected in the query selection data, and the operator processing module 2435 spills some or all of the query operator execution flow 2433.2 of query 2 to disk memory 38 in response. The remainder of query operations required for query 2's execution can still be scheduled by operator scheduling module 2815. For example, the operator scheduling module 2815 can continue to communicate operator processing selection data 2830 indicating operators of query operator execution flow 2433.2 to the operator processing module 2435, where operator processing module 2435 facilitates operator executions by utilizing external query execution memory resources 3065 of disk memory 38 rather than its internal query execution memory resources 3045. Alternatively, the operator scheduling module 2815 can generate operator processing selection data 2830 indicating operators of query operator execution flow 2433.2 that is communicated directly with the external query execution memory resources 3065 of the disk memory 38, where the external query execution memory resources 3065 facilitates performance of the selected operator executions of query 2 to complete query 2's execution.

In some cases, this facilitating spilling the query operator execution flow 2433 of the query selected in the query selection data 2952 by the operator processing module 2435 includes executing an operator, for example, indicated in operator selection data, where execution of the operator and/or generation of the output data blocks by executing the operator causes the query operator execution flow 2433 to spill to disk, for example, due to memory required to execute the operator causing the memory utilized by internal query execution memory resources 3045 to reach, exceed, and/or otherwise compare unfavorably to its memory capacity. In some cases, the query selection data 2952 can be generated for multiple, consecutive operator execution step 2840 to indicate execution of operators of the same selected query until memory capacity of the internal query execution memory resources 3045 is reached and/or until one of the consecutive operator executions of the query causes the query operator execution flow 2433 of the query to be spilled to disk. Alternatively, the operator processing module 2435 can automatically perform multiple operator executions of the selected query until the selected query is spilled to disk in response to the query selection data 2952 indicating an instruction to spill the selected query to disk.

In other embodiments, the operator processing module 2435, in response to receiving query selection data 2952 indicating an instruction to spill the selected query to disk, can automatically facilitate transfer and/or storage of some or all of the current state of the selected query's query operator execution flow 2433, such as some or all operator queues and/or information regarding the operators 2820 and their respective serialized ordering in the query operator execution flow 2433, to the external query execution memory resources 3065, for example, upon disk memory 38 of the node and/or within memory device 42 of the same processing core resource 48 being utilized to implement the operator processing module 2435. This automatic spilling to disk can optionally be performed prior to any attempt to execute an operator of the query operator execution flow 2433 of the selected query in response to the instruction to spill the selected query to disk in the query selection data 2952.

FIG. 32B and FIG. 32C illustrate methods for execution by a node 37. For example, the node can utilize at least one processing module of the node 37 to execute operational instructions stored in memory accessible by the node, where the execution of the operational instructions causes the node 37 to execute the steps of FIG. 32B and/or FIG. 32C. Different nodes 37 of the same or different computing device 18 can independently execute the method of FIG. 32B and/or FIG. 32C concurrently, for example, based on different query expressions for different queries assigned to the different nodes. In some cases, the method of FIG. 32B and/or FIG. 32C is performed by a particular processing core resource 48 of a node 37, where different processing core resources 48 of the same node can independently execute the method of FIG. 32B and/or FIG. 32C concurrently, for example, on different query expressions for different queries assigned to the different processing core resources 48. The method of FIG. 32B and/or FIG. 32C can be performed by a node 37 in accordance with embodiments of node 37 discussed in conjunction with FIG. 32A, and/or in conjunction with other embodiments of node 37 discussed herein. Some or all of the method of FIG. 32B and/or FIG. 32C can be performed by another processing module of the database system 10, for example, when the query processing cost estimator module 3115 is implemented via a centralized processing module of the database system 10.

In particular, the method of FIG. 32B and FIG. 32C can be performed by an operator scheduling module 2815 and/or an operator processing module 2435. For example, the operator scheduling module 2815 and/or the operator processing module 2435 can include a processor and memory that includes executable instructions. The executable instructions, when executed by the processor, cause the operator scheduling module 2815 and/or the operator processing module 2435 to execute some or all of the steps of FIG. 32B and/or FIG. 32C.

The method of FIG. 32B includes steps 3272 and 3274. Step 3272 includes determining a plurality of queries for execution. Step 3274 includes facilitating execution of the plurality of queries by performing a plurality of sequential operator execution steps. Performance of each of the plurality of sequential operator execution steps can include performing the method of FIG. 32C, for example, where the plurality of sequential operator execution steps are performed by repeating the method of FIG. 232C a corresponding plurality of times. Thus, the method of FIG. 22C can correspond to a single one of the plurality of sequential operator execution steps.

As illustrated in FIG. 32C, step 3282 includes determining whether a low memory availability trigger condition has occurred. Step 3284 includes determining a selected query for execution by selecting to execute one of the plurality of queries in accordance with a predetermined turn-based ordering of the plurality of queries over the plurality of sequential operator execution steps when the low memory availability trigger condition has not occurred at the each of the plurality of sequential operator execution steps. For example, step 3284 is only performed when the low memory availability trigger condition is determined to have occurred. Step 3286 includes determining the selected query for execution based on selecting one of the plurality of queries determined to be most favorable for execution via spilling to external disk when the low memory availability trigger condition has occurred at the each of the plurality of sequential operator execution steps. Step 3288 includes facilitating execution of an operator of the selected query. Facilitating execution of the operator includes facilitating spilling the selected query to the external disk when the low memory availability trigger condition has occurred, for example, where external query execution memory resources 3065 are utilized to facilitate the remainder of the selected query's execution. Facilitating execution of the operator includes utilizing internal query execution memory resources to perform the execution of the operator and/or to store resulting output data blocks generated via execution of the operator upon its queued data blocks when the low memory availability trigger condition not occurred.

In various embodiments, determining whether the low memory availability trigger condition has occurred at the each of the plurality of sequential operator execution steps includes detecting an interrupt triggered based on current memory availability comparing unfavorably to a low memory availability threshold. In various embodiments, the low memory availability trigger condition can be determined to occur when the low memory interrupt 3250 is received, detected, or otherwise determined for the corresponding operator execution step.

In various embodiments, the method further includes determining a plurality of memory usage estimates for the plurality of queries. Determining the selected query for execution when the low memory availability trigger condition has occurred includes selecting the one of the plurality of queries based on the plurality of memory usage estimates. In various embodiments, the one of the plurality of queries is selected based on having a corresponding memory usage estimate that indicates the greatest and/or least favorable amount of memory of the plurality of memory usage estimates.

In various embodiments, the method further includes determining a plurality of runtime estimates for the plurality of queries. Determining the selected query for execution when the low memory availability trigger condition has occurred includes selecting one of the plurality of queries based on the plurality of memory usage estimates. In various embodiments, the one of the plurality of queries is selected based on having a corresponding runtime estimate that indicates the greatest and/or least favorable runtime of the plurality of runtime estimates.

In various embodiments, the method further includes determining a plurality of remaining runtime estimates for the plurality of queries based on runtime estimate data of the plurality of queries and further based on execution initiation time of the plurality of queries. Determining the selected query for execution when the low memory availability trigger condition has occurred includes selecting the one of the plurality of queries based on the plurality of remaining runtime estimates. In various embodiments, the one of the plurality of queries is selected based on having a corresponding remaining runtime estimate that indicates the greatest and/or least favorable remaining runtime of the plurality of remaining runtime estimates.

In various embodiments, the method further includes determining a plurality of priorities for the plurality of queries. Determining the selected query for execution when the low memory availability trigger condition has occurred is based on the plurality of priorities. In various embodiments, the one of the plurality of queries is selected based on having a corresponding priority that indicates the lowest and/or least favorable priority of the plurality of priorities.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, a set of memory locations within a memory device or a memory section. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by at least one processing module of a database system, comprising:
    determining a query expression indicating a query for execution;
    generating a query operator execution flow based on a nested ordering of a plurality of operators indicated by the query expression, wherein generating the query operator execution flow includes:
        identifying an OR operator of the query expression;
        generating a plurality of parallel sub-flows of the query operator execution flow based on a plurality predicates of the OR operator in the nested ordering of the plurality of operators; and
        generating a plurality of serial sub-flows of the query operator execution flow based on the OR operator of the query expression, wherein a first consecutive one of the plurality of serial sub-flows includes an identifier appending operator, wherein a second consecutive one of the plurality of serial sub-flows includes a tee operator, wherein a third consecutive one of the plurality of serial sub-flows includes the plurality of parallel sub-flows from the tee operator, and wherein a fourth consecutive one of the plurality of serial sub-flows includes a union distinct operator applied to the plurality of parallel sub-flows;
    and;
    facilitating execution of the query by applying the query operator execution flow to a plurality of rows indicated by the query, wherein each of the plurality of rows includes a set of column values for each of a set of columns for the plurality of rows, wherein each the plurality of rows are assigned an appended identifier by applying the identifier appending operator, wherein the each of the plurality of rows are duplicated by applying the tee operator for processing by applying each of the plurality of parallel sub-flows, and wherein applying the union distinct operator removes all remaining duplicated ones the plurality of rows outputted by the plurality of parallel sub-flows by utilizing the appended identifiers;
    wherein at least two of the plurality of rows are identical based on having equivalent column values for all of the set of columns, wherein the at least two of the plurality of rows are assigned different appended identifiers based on being identical, and wherein none of the at least two of the plurality of rows are removed by applying the union distinct operator based on being assigned the different appended identifiers; and
    wherein applying the identifier appending operator includes generating a new column for the plurality of rows that indicates a plurality of appended identifiers assigned to the plurality of rows, wherein the each of the plurality of rows is assigned the appended identifier as a corresponding new column value of the each of the plurality of rows for the new column, wherein applying the tee operator includes duplicating the each of the plurality of rows based on duplicating column values of the each of the plurality of rows for each of the set of columns and further based on duplicating the column value of the each of the plurality of rows for the new column, and wherein the union distinct operator removes all remaining duplicated ones the plurality of rows outputted by the plurality of parallel sub-flows based on processing the set of columns and the new column for the plurality of rows, wherein the union distinct operator removes at least one duplicated one the plurality of rows outputted by the plurality of parallel sub-flows based on identifying multiple ones of the plurality of rows having corresponding equivalent column values for all of the set of columns and further having equivalent new column values for the new column, and wherein the none of the at least two of the plurality of rows are removed by applying the union distinct operator based on all of the at least two of the plurality of rows having different new column values for the new column.

2. The method of claim 1, wherein the plurality of rows outputted by the plurality of parallel sub-flows includes multiple duplicates of one row based on the one row being outputted by multiple corresponding ones of the plurality of parallel sub-flows in response to the one row meeting conditions specified by multiple corresponding ones of the plurality predicates of the OR operator, and wherein exactly one instance of the one row is included in output of the union distinct operator based on the union distinct operator removing all other instances of the one row included in the multiple duplicates of the one row.

3. The method of claim 1, wherein applying the identifier appending operator to each of the at least two of the plurality of rows further includes incrementing a value of the appended identifier for each subsequently processed one of the at least two of the plurality of rows based on determining the subsequently processed one of the at least two of the plurality of rows is identical to at least one previously processed one of the at least two of the plurality of rows based on the each subsequently processed one of the at least two of the plurality of rows having equivalent corresponding column values for all of the set of columns with the at least one previously processed one of the at least two of the plurality of rows.

4. The method of claim 3, wherein a set of different rows in the plurality of rows have a same appended identifier assigned by applying the identifier appending operator to each of the set of different rows, wherein the set of different rows are different based on a corresponding set of column values of the set of columns for each of the set of different rows being non-equivalent with other corresponding sets of column values of the set of columns for all other ones of the set of different rows.

5. The method of claim 1, wherein the set of columns of the plurality of rows includes a plurality of columns, and wherein the appended identifier assigned to the each of the plurality of rows is distinct from the plurality of columns.

6. The method of claim 1, wherein generating the query operator execution flow includes generating an operator tree based on the nested ordering of the plurality of operators indicated by the query expression, and wherein the operator tree indicates the plurality of operators as a plurality of operator nodes of the operator tree.

7. The method of claim 6, wherein the generating the query operator execution flow further includes:
identifying at least one negation operator in the operator tree; and
generating a modified operator tree by propagating the at least one negation operator to leaf nodes of the operator tree.

8. The method of claim 7, wherein propagating the at least one negation operator to leaf nodes of the operator tree includes applying a plurality of propagations of each negation operator down the operator tree by at least one operator node of the operator tree, wherein applying each of the plurality of propagations at a corresponding operator node of the operator tree includes applying DeMorgan's law to perform a conversion of the corresponding operator node, and wherein performing the conversion of the corresponding operator node includes one of: converting the corresponding operator node from an AND operator to an OR operator, or converting the corresponding operator node from an OR operator to an AND operator.

9. The method of claim 1, wherein the query operator execution flow is in accordance with neither a conjunctive normal form nor a disjunctive normal form.

10. A database system comprising:
at least one processor; and
memory that stores executable instructions that, when executed by the at least one processor, cause the database system to:
determine a query expression indicating a query for execution;
generate a query operator execution flow based on a nested ordering of a plurality of operators indicated by the query expression, wherein generating the query operator execution flow includes:
identifying an OR operator of the query expression;
generating a plurality of parallel sub-flows of the query operator execution flow based on a plurality predicates of the OR operator in the nested ordering of the plurality of operators; and
generating a plurality of serial sub-flows of the query operator execution flow based on the OR operator of the query expression, wherein a first consecutive one of the plurality of serial sub-flows includes an identifier appending operator, wherein a second consecutive one of the plurality of serial sub-flows includes a tee operator, wherein a third consecutive one of the plurality of serial sub-flows includes the plurality of parallel sub-flows from the tee operator, and wherein a fourth consecutive one of the plurality of serial sub-flows includes a union distinct operator applied to the plurality of parallel sub-flows;
and;
facilitate execution of the query by applying the query operator execution flow to a plurality of rows indicated by the query, wherein each of the plurality of rows includes a set of column values for each of a set of columns for the plurality of rows, wherein each the plurality of rows are assigned an appended identifier by applying the identifier appending operator, wherein the each of the plurality of rows are duplicated by applying the tee operator for processing by applying each of the plurality of parallel sub-flows, and wherein applying the union distinct operator removes all remaining duplicated ones the plurality of rows outputted by the plurality of parallel sub-flows by utilizing the appended identifiers;
wherein at least two of the plurality of rows are identical based on having equivalent column values for all of the set of columns, wherein the at least two of the plurality of rows are assigned different appended identifiers based on being identical, and wherein none of the at least two of the plurality of rows are removed by applying the union distinct operator based on being assigned the different appended identifiers; and
wherein applying the identifier appending operator includes generating a new column for the plurality of rows that indicates a plurality of appended identifiers assigned to the plurality of rows, wherein the each of the plurality of rows is assigned the appended identifier as a corresponding new column value of the each of the plurality of rows for the new column, wherein applying the tee operator includes duplicating the each of the plurality of rows based on duplicating column values of the each of the plurality of rows for each of the set of columns and further based on duplicating the column value of the each of the plurality of rows for the new column, and wherein the union distinct operator removes all remaining duplicated ones the plurality of rows outputted by the plurality of parallel sub-flows based on processing the set of columns and the new column for the plurality of rows, wherein the union distinct operator removes at least one duplicated one the plurality of rows outputted by the plurality of parallel sub-flows based on identifying multiple ones of the plurality of rows having corresponding equivalent column values for all of the set of columns and further having equivalent new column values for the new column, and wherein the none of the at least two of the plurality of rows are removed by applying the union distinct operator based on all of the at least two of the plurality of rows having different new column values for the new column.

11. The database system of claim 10, wherein the plurality of rows outputted by the plurality of parallel sub-flows includes multiple duplicates of one row based on the one row being outputted by multiple corresponding ones of the plurality of parallel sub-flows in response to the one row meeting conditions specified by multiple corresponding ones of the plurality predicates of the OR operator, and wherein exactly one instance of the one row is included in output of the union distinct operator based on the union distinct operator removing all other instances of the one row included in the multiple duplicates of the one row.

12. The database system of claim 11, wherein applying the identifier appending operator to each of the at least two of the plurality of rows further includes incrementing a value of the appended identifier for each subsequently processed one of the at least two of the plurality of rows based on determining the subsequently processed one of the at least two of the plurality of rows is identical to at least one previously processed one of the at least two of the plurality of rows.

13. The database system of claim 12, wherein a set of different rows in the plurality of rows have a same appended identifier assigned by applying the identifier appending operator to each of the set of different rows.

14. The database system of claim 13, wherein none of the set of different rows are removed by applying the union distinct operator based on each of the set of different rows being distinct from all other ones of the set of different rows.

15. The database system of claim 10, wherein generating the query operator execution flow includes generating an operator tree based on the nested ordering of the plurality of operators indicated by the query expression, and wherein the operator tree indicates the plurality of operators as a plurality of operator nodes of the operator tree.

16. The database system of claim 15, wherein the generating the query operator execution flow further includes:
identifying at least one negation operator in the operator tree; and
generating a modified operator tree by propagating the at least one negation operator to leaf nodes of the operator tree.

17. The database system of claim 16, wherein propagating the at least one negation operator to leaf nodes of the operator tree includes applying a plurality of propagations of each negation operator down the operator tree by at least one operator node of the operator tree and wherein applying each of the plurality of propagations at a corresponding operator node of the operator tree includes applying DeMorgan's law to perform a conversion of the corresponding operator node, and wherein performing the conversion of the corresponding node includes one of: converting the corresponding node from an AND operator to an OR operator, or converting the corresponding node from an OR operator to an AND operator.

18. The database system of claim 10, further comprising:
generating conjunctive normal form (CNF) processing cost data based on the plurality of operators;
generating disjunctive normal form (DNF) processing cost data based on the plurality of operators;
generating non-normalized form processing cost data based on the plurality of operators; and
generating query processing selection data based on the CNF processing cost data, the DNF processing cost data, and the non-normalized form processing cost data, wherein the query processing selection data indicating a selection to execute the query in accordance with a non-normalized query operator execution flow and not in accordance with a CNF query operator execution flow nor a DNF query operator execution flow based on selecting to execute the query in accordance with exactly one of: the non-normalized query operator execution flow the CNF query operator execution flow, or the DNF query operator execution flow;
wherein the query operator execution flow is in accordance with neither a conjunctive normal form nor a disjunctive normal form based on the query processing selection data indicating a selection to execute the query in accordance with the non-normalized query operator execution flow.

19. A non-transitory computer readable storage medium comprises:
at least one memory section that stores operational instructions that, when executed by a processing module that includes a processor and a memory, causes the processing module to:
determine a query expression indicating a query for execution;
generate a query operator execution flow based on a nested ordering of a plurality of operators indicated by the query expression, wherein generating the query operator execution flow includes:
identifying an OR operator of the query expression;
generating a plurality of parallel sub-flows of the query operator execution flow based on a plurality predicates of the OR operator in the nested ordering of the plurality of operators; and
generating a plurality of serial sub-flows of the query operator execution flow based on the OR operator of the query expression, wherein a first consecutive one of the plurality of serial sub-flows includes an identifier appending operator, wherein a second consecutive one of the plurality of serial sub-flows includes a tee operator, wherein a third consecutive one of the plurality of serial sub-flows includes the plurality of parallel sub-flows from the tee operator, and wherein a fourth consecutive one of the plurality of serial sub-flows includes a union distinct operator applied to the plurality of parallel sub-flows;
and;
facilitate execution of the query by applying the query operator execution flow to a plurality of rows indicated by the query, wherein each of the plurality of rows includes a set of column values for each of a set of columns for the plurality of rows, wherein each the plurality of rows are assigned an appended identifier by applying the identifier appending operator, wherein the each of the plurality of rows are duplicated by applying the tee operator for processing by applying each of the plurality of parallel sub-flows, and wherein applying the union distinct operator removes all remaining duplicated ones the plurality of rows outputted by the plurality of parallel sub-flows by utilizing the appended identifiers;

wherein at least two of the plurality of rows are identical based on having equivalent column values for all of the set of columns, wherein the at least two of the plurality of rows are assigned different appended identifiers based on being identical, and wherein none of the at least two of the plurality of rows are removed by applying the union distinct operator based on being assigned the different appended identifiers; and wherein applying the identifier appending operator includes generating a new column for the plurality of rows that indicates a plurality of appended identifiers assigned to the plurality of rows, wherein the each of the plurality of rows is assigned the appended identifier as a corresponding new column value of the each of the plurality of rows for the new column, wherein applying the tee operator includes duplicating the each of the plurality of rows based on duplicating column values of the each of the plurality of rows for each of the set of columns and further based on duplicating the column value of the each of the plurality of rows for the new column, and wherein the union distinct operator removes all remaining duplicated ones the plurality of rows outputted by the plurality of parallel sub-flows based on processing the set of columns and the new column for the plurality of rows, wherein the union distinct operator removes at least one duplicated one the plurality of rows outputted by the plurality of parallel sub-flows based on identifying multiple ones of the plurality of rows having corresponding equivalent column values for all of the set of columns and further having equivalent new column values for the new column, and wherein the none of the at least two of the plurality of rows are removed by applying the union distinct operator based on all of the at least two of the plurality of rows having different new column values for the new column.

* * * * *